United States Patent [19]
Kohno et al.

[11] Patent Number: 6,025,961
[45] Date of Patent: Feb. 15, 2000

[54] ZOOM LENS SYSTEM HAVING TWO LENS UNITS

[75] Inventors: Tetsuo Kohno, Toyonaka; Hiroyuki Matsumoto; Tomoo Doi, both of Wakayama-Ken, all of Japan

[73] Assignee: Minolta Co., Ltd., Osaka, Japan

[21] Appl. No.: 09/056,294

[22] Filed: Apr. 7, 1998

[30] Foreign Application Priority Data

| Apr. 9, 1997 | [JP] | Japan | H9-090963 |
| Apr. 9, 1997 | [JP] | Japan | H9-090994 |
| Nov. 10, 1997 | [JP] | Japan | H9-306707 |

[51] Int. Cl.$^7$ .................................................. G02B 15/14
[52] U.S. Cl. ........................................ 359/691; 359/676
[58] Field of Search ...................... 359/691, 676

[56] References Cited

U.S. PATENT DOCUMENTS

| 4,993,814 | 2/1991 | Hata | 350/426 |
| 5,283,693 | 2/1994 | Kohno et al. | 359/691 |
| 5,663,836 | 9/1997 | Ogata | 359/691 |

FOREIGN PATENT DOCUMENTS 4-46308  2/1992  Japan .

*Primary Examiner*—Hung Xuan Dang
*Attorney, Agent, or Firm*—Sidley & Austin

[57] ABSTRACT

A zoom lens system has a first lens unit and a second lens unit from the object side. The first lens unit has a negative optical power. The second lens unit has a positive optical power. The second lens unit is arranged on the image side of the first lens unit. An air space between the first and second units is variable for zooming. The second lens unit has a doublet lens element composed of a positive lens element and a negative lens element cemented together.

32 Claims, 36 Drawing Sheets

FNO=3.49

[W]

— d
---- SC

-0.1  0.1
SPHERICAL  SINE
ABERRATION  CONDITION

Y'=1.8

---- DM
— DS

-0.1  0.1
ASTIGMATISM

Y'=1.8

-5.0  5.0
DISTORTION %

FNO=4.30

[M]

— d
---- SC

-0.1  0.1
SPHERICAL  SINE
ABERRATION  CONDITION

Y'=1.8

---- DM
— DS

-0.1  0.1
ASTIGMATISM

Y'=1.8

-5.0  5.0
DISTORTION %

FNO=5.80

[T]

— d
---- SC

-0.1  0.1
SPHERICAL  SINE
ABERRATION  CONDITION

Y'=1.8

---- DM
— DS

-0.1  0.1
ASTIGMATISM

Y'=1.8

-5.0  5.0
DISTORTION %

FNO=2.10

[W]
— d
---- SC

-0.1  0.1
SPHERICAL  SINE
ABERRATION CONDITION

Y'=1.8

---- DM
— DS

-0.1  0.1
ASTIGMATISM

Y'=1.8

-5.0  5.0
DISTORTION %

FNO=2.39

[M]
— d
---- SC

-0.1  0.1
SPHERICAL  SINE
ABERRATION CONDITION

Y'=1.8

---- DM
— DS

-0.1  0.1
ASTIGMATISM

Y'=1.8

-5.0  5.0
DISTORTION %

FNO=2.90

[T]
— d
---- SC

-0.1  0.1
SPHERICAL  SINE
ABERRATION CONDITION

Y'=1.8

---- DM
— DS

-0.1  0.1
ASTIGMATISM

Y'=1.8

-5.0  5.0
DISTORTION %

FNO=2.03
[W]
— d
----- SC
-0.1  0.1
SPHERICAL SINE
ABERRATION CONDITION

Y'=1.8
----- DM
— DS
-0.1  0.1
ASTIGMATISM

Y'=1.8
-5.0  5.0
DISTORTION %

FNO=2.35
[M]
— d
----- SC
-0.1  0.1
SPHERICAL SINE
ABERRATION CONDITION

Y'=1.8
----- DM
— DS
-0.1  0.1
ASTIGMATISM

Y'=1.8
-5.0  5.0
DISTORTION %

FNO=2.90
[T]
— d
----- SC
-0.1  0.1
SPHERICAL SINE
ABERRATION CONDITION

Y'=1.8
----- DM
— DS
-0.1  0.1
ASTIGMATISM

Y'=1.8
-5.0  5.0
DISTORTION %

FNO=1.98
[W]
— d
----- SC
-0.1　0.1
SPHERICAL　SINE
ABERRATION　CONDITION

Y'=1.8
----- DM
——— DS
-0.1　0.1
ASTIGMATISM

Y'=1.8
-5.0　5.0
DISTORTION %

FNO=2.32
[M]
— d
----- SC
-0.1　0.1
SPHERICAL　SINE
ABERRATION　CONDITION

Y'=1.8
----- DM
——— DS
-0.1　0.1
ASTIGMATISM

Y'=1.8
-5.0　5.0
DISTORTION %

FNO=2.90
[T]
— d
----- SC
-0.1　0.1
SPHERICAL　SINE
ABERRATION　CONDITION

Y'=1.8
----- DM
——— DS
-0.1　0.1
ASTIGMATISM

Y'=1.8
-5.0　5.0
DISTORTION %

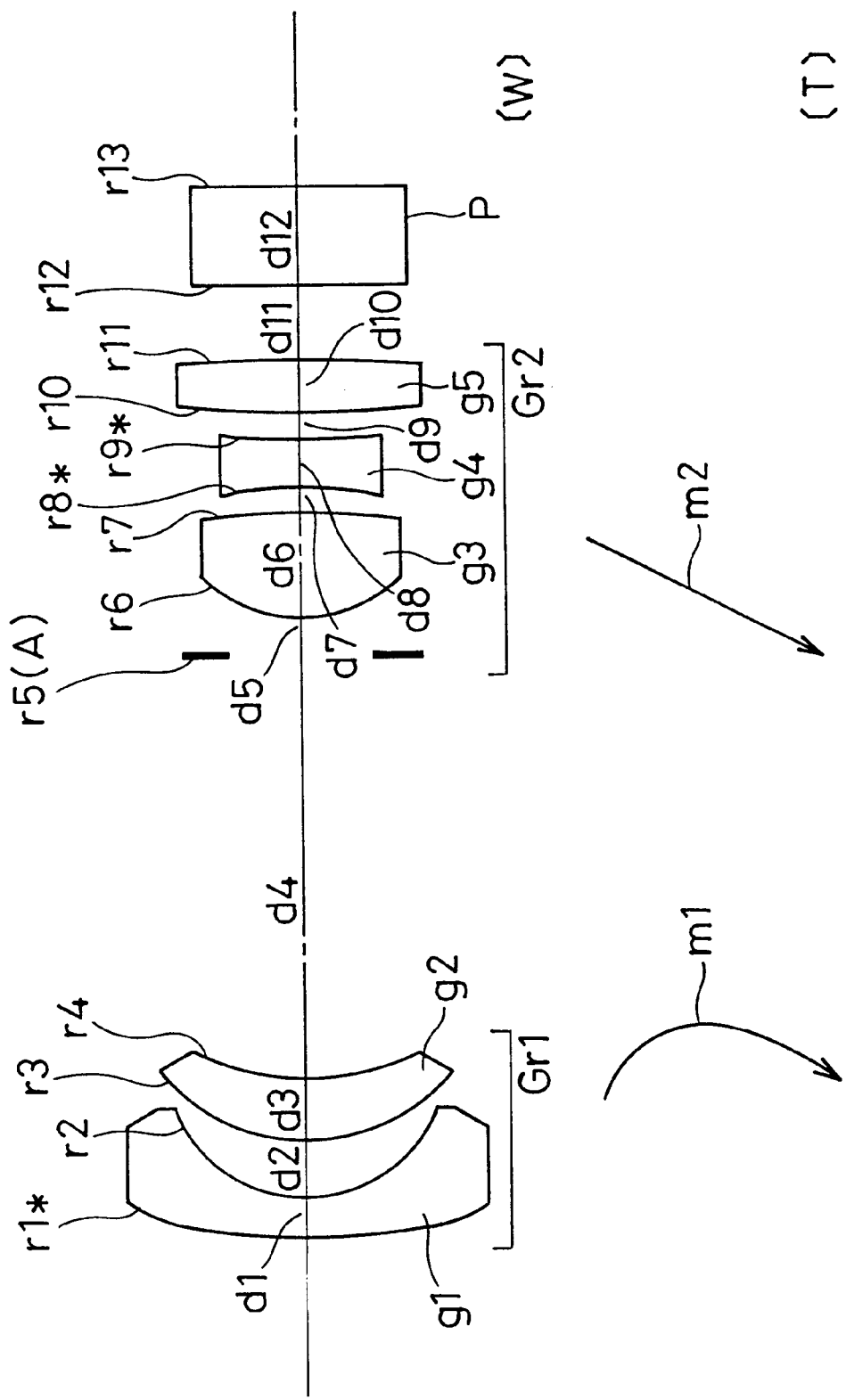

FNO=3.42

[W]
— d
—·— g
----- SC

-0.5　　0.5
SPHERICAL　SINE
ABERRATION　CONDITION

Y'=4.0

----- DM
——— DS

-0.5　　0.5
ASTIGMATISM

Y'=4.0

-5.0　　5.0
DISTORTION %

FNO=4.29

[M]
— d
—·— g
----- SC

-0.5　　0.5
SPHERICAL　SINE
ABERRATION　CONDITION

Y'=4.0

----- DM
——— DS

-0.5　　0.5
ASTIGMATISM

Y'=4.0

-5.0　　5.0
DISTORTION %

FNO=5.77

[T]
— d
—·— g
----- SC

-0.5　　0.5
SPHERICAL　SINE
ABERRATION　CONDITION

Y'=4.0

----- DM
——— DS

-0.5　　0.5
ASTIGMATISM

Y'=4.0

-5.0　　5.0
DISTORTION %

FNO=3.43
[W]
— d
—·— g
----- SC
-0.5    0.5
SPHERICAL   SINE
ABERRATION  CONDITION

Y'=4.0
----- DM
——— DS
-0.5    0.5
ASTIGMATISM

Y'=4.0
-5.0    5.0
DISTORTION %

FNO=4.29
[M]
— d
—·— g
----- SC
-0.5    0.5
SPHERICAL   SINE
ABERRATION  CONDITION

Y'=4.0
----- DM
——— DS
-0.5    0.5
ASTIGMATISM

Y'=4.0
-5.0    5.0
DISTORTION %

FNO=5.77
[T]
— d
—·— g
----- SC
-0.5    0.5
SPHERICAL   SINE
ABERRATION  CONDITION

Y'=4.0
----- DM
——— DS
-0.5    0.5
ASTIGMATISM

Y'=4.0
-5.0    5.0
DISTORTION %

FNO=3.68

[W]
— d
—·— g
----- SC

-0.5   0.5
SPHERICAL   SINE
ABERRATION   CONDITION

Y'=4.0

----- DM
——— DS

-0.5   0.5
ASTIGMATISM

Y'=4.0

-5.0   5.0
DISTORTION %

FNO=4.45

[M]
— d
—·— g
----- SC

-0.5   0.5
SPHERICAL   SINE
ABERRATION   CONDITION

Y'=4.0

----- DM
——— DS

-0.5   0.5
ASTIGMATISM

Y'=4.0

-5.0   5.0
DISTORTION %

FNO=5.77

[T]
— d
—·— g
----- SC

-0.5   0.5
SPHERICAL   SINE
ABERRATION   CONDITION

Y'=4.0

----- DM
——— DS

-0.5   0.5
ASTIGMATISM

Y'=4.0

-5.0   5.0
DISTORTION %

FIG. 21A
FNO=3.69
[W]
— d
—·— g
----- SC
-0.5    0.5
SPHERICAL   SINE
ABERRATION  CONDITION
FIG. 21B
Y'=4.0
----- DM
——— DS
-0.5    0.5
ASTIGMATISM
FIG. 21C
Y'=4.0
-5.0    5.0
DISTORTION %
FIG. 21D
FNO=4.46
[M]
— d
—·— g
----- SC
-0.5    0.5
SPHERICAL   SINE
ABERRATION  CONDITION
FIG. 21E
Y'=4.0
----- DM
——— DS
-0.5    0.5
ASTIGMATISM
FIG. 21F
Y'=4.0
-5.0    5.0
DISTORTION %
FIG. 21G
FNO=5.77
[T]
— d
—·— g
----- SC
-0.5    0.5
SPHERICAL   SINE
ABERRATION  CONDITION
FIG. 21H
Y'=4.0
----- DM
——— DS
-0.5    0.5
ASTIGMATISM
FIG. 21I
Y'=4.0
-5.0    5.0
DISTORTION %
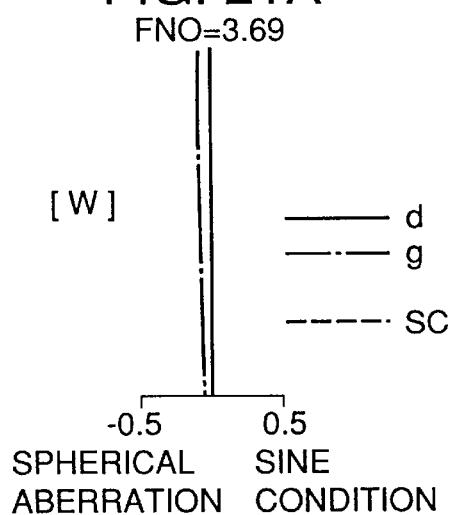
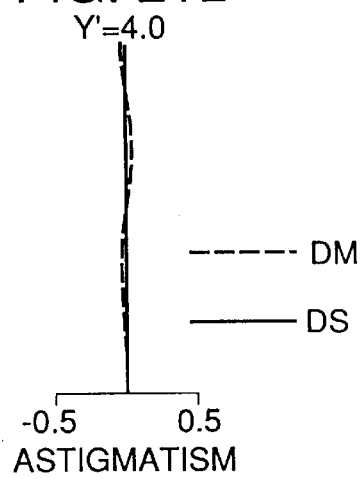
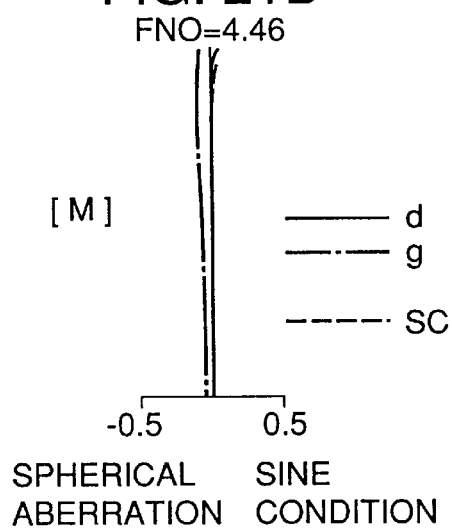
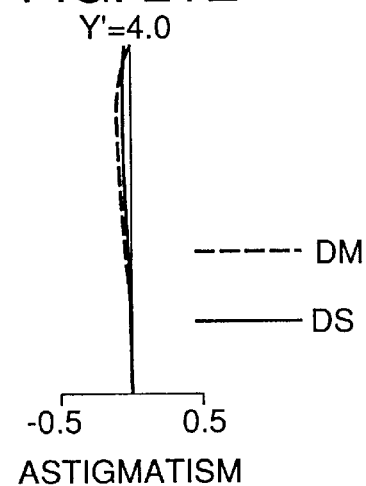
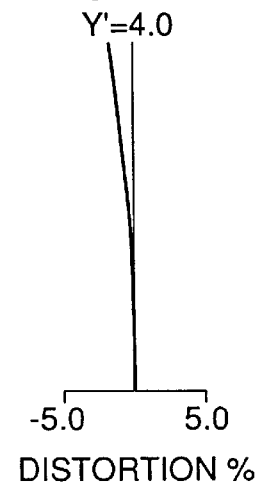
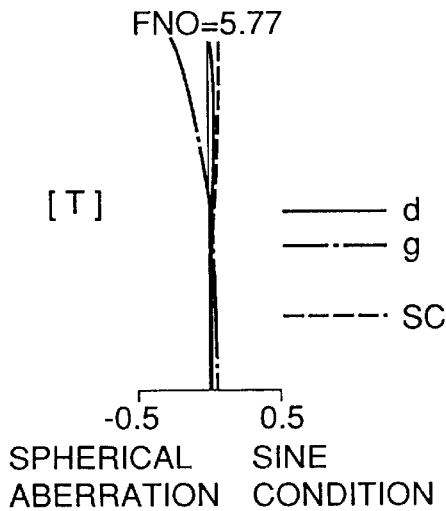
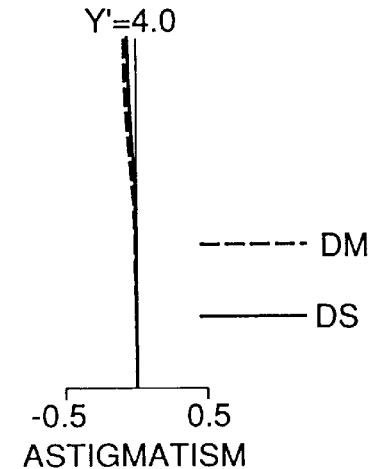
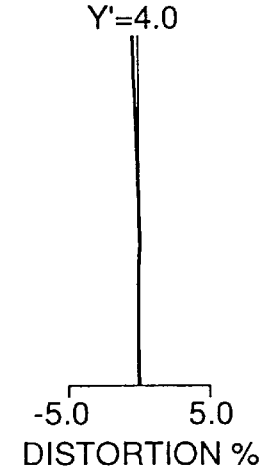

FNO=3.68
[W]
— d
—·— g
----- SC
-0.5  0.5
SPHERICAL SINE
ABERRATION CONDITION

Y'=4.0
----- DM
——— DS
-0.5  0.5
ASTIGMATISM

Y'=4.0
-5.0  5.0
DISTORTION %

FNO=4.45
[M]
— d
—·— g
----- SC
-0.5  0.5
SPHERICAL SINE
ABERRATION CONDITION

Y'=4.0
----- DM
——— DS
-0.5  0.5
ASTIGMATISM

Y'=4.0
-5.0  5.0
DISTORTION %

FNO=5.77
[T]
— d
—·— g
----- SC
-0.5  0.5
SPHERICAL SINE
ABERRATION CONDITION

Y'=4.0
----- DM
——— DS
-0.5  0.5
ASTIGMATISM

Y'=4.0
-5.0  5.0
DISTORTION %

FIG. 23A
FNO=3.56
[W]
— d
—·— g
----- SC
-0.5　0.5
SPHERICAL　SINE
ABERRATION　CONDITION
FIG. 23B
Y'=4.0
----- DM
——— DS
-0.5　0.5
ASTIGMATISM
FIG. 23C
Y'=4.0
-5.0　5.0
DISTORTION %
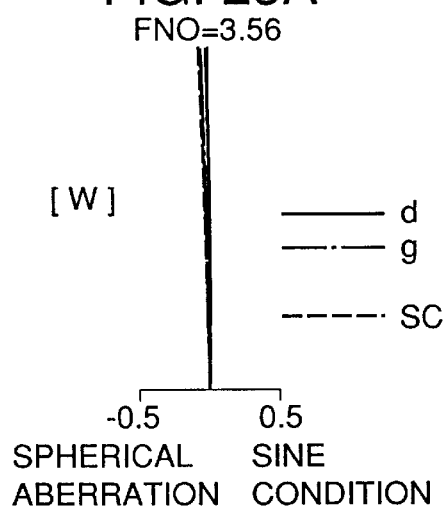
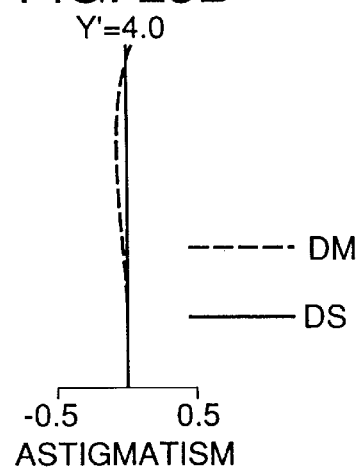
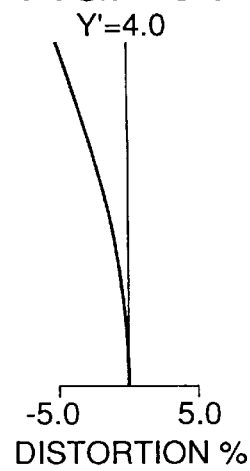
FIG. 23D
FNO=4.38
[M]
— d
—·— g
----- SC
-0.5　0.5
SPHERICAL　SINE
ABERRATION　CONDITION
FIG. 23E
Y'=4.0
----- DM
——— DS
-0.5　0.5
ASTIGMATISM
FIG. 23F
Y'=4.0
-5.0　5.0
DISTORTION %
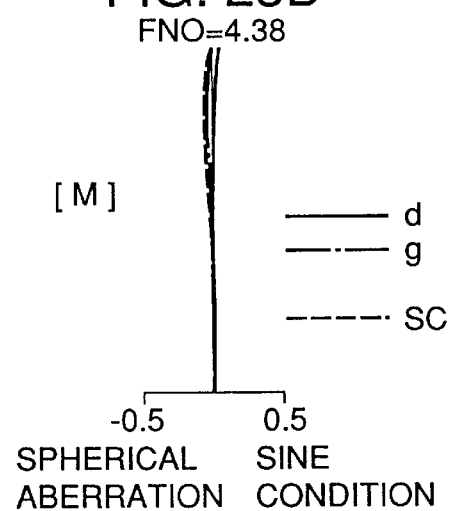
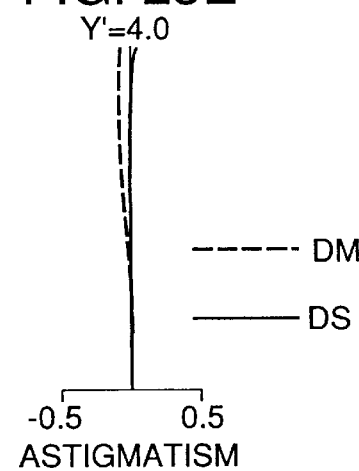
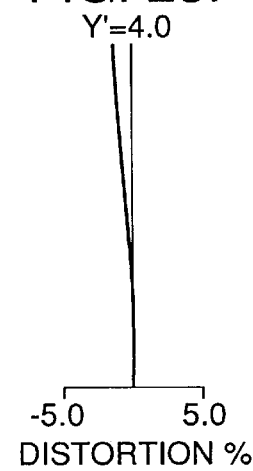
FIG. 23G
FNO=5.80
[T]
— d
—·— g
----- SC
-0.5　0.5
SPHERICAL　SINE
ABERRATION　CONDITION
FIG. 23H
Y'=4.0
----- DM
——— DS
-0.5　0.5
ASTIGMATISM
FIG. 23I
Y'=4.0
-5.0　5.0
DISTORTION %
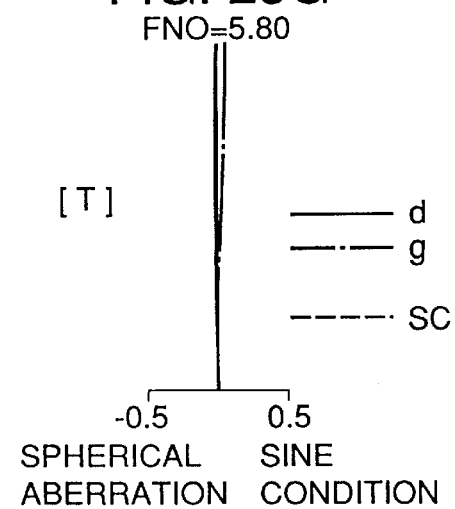
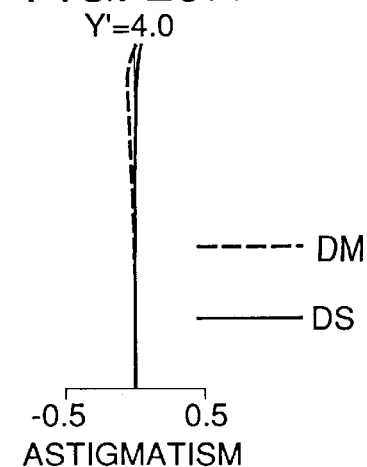
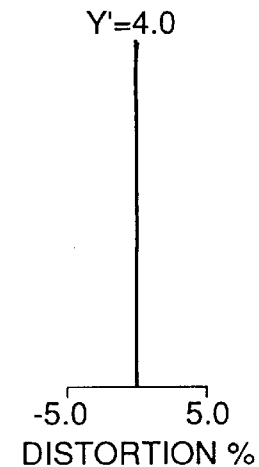

FIG. 24A
FNO=3.90
[W]
— d
—·— g
----- SC
-0.5  0.5
SPHERICAL  SINE
ABERRATION  CONDITION
FIG. 24B
Y'=4.0
----- DM
—— DS
-0.5  0.5
ASTIGMATISM
FIG. 24C
Y'=4.0
-5.0  5.0
DISTORTION %
FIG. 24D
FNO=4.59
[M]
— d
—·— g
----- SC
-0.5  0.5
SPHERICAL  SINE
ABERRATION  CONDITION
FIG. 24E
Y'=4.0
----- DM
—— DS
-0.5  0.5
ASTIGMATISM
FIG. 24F
Y'=4.0
-5.0  5.0
DISTORTION %
FIG. 24G
FNO=5.77
[T]
— d
—·— g
----- SC
-0.5  0.5
SPHERICAL  SINE
ABERRATION  CONDITION
FIG. 24H
Y'=4.0
----- DM
—— DS
-0.5  0.5
ASTIGMATISM
FIG. 24I
Y'=4.0
-5.0  5.0
DISTORTION %
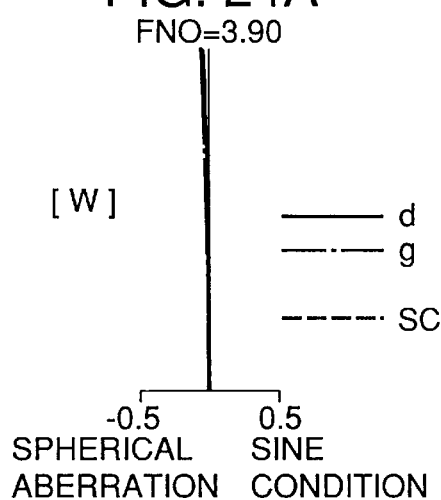
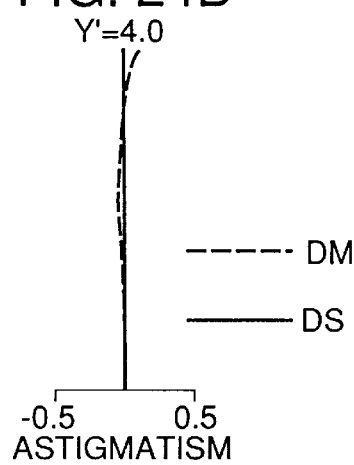
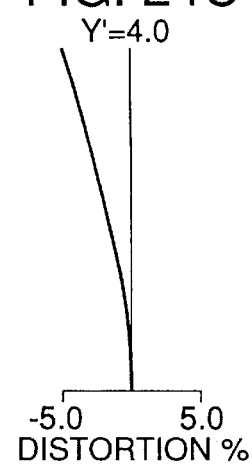
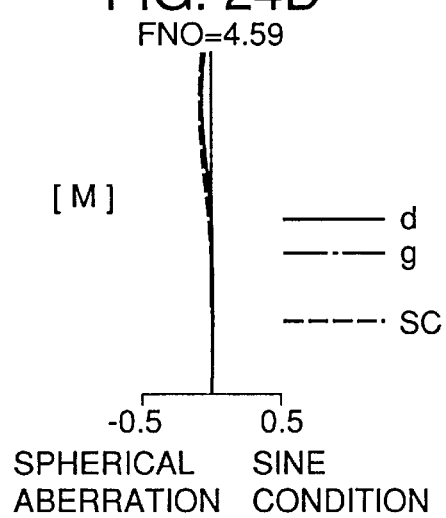
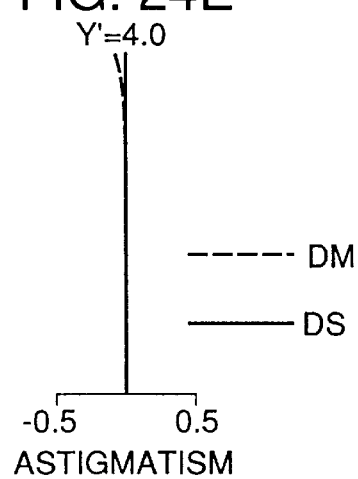
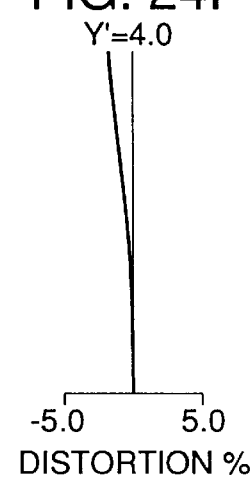
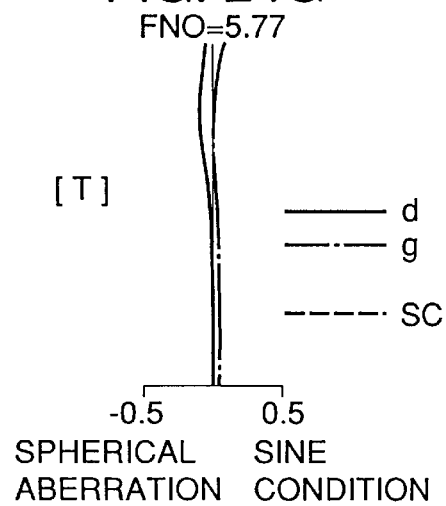
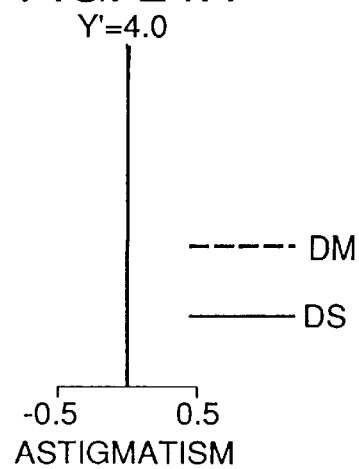
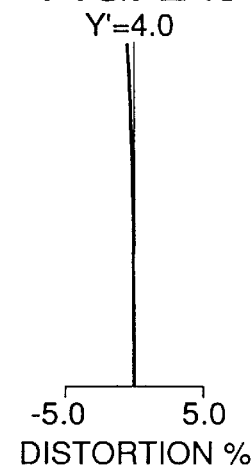

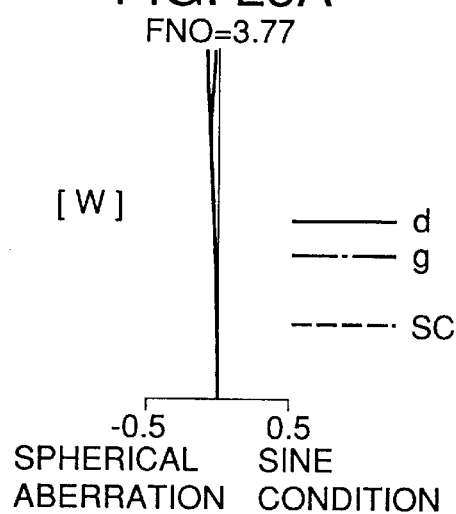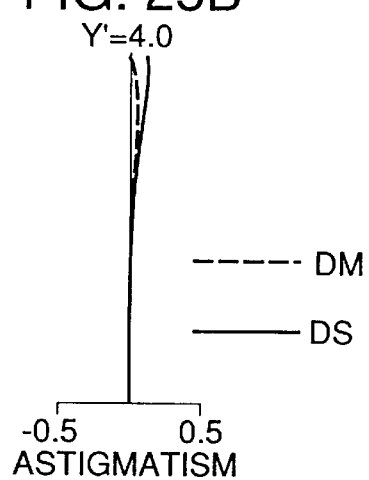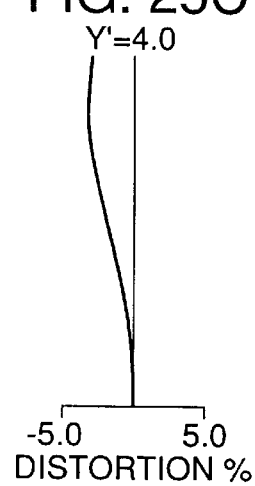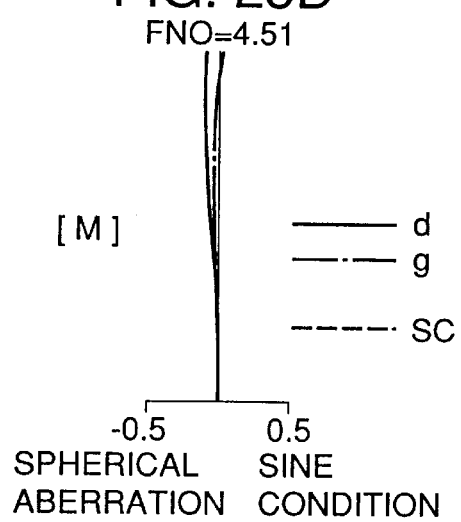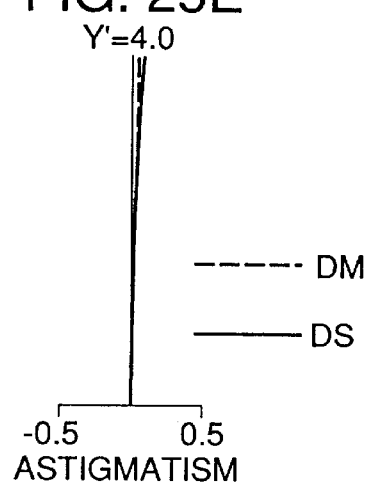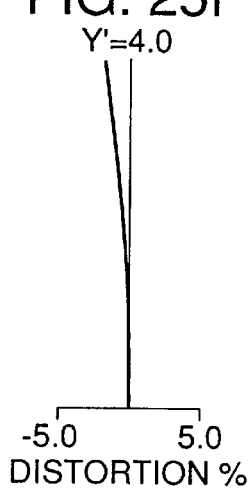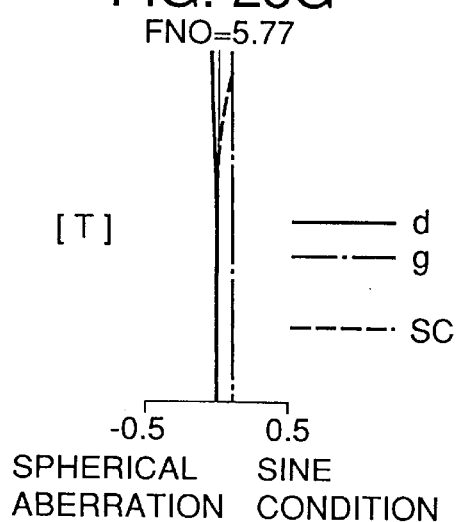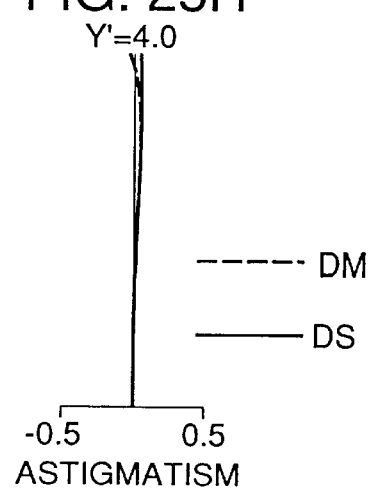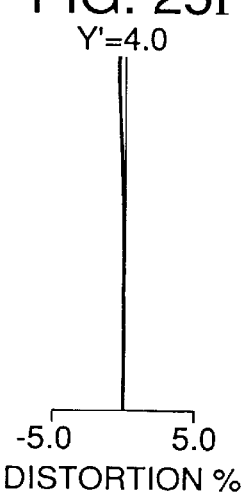

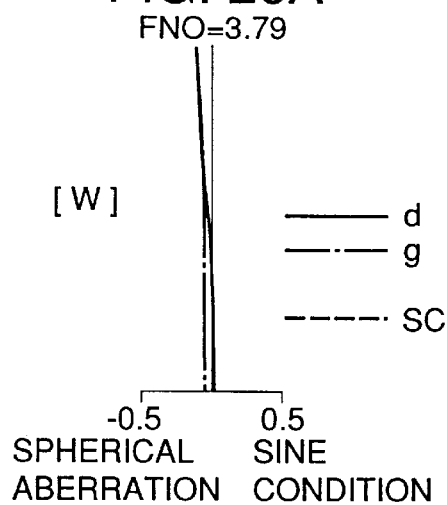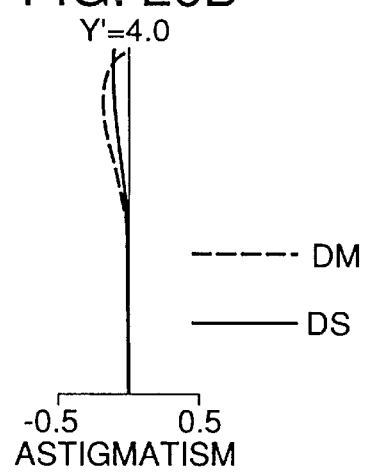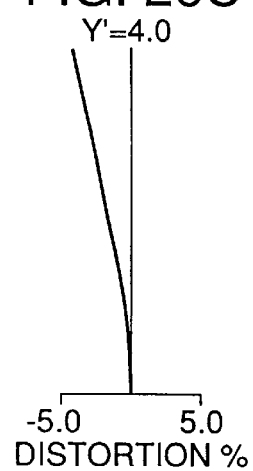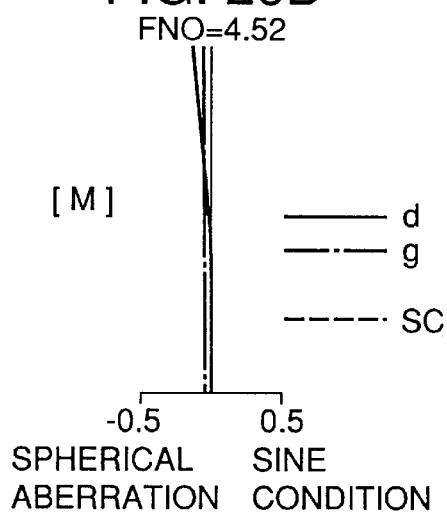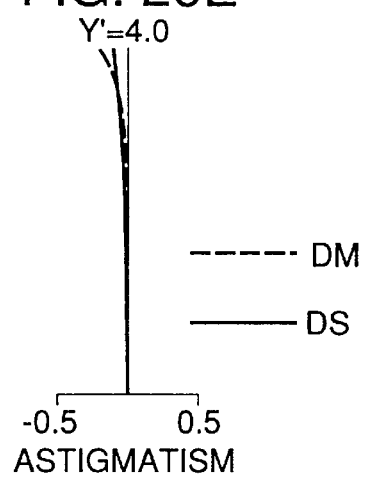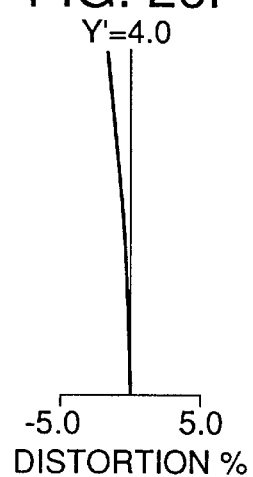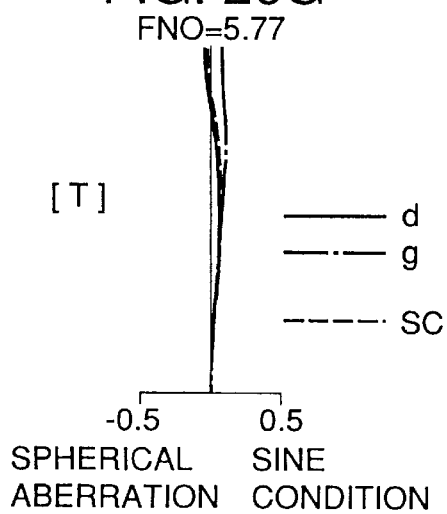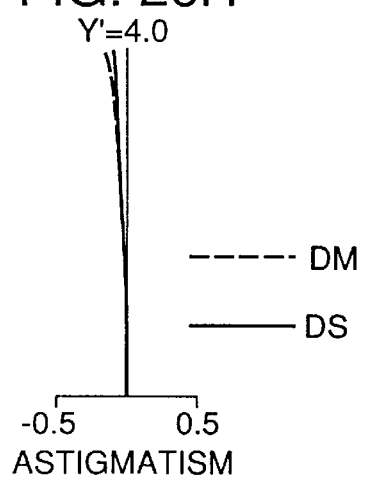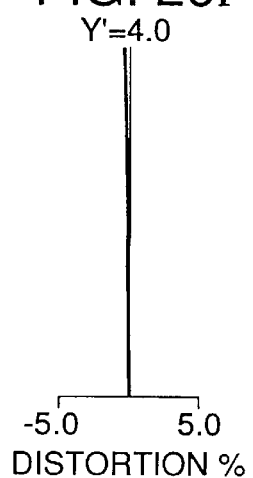

FNO=2.19

[W]
— d
---- SC

-0.1  0.1
SPHERICAL  SINE
ABERRATION  CONDITION

Y'=1.9

---- DM
— DS

-0.1  0.1
ASTIGMATISM

Y'=1.9

-5.0  5.0
DISTORTION %

FNO=2.85

[M]
— d
---- SC

-0.1  0.1
SPHERICAL  SINE
ABERRATION  CONDITION

Y'=1.9

---- DM
— DS

-0.1  0.1
ASTIGMATISM

Y'=1.9

-5.0  5.0
DISTORTION %

FNO=4.00

[T]
— d
---- SC

-0.1  0.1
SPHERICAL  SINE
ABERRATION  CONDITION

Y'=1.9

---- DM
— DS

-0.1  0.1
ASTIGMATISM

Y'=1.9

-5.0  5.0
DISTORTION %

FNO=2.69

[W]
— d
---- SC

-0.1  0.1
SPHERICAL  SINE
ABERRATION  CONDITION

Y'=1.9

---- DM
— DS

-0.1  0.1
ASTIGMATISM

Y'=1.9

-5.0  5.0
DISTORTION %

FNO=3.17

[M]
— d
---- SC

-0.1  0.1
SPHERICAL  SINE
ABERRATION  CONDITION

Y'=1.9

---- DM
— DS

-0.1  0.1
ASTIGMATISM

Y'=1.9

-5.0  5.0
DISTORTION %

FNO=4.00

[T]
— d
---- SC

-0.1  0.1
SPHERICAL  SINE
ABERRATION  CONDITION

Y'=1.9

---- DM
— DS

-0.1  0.1
ASTIGMATISM

Y'=1.9

-5.0  5.0
DISTORTION %

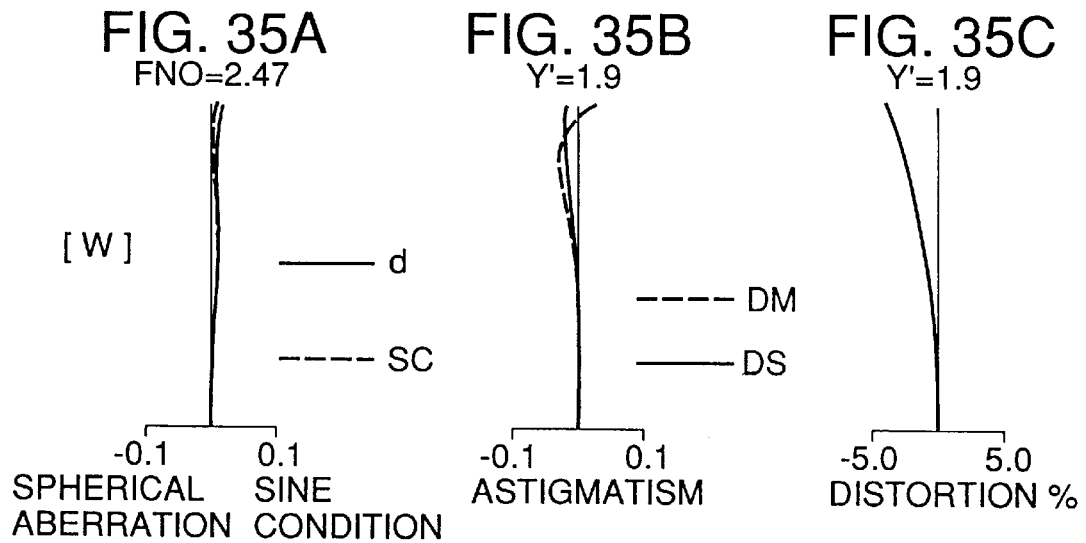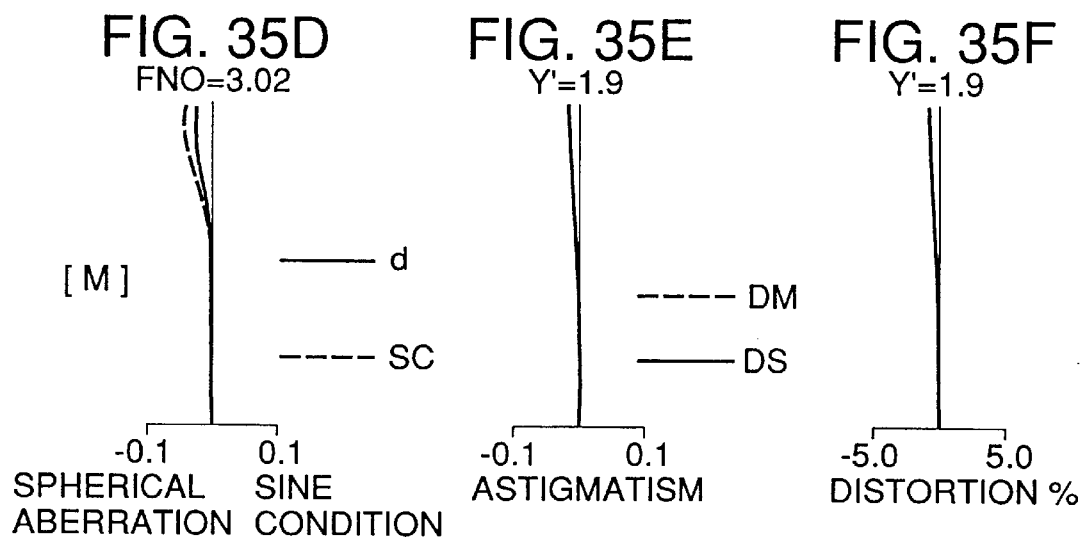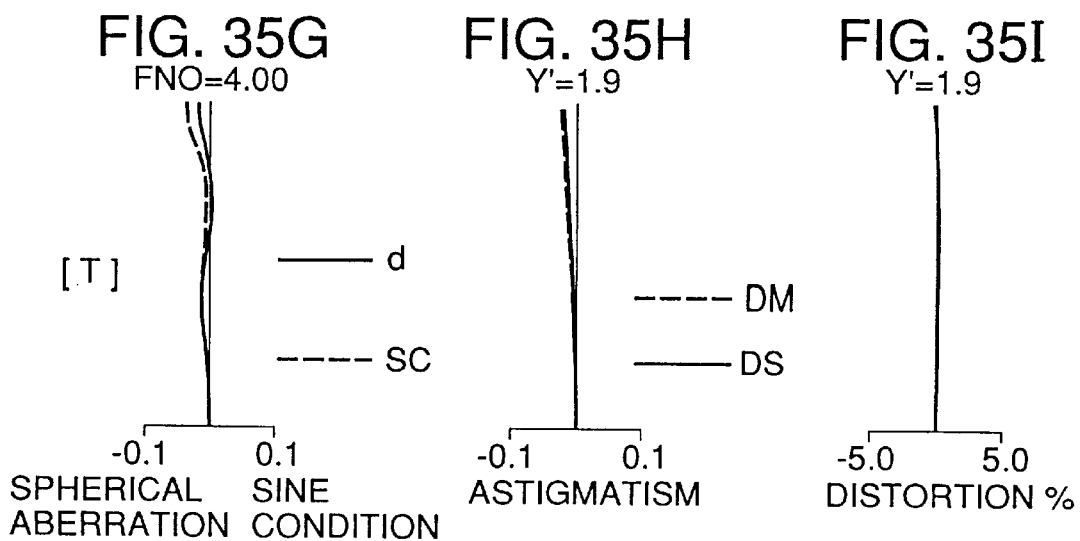

FNO=2.42
[W]
— d
---- SC
-0.1  0.1
SPHERICAL SINE
ABERRATION CONDITION

Y'=1.9
---- DM
— DS
-0.1  0.1
ASTIGMATISM

Y'=1.9
-5.0  5.0
DISTORTION %

FNO=2.99
[M]
— d
---- SC
-0.1  0.1
SPHERICAL SINE
ABERRATION CONDITION

Y'=1.9
---- DM
— DS
-0.1  0.1
ASTIGMATISM

Y'=1.9
-5.0  5.0
DISTORTION %

FNO=4.00
[T]
— d
---- SC
-0.1  0.1
SPHERICAL SINE
ABERRATION CONDITION

Y'=1.9
---- DM
— DS
-0.1  0.1
ASTIGMATISM

Y'=1.9
-5.0  5.0
DISTORTION %

FNO=2.64

[W]

— d
---- SC

-0.1  0.1
SPHERICAL SINE
ABERRATION CONDITION

Y'=1.9

---- DM
— DS

-0.1  0.1
ASTIGMATISM

Y'=1.9

-5.0  5.0
DISTORTION %

FNO=3.14

[M]

— d
---- SC

-0.1  0.1
SPHERICAL SINE
ABERRATION CONDITION

Y'=1.9

---- DM
— DS

-0.1  0.1
ASTIGMATISM

Y'=1.9

-5.0  5.0
DISTORTION %

FNO=4.00

[T]

— d
---- SC

-0.1  0.1
SPHERICAL SINE
ABERRATION CONDITION

Y'=1.9

---- DM
— DS

-0.1  0.1
ASTIGMATISM

Y'=1.9

-5.0  5.0
DISTORTION %

FNO=2.45

[W]
— d
---- SC

-0.1  0.1
SPHERICAL  SINE
ABERRATION  CONDITION

Y'=1.9

---- DM
— DS

-0.1  0.1
ASTIGMATISM

Y'=1.9

-5.0  5.0
DISTORTION %

FNO=3.01

[M]
— d
---- SC

-0.1  0.1
SPHERICAL  SINE
ABERRATION  CONDITION

Y'=1.9

---- DM
— DS

-0.1  0.1
ASTIGMATISM

Y'=1.9

-5.0  5.0
DISTORTION %

FNO=4.00

[T]
— d
---- SC

-0.1  0.1
SPHERICAL  SINE
ABERRATION  CONDITION

Y'=1.9

---- DM
— DS

-0.1  0.1
ASTIGMATISM

Y'=1.9

-5.0  5.0
DISTORTION %

ZOOM LENS SYSTEM HAVING TWO LENS UNITS

FIELD OF THE INVENTION

The present invention relates to a zoom lens system. In one aspect, the present invention relates to a zoom lens system having an optical construction suitable for use in a camera fitted with a solid-state image-sensing device such as a CCD (charge-coupled device).

BACKGROUND OF THE INVENTION

Conventionally, zoom lens systems of a two-unit construction consisting of a negative and a positive lens unit and thus having a retrofocus-type power distribution have been widely used as interchangeable lenses for single-lens reflex cameras that are generally considered to require comparatively large back focal lengths. In addition, zoom lens systems of this type, with which it is easy to secure a large back focal length, are useful also as comparatively low-cost, low-zoom-ratio zoom lens systems for use in electronic still cameras that have recently been coming into wider and wider use, because such cameras also require sufficiently large back focal lengths to arrange a low-pass filter and others between a taking lens and an image-sensing device (such as CCD).

In electronic still cameras, for which every effort is constantly being made to make the image-sensing device ever more compact, the problem to be solved most urgently is that of achieving the miniaturization and cost reduction of the taking lens without a loss in image quality. As one solution to this problem, Japanese Laid-open Patent Application No. H4-46308 proposes a zoom lens system of a two-unit construction consisting of a negative and a positive lens unit in which miniaturization and cost reduction are attempted by extremely reducing the number of the constituent lens elements. This zoom lens system, consisting of a front lens unit of a two-unit/two-element construction having a negative optical power and a rear lens unit of a two-unit/two-element or three-unit/three-element construction having a positive optical power, provides a zoom ratio of about 2×.

However, when applied to a small image-sensing device such as is used in an electronic still camera, the zoom lens system proposed in Japanese Laid-open Patient Application No. H4-46308, exactly because it consists of an extremely small number of lens elements, requires too strong an optical power in each lens element. As a result, the distance of the air space between the first and second lens elements of the rear lens unit becomes so sensitive to errors from spherical aberrations, especially at the telephoto end, that it is extremely difficult to shape those lens elements with sufficiently high accuracy.

Moreover, as the solid-state image-sensing device is made smaller, the taking optical system as a whole should ideally be made accordingly smaller. However, in any unit that includes an optical system, it is difficult to miniaturize components such as lens barrels that are not purely optical components with the same reduction factor as purely optical components.

Furthermore, there are various problems associated with a zoom lens system for use in a camera fitted with a solid-state image-sensing device such as a CCD. For example, it is difficult to maximize the distance at which the exit pupil is placed (i.e. to minimize the incident angle with which peripheral rays enter the CCD) and at the same time minimize the total length of the zoom lens system; it is also difficult to obtain acceptable aberration characteristics over the entire zoom range and at the same time secure sufficient peripheral illumination at the wide-angle end.

SUMMARY OF THE INVENTION

An object of the present invention is to provide a zoom lens system of a two-unit construction that consists of a first lens unit having a negative optical power and a second lens unit having a positive optical power and that, although its second lens unit is reduced to a one-unit/two-element or two-unit/three-element construction, provides an increased zoom ratio coupled with satisfactory optical performance and miniaturization and allows its constituent lens elements to be shaped comparatively easily.

Another object of the present invention is to provide a compact zoom lens system that allows efficient miniaturization of an entire unit that includes an optical system.

Still another object of the present invention is to provide a zoom lens system that makes it possible to maximize the distance at which the exit pupil is placed and at the same time minimize the total length of the zoom lens system and that makes it possible to obtain acceptable aberration characteristics over the entire zoom range and at the same time secure sufficient peripheral illumination at the wide-angle end.

To achieve the above objects, according to one aspect of the present invention, a zoom lens system is provided with, from the object side, a first lens unit having a negative optical power; and a second lens unit having a positive optical power, the second lens unit being provided on the image side of the first lens unit with a variable air space formed between the first and second lens units. In addition, in this zoom lens system, zooming is performed by varying the variable air space, and the zoom lens system fulfills the following conditions:

$$0.2 < \frac{T_{1-2}}{Y'} < 0.8$$

$$0.1 < \left|\frac{f_1}{f_2}\right| \cdot \frac{1}{Z} < 0.6$$

where $T_{1-2}$ represents the distance of the variable air space in the longest focal length condition; $Y'$ represents the maximum image height; $f_1$ represents the focal length of the first lens unit; $f_2$ represents the focal length of the second lens unit; and $Z$ represents the zoom ratio.

According to another aspect of the present invention, a zoom lens system is provided with, from the object side, a first lens unit having a negative optical power; and a second lens unit having a positive optical power, the second lens unit being provided on the image side of the first lens unit with a variable air space formed between the first and second lens units. In addition, in this zoom lens system, zooming is performed by varying the variable air space, and the zoom lens system fulfills the following condition:

$$1.0 < Y' \times RL < 4.5$$

where $Y'$ represents the maximum image height; and $RL$ represents the effective radius of the most image side surface of the entire zoom lens system.

According to another aspect of the present invention, a zoom lens system is provided with, from the object side, a first lens unit having a negative optical power; and a second lens unit having a positive optical power, the second lens unit being provided on the image side of the first lens unit with a variable air space formed between the first and second lens units. In addition, in this zoom lens system, zooming is performed by varying the variable air space, and the zoom lens system fulfills the following conditions:

$$0.1 < \left|\frac{f_1}{f_2}\right| \cdot \frac{1}{Z} < 0.39$$

$$0.8 < \frac{f1}{fW} < 2.15$$

where $f_1$ represents the focal length of the first lens unit; $f_2$ represents the focal length of the second lens unit; Z represents the zoom ratio; and fW represents the focal length of the entire zoom lens system in the shortest focal length condition.

According to another aspect of the present invention, a zoom lens system is provided with, from the object side, a first lens unit having a negative optical power; and a second lens unit having a positive optical power, the second lens unit being provided on the image side of the first lens unit with a variable air space formed between the first and second lens units, the second lens unit consisting of at least one doublet lens element composed of a positive lens element and a negative lens element cemented together. In addition, in this zoom lens system, zooming is performed by varying the variable air space.

According to a further aspect of the present invention, a zoom lens system is provided with, from the object side, a first lens unit having a negative optical power; and a second lens unit having a positive optical power, the second lens unit being provided on the image side of the first lens unit with a variable air space formed between the first and second lens units, the second lens unit consisting of, from the object side, at least one doublet lens element composed of a positive lens element and a negative lens element cemented together and a positive lens element. In addition, in this zoom lens system, zooming is performed by varying the variable air space.

BRIEF DESCRIPTION OF THE DRAWINGS

This and other objects and features of this invention will become clear from the following description, taken in conjunction with the preferred embodiments with reference to the accompanied drawings in which:

FIG. 9 is a lens arrangement diagram of a fifth embodiment of the invention;

FIGS. 21A to 21I are aberration diagrams of the eighth embodiment;

FIGS. 23A to 23I are aberration diagrams of the tenth embodiment;

FIGS. 24A to 24I are aberration diagrams of the eleventh embodiment;

FIGS. 25A to 25I are aberration diagrams of the twelfth embodiment;

FIGS. 26A to 26I are aberration diagrams of the thirteenth embodiment;

FIGS. 35A to 35I are aberration diagrams of the sixteenth embodiment;

DESCRIPTION OF THE PREFERRED EMBODIMENTS

Hereinafter, zoom lens systems embodying the present invention will be described with reference to the drawings.

Figure 1:
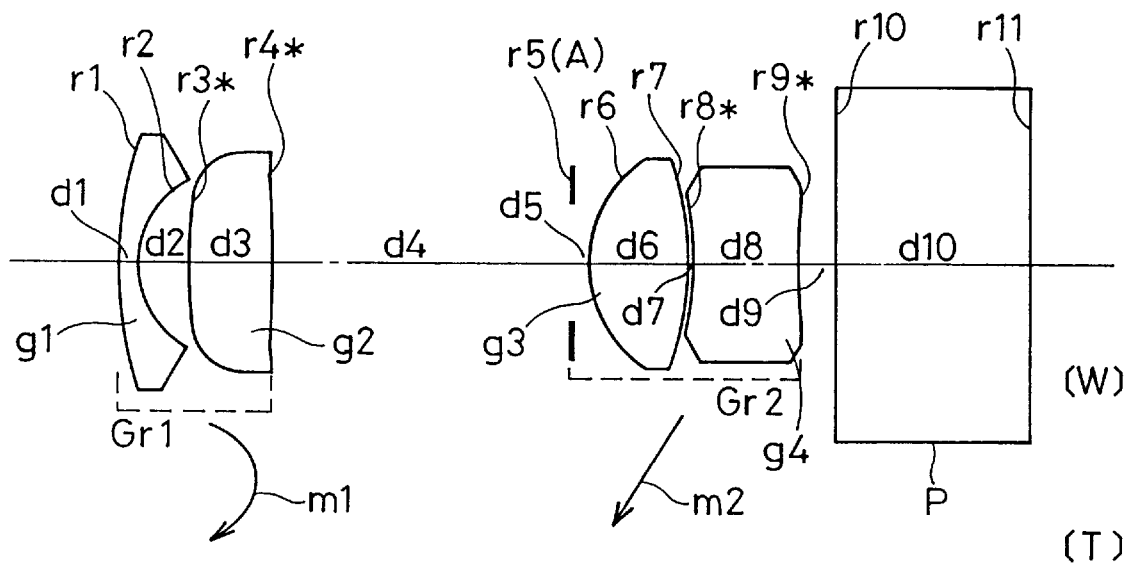
FIG. 1 is a lens arrangement diagram of a first embodiment of the invention.
Figure 2:
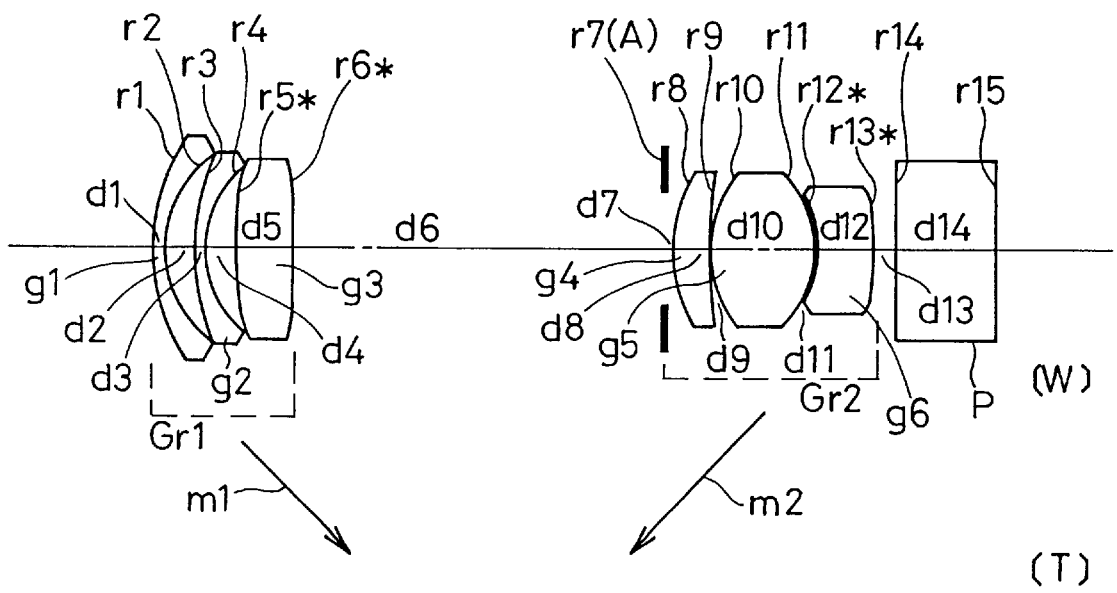
FIG. 2 is a lens arrangement diagram of a second embodiment of the invention.
Figure 3:
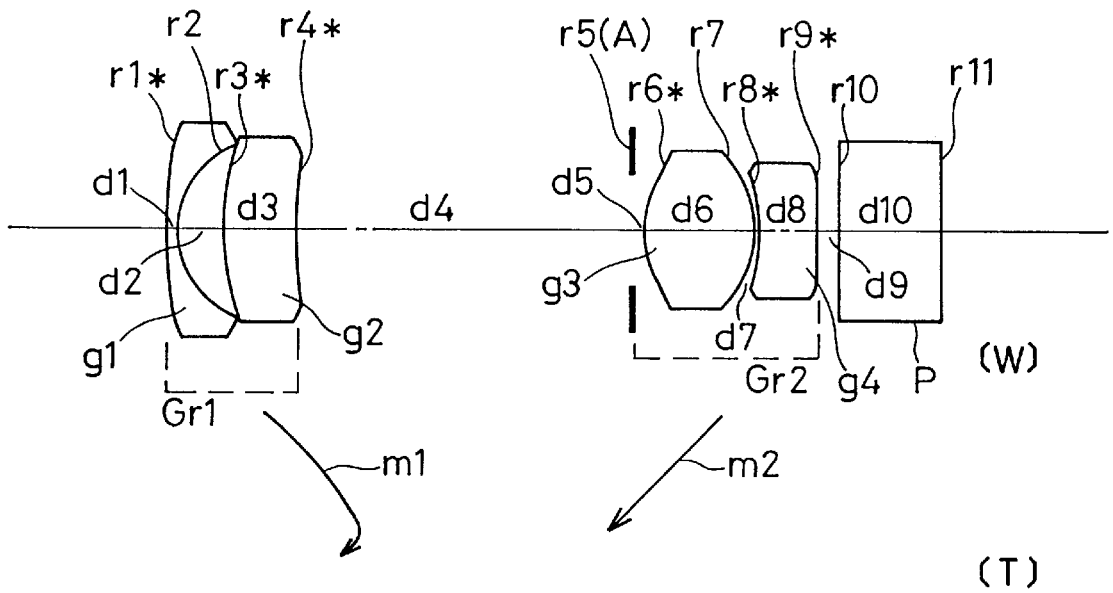
FIG. 3 is a lens arrangement diagram of a third embodiment of the invention.
Figure 4:
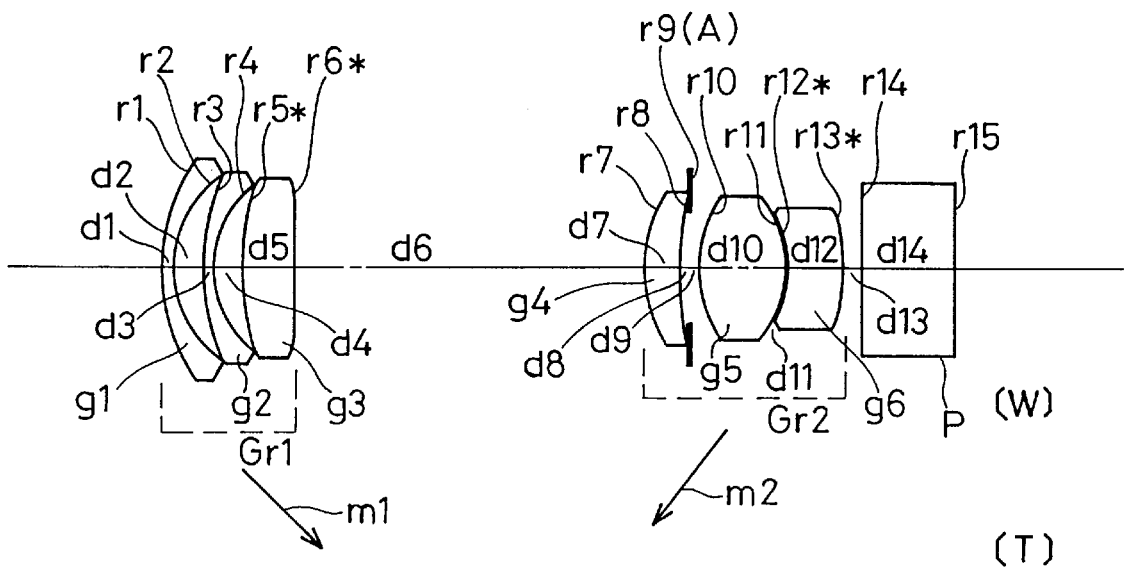
FIG. 4 is a lens arrangement diagram of a fourth embodiment of the invention.

FIGS. 1 to 4 are lens arrangement diagrams of the zoom lens systems of a first to a fourth embodiment, respectively, each showing the lens arrangement at the wide-angle end [W]. In FIGS. 1 to 4, arrows m1 and m2 schematically indicate the movement of the first and second lens units Gr1 and Gr2, respectively, during zooming from the wide-angle end [W] to the telephoto end [T]. In these lens arrangements diagrams, ri (i=1, 2, 3, . . . ) indicates the ith surface from the object side, di (i=1, 2, 3, . . . ) indicates the ith axial distance from the object side, and gi (i=1, 2, 3, . . . ) indicates the ith lens element from the object side; a surface whose symbol ri is marked with an asterisk (*) is an aspherical surface.

In all of the first to fourth embodiments, the zoom lens system consists of, from the object side, a first lens unit Gr1 having a negative optical power and a second lens unit Gr2 having a positive optical power, performs zooming by varying the distance of the air space between the first and second lens units Gr1 and Gr2, and is provided with a low-pass filter P at its image-side end.

In the first embodiment (FIG. 1), each lens unit is constructed, from the object side, as follows. The first lens unit Gr1 is composed of a negative meniscus lens element g1 concave to the image side, and a positive meniscus lens element g2 (having aspherical surfaces on both sides) convex to the object side. The second lens unit Gr2 is composed of an aperture diaphragm A, a positive biconvex lens element g3, and a negative biconcave lens element g4 (having aspherical surfaces on both sides).

In the second embodiment (FIG. 2), each lens unit is constructed, from the object side, as follows. The first lens unit Gr1 is composed of two negative meniscus lens elements g1 and g2 both concave to the image side, and a positive meniscus lens element g3 (having aspherical surfaces on both sides) convex to the object side. The second lens unit Gr2 is composed of an aperture diaphragm A, a positive meniscus lens element g4 convex to the object side, a positive biconvex lens element g5, and a negative meniscus lens element g6 (having aspherical surfaces on both sides) concave to the object side.

In the third embodiment (FIG. 3), each lens unit is constructed, from the object side, as follows. The first lens Gr1 is composed of a negative meniscus lens element g1 (having an aspherical surface on the object side) concave to the image side, and a positive meniscus lens element g2 (having aspherical surfaces on both sides) convex to the object side. The second lens unit Gr2 is composed of an aperture diaphragm A, a positive biconvex lens element g3 (having an aspherical surface on the object side), and a negative meniscus lens element g4 (having aspherical surfaces on both sides) concave to the object side.

In the fourth embodiment (FIG. 4), each lens unit is constructed, from the object side, as follows. The first lens Gr1 is composed of two negative meniscus lens elements g1 and g2 both concave to the image side, and a positive meniscus lens element g3 (having aspherical surfaces on both sides) convex to the object side. The second lens unit Gr2 is composed of a positive meniscus lens element g4 convex to the object side, an aperture diaphragm A, a positive biconvex lens element g5, and a negative meniscus lens element g6 (having aspherical surfaces on both sides) concave to the object side).

In all of the first to fourth embodiments, the zoom lens system fulfills condition (1) below:

$$0.2 < \frac{T_{1-2}}{Y'} < 0.8 \qquad (1)$$

where $T_{1-2}$ represents the distance of the air space between the first and second lens units Gr1 and Gr2 at the telephoto end [T] (i.e. in the longest focal length condition); and Y' represents the maximum image height.

In a zoom lens system constructed as in the first to fourth embodiments described above, it is at the telephoto end [T] that the distance $T_{1-2}$ of the air space between the first and second lens units Gr1 and Gr2 takes the smallest value within the entire zoom range. Condition (1) defines, in the form of a ratio of the air-space distance $T_{1-2}$ to the maximum image height Y', the condition to be fulfilled to keep the size of the zoom lens system appropriate and make the construction of lens barrels possible. If the upper limit of condition (1) is exceeded, the distance $T_{1-2}$ of the air space between the first and second lens units Gr1 and Gr2 at the telephoto end [T] is too great relative to the maximum image height Y'. As a result, the total length of the zoom lens system from the wide-angle end [W] to the telephoto end [T] as well as the diameter of the front lens element becomes unduly large. By contrast, if the lower limit of condition (1) is exceeded, the air-space distance $T_{1-2}$ is too small. As a result, when the camera suffers a shock, the first lens unit Gr1 may collide with the second lens unit Gr2 or the aperture diaphragm A, and in addition, when the first lens unit Gr1 is used for focusing, it is not possible to secure a sufficiently long adjustment stroke.

In all of the first to fourth embodiments, the zoom lens system fulfills condition (2) below:

$$0.1 < \left|\frac{f_1}{f_2}\right| \cdot \frac{1}{Z} < 0.6 \qquad (2)$$

where $f_1$ represents the focal length of the first lens unit;
$f_2$ represents the focal length of the second lens unit; and
Z represents the zoom ratio.

Condition (2) defines, in the form of a ratio of the focal-length ratio between the first and second lens units Gr1 and Gr2 to the zoom ratio, the condition to be fulfilled to strike a balance between the total length and the aberration characteristics. If the upper limit of condition (2) is exceeded, the focal-length range $f_1/f_2$ between the first and second lens units Gr1 and Gr2 is too great relative to the zoom ratio Z. As a result, the peripheral illumination becomes insufficient in the range from the wide-angle end [W] to the middle-focal-length position [M] and thus the diameter of the front lens element needs to be made unduly large. By contrast, if the lower limit of condition (2) is exceeded, the focal-length ratio $f_1/f_2$ between the first and second lens units Gr1 and Gr2 is too small relative to the zoom ratio Z. As a result, the negative distortion becomes unduly large at the wide-angle end [W].

In the first and third embodiments, the lens element g2 in the first lens unit Gr1 and the lens element g3 in the second lens unit Gr2 have a positive optical power. In the second and fourth embodiments, the lens element g3 in the first lens unit Gr1 and the lens elements g4 and g5 in the second lens unit Gr2 have a positive optical power. In this way, in any of the first to fourth embodiments described above, the first and second lens units Gr1 and Gr2 each include at least one positive lens element, and each positive lens element satisfies condition (3) below.

$$0.60 < \frac{K}{T} < 0.99 \qquad (3)$$

where

K represents the thickness of the positive lens element at the height equal to the effective radius on that side of the positive lens element on which the effective radius is larger; and T represents the thickness of the positive lens element on the optical axis.

Condition (3) defines the condition to be fulfilled to obtain an appropriate shape of the positive lens element. If the upper limit of condition (3) is exceeded, the lens is so thick that it is no longer possible to keep the entire zoom lens system acceptably compact. By contrast, if the lower limit of condition (3) is exceeded, the lens has so unusual a shape that it cannot be produced without extra cost.

In all of the first to fourth embodiments, the zoom lens system fulfills condition (4) below.

$$1.0 < Y' \times RL < 4.5 \qquad (4)$$

where

Y' represents the maximum image height; and

RL represents the effective radius of the most image-side surface of the entire zoom lens system.

Condition (4) defines the condition to be fulfilled to keep the size as well as the aberration and other characteristics of the zoom lens system appropriate. Usually, in front of each light-sensing element of a solid-state image-sensing device (such as CCD), a microlens is provided to condense light efficiently. To make the most of this microlens, it is essential to let rays enter the microlens approximately parallel to its optical axis. To achieve this, it is necessary to design the entire zoom lens system to be approximately telecentric. If the upper limit of condition (4) is exceeded, the entire zoom lens system is too telecentric. As a result, the negative distortion becomes unduly large at the wide-angle end [W], and in addition the inclination of the image plane toward the under side becomes unduly large. By contrast, if the lower limit of condition (4) is exceeded, it is difficult to make the entire zoom lens system approximately telecentric. As a result, even if the entire zoom lens system can be made approximately telecentric, the back focal length becomes unduly large and thus the zoom lens system as a whole becomes unduly large.

In any of the first to fourth embodiments described above, the first lens unit Gr1 includes at least one aspherical surface. By providing an aspherical surface in the first lens unit Gr1 in this way, it is possible to achieve more effective correction of aberrations (particularly the distortion and the curvature of field at the wide-angle end [W]. It is preferable that each aspherical surface provided in the first lens unit Gr1 fulfill condition (5) below.

$$-2.0 < \{|x|-|x0|\}/\{C0\cdot(N'-N)\cdot f1\} < 0 \qquad (5)$$

where x represents the surface shape of the aspherical surface;

x0 represents the surface shape of the reference spherical surface;

C0 represents the curvature of the reference spherical surface;

N' represents the reflective index of the medium that exists on the image side of the aspherical surface; and N represents the reflective index of the medium that exists on the object side of the aspherical surface.

Note that x and x0 in condition (5) above are defined by formulae (AS) and (RE) below.

$$x = \{C0\cdot y^2\}/\{1 + \sqrt{1 - \varepsilon \cdot C0^2 \cdot y^2}\} + \sum A_i \cdot y^i \qquad (AS)$$

-continued $$x0 = \{C0\cdot y^2\}/\{1 + \sqrt{1 - C0^2 \cdot y^2}\} \qquad (RE)$$

where y represents the height in a direction perpendicular to the optical axis;

ε represents the quadric surface parameter; and

Ai represents the aspherical coefficient of the ith order.

Condition (5) predetermines the aspherical surface to be so shaped that it acts to weaken the negative optical power of the first lens unit Gr1, and thus defines the condition to be fulfilled to achieve proper correction of aberrations particularly the distortion at the wide-angle end [W] and the curvature of field in the range from the wide-angle end [W] to the middle-focal-length position [M]. If the upper limit of condition (5) is exceeded, the negative distortion becomes unduly large at the wide-angle end [W], and the shift of the image plane in the negative direction becomes unduly large in the range from the wide-angle end [W] to the middle-focal-length position [M]. By contrast, if the lower limit of condition (5) is exceeded, the positive distortion becomes unduly large at the wide-angle end [W], and the shift of the image plane in the positive direction becomes unduly large in the range from the wide-angle end [W] to the middle-focal-length position [M].

In addition, in any of the first to fourth embodiments described above, the second lens unit Gr2 includes at least one aspherical surface. By providing an aspherical surface in the second lens unit Gr2 in this way, it is possible to achieve more effective correction of aberrations (particularly the spherical aberration in the range from the middle-focal-length position [M] to the telephoto end [T]). It is preferable that each aspherical surface provided in the second lens unit Gr2 fulfill condition (6) below.

$$-0.5 < \{|x|-x0|\}/\{C0\cdot(N'-N)\cdot f2\} < 0 \qquad (6)$$

Condition (6) predetermines the aspherical surface to be so shaped that it acts to weaken the positive optical power of the second lens unit Gr2, and thus defines the condition to be fulfilled to achieve proper correction of aberrations, particularly the spherical aberration in the range from the middle-focal-length position [M] to the telephoto end [T]. If the upper limit of condition (6) is exceeded, the spherical aberration appears more on the under side. By contrast, if the lower limit of condition (6) is exceeded, the spherical aberration appears more on the over side.

In the first to fourth embodiments described above, all lens units are composed solely of refracting lens elements that deflect incoming rays through refraction. However, the lens unit may include a diffracting lens element that deflects incoming rays through diffraction, or even a refracting-diffracting hybrid-type lens element that deflects incoming rays through the combined effect of refraction and diffraction.

Tables 1 to 4 list the construction data of examples of the zoom lens systems of the first to fourth embodiments described above. In the construction data of each embodiment, ri (i=1, 2, 3, . . . ) represents the radius of curvature of the ith surface from the object side, di (i=1, 2, 3, . . . ) represents the ith axial distance from the object side, and Ni (i=1, 2, 3, . . . ) and vi (i=1, 2, 3, . . . ) respectively represent the refractive index (Nd) and the Abbe number (vd) for d-line of the ith optical element from the object side. Moreover, in the construction data, for each of the axial distances that vary with zooming (i.e. the variable axial distances), three values are given that are, from left, the axial distance between the lens units at the wide-angle end [W], the same distance at the middle-focal-length position [M], and the same distance at the telephoto end [T]. Listed together with the construction data are the focal length f and the f-number FNO of the entire zoom lens system in those three focal-length conditions [W], [M], and [T].

Furthermore, in the construction data, a surface whose radius of curvature ri is marked with an asterisk (*) is an aspherical surface, whose surface shape is defined by formula (AS) noted earlier. Also listed for each embodiment together with the construction data are the values corresponding to conditions (5) and (6) that define aspherical surfaces (note that, there, ymax represents the maximum height of an aspherical surface in a direction perpendicular to its optical axis). On the other hand, Table 5 lists, for each embodiment, the values corresponding to conditions (1) to (4).

Figure 5A:
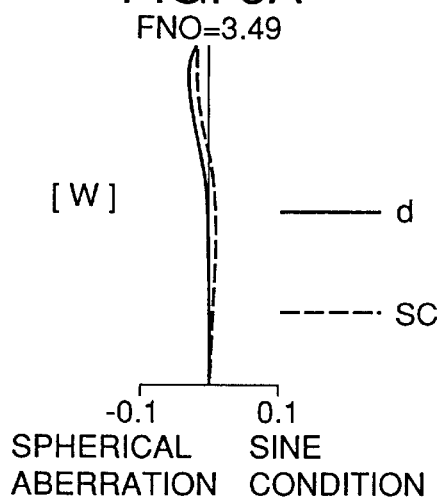
FIGS. 5A to 5I are aberration diagrams of the first embodiment.
Figure 5B:
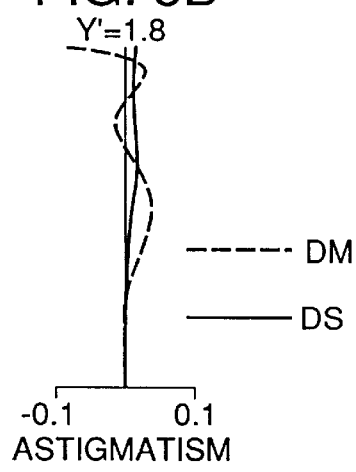
Figure 5C:
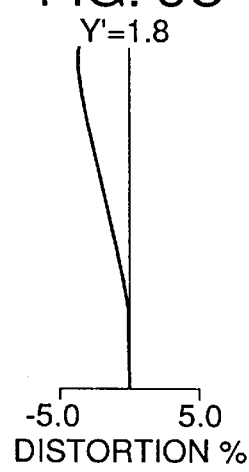
Figure 5D:
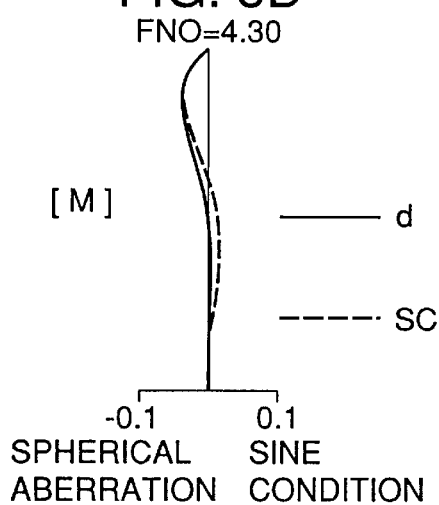
Figure 5E:
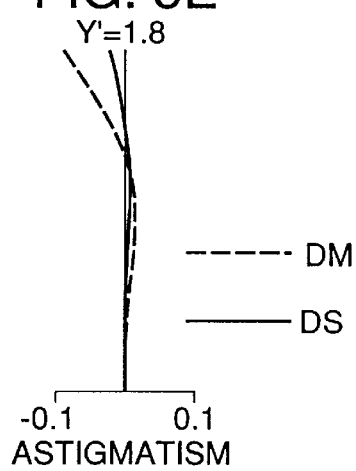
Figure 5F:
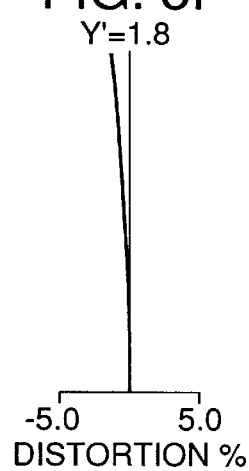
Figure 5G:
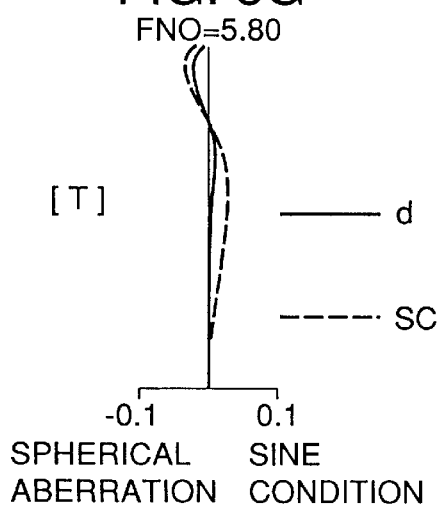
Figure 5H:
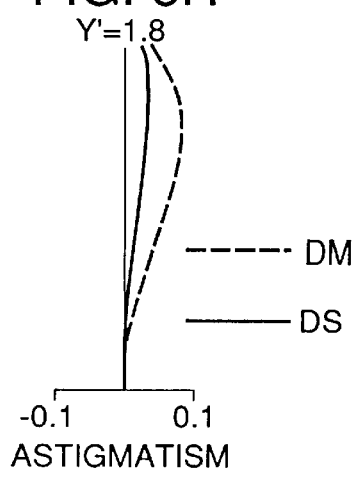
Figure 5I:
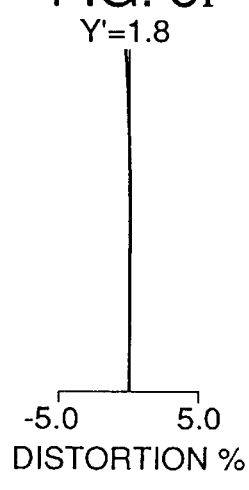
Figure 6A:
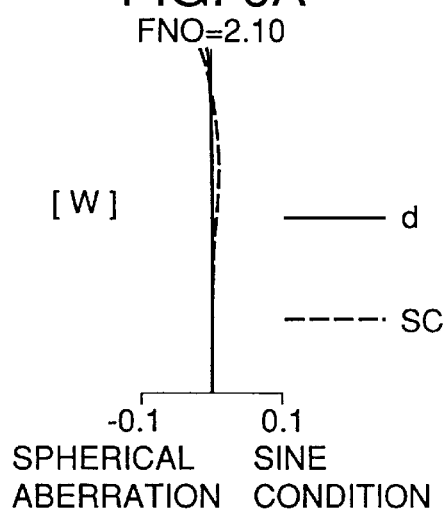
FIGS. 6A to 6I are aberration diagrams of the second embodiment.
Figure 6B:
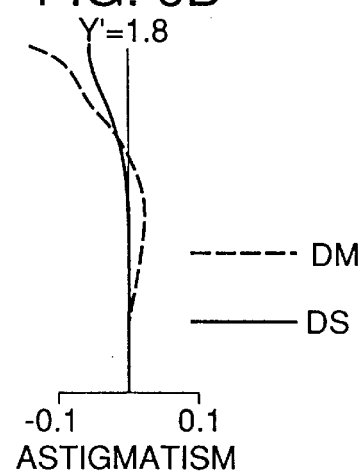
Figure 6C:
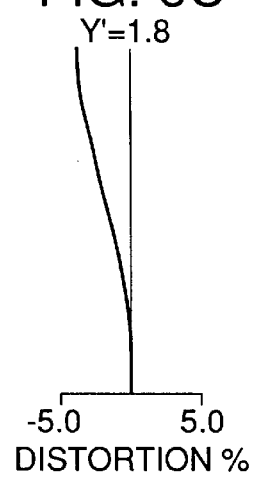
Figure 6D:
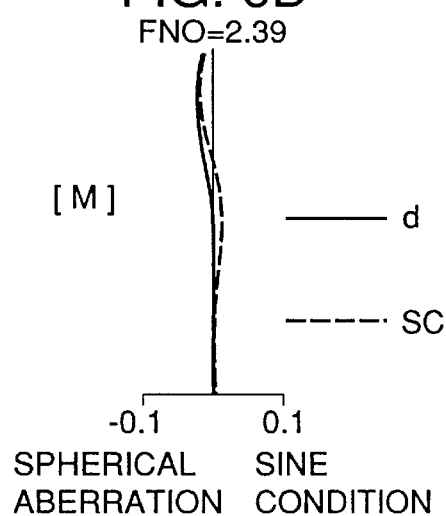
Figure 6E:
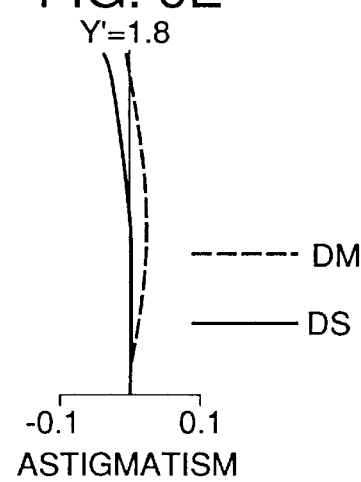
Figure 6F:
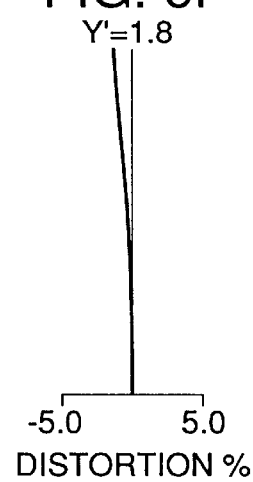
Figure 6G:
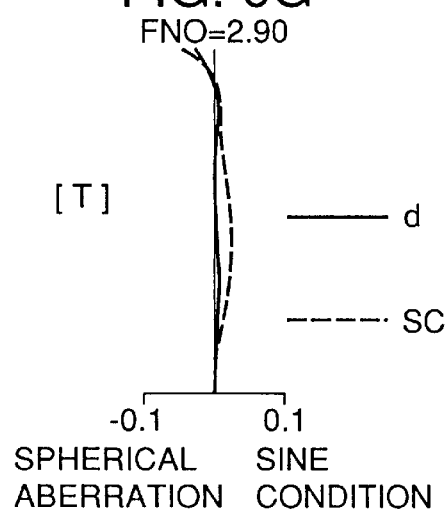
Figure 6H:
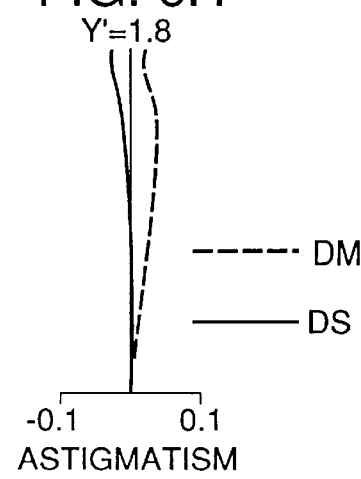
Figure 6I:
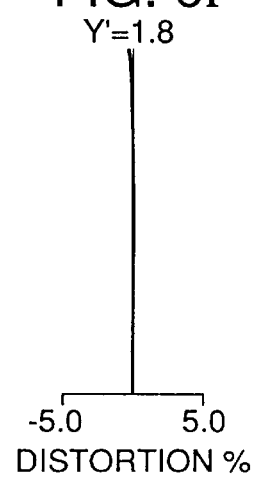
Figure 7A:
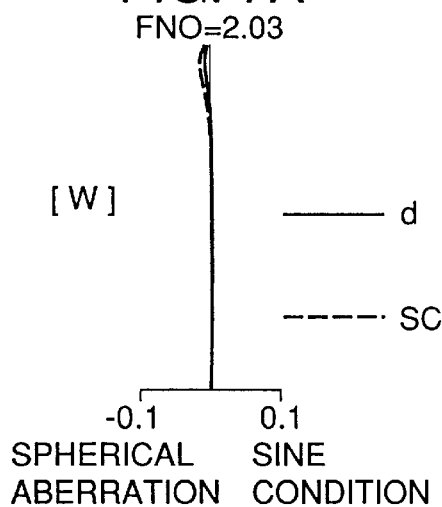
FIGS. 7A to 7I are aberration diagrams of the third embodiment.
Figure 7B:
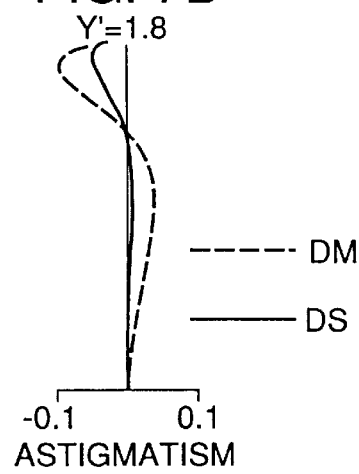
Figure 7C:
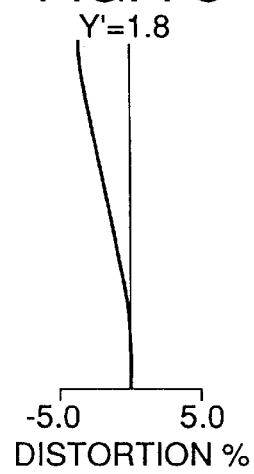
Figure 7D:
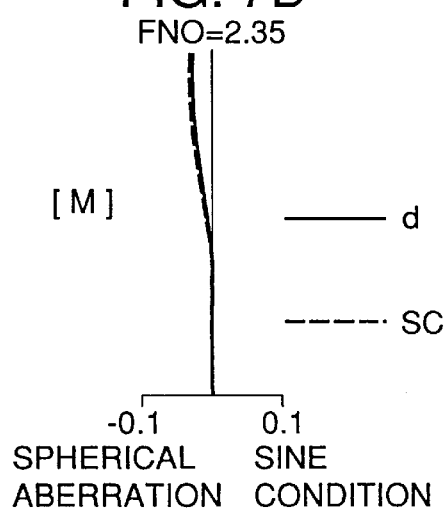
Figure 7E:
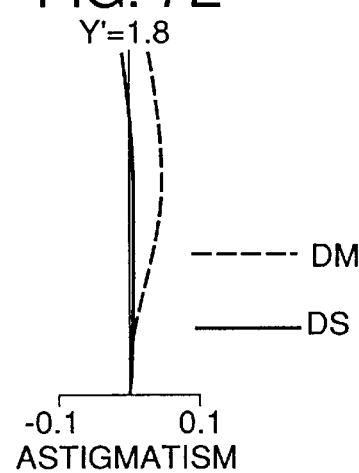
Figure 7F:
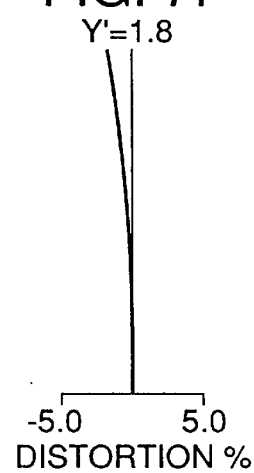
Figure 7G:
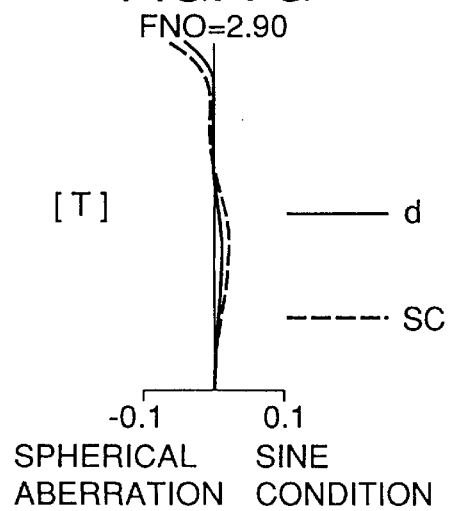
Figure 7H:
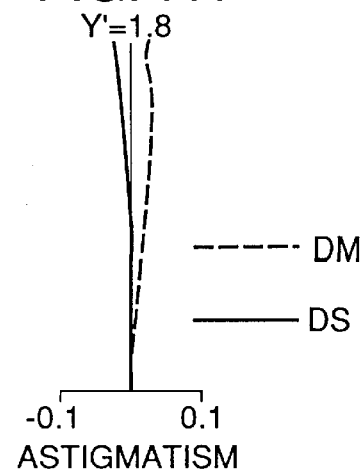
Figure 7I:
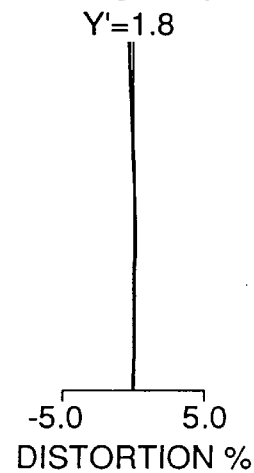
Figure 8A:
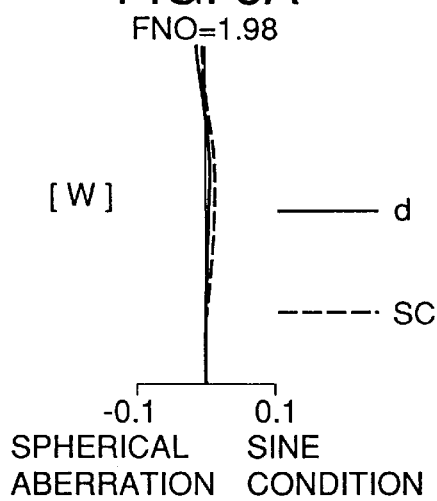
FIGS. 8A to 8I are aberration diagrams of the fourth embodiment.
Figure 8B:
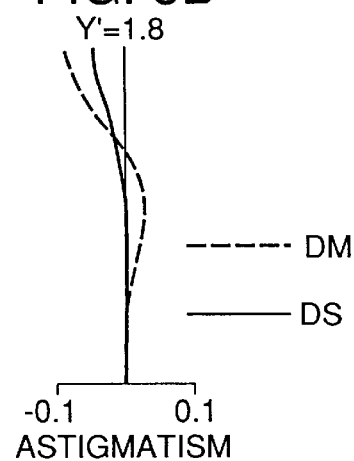
Figure 8C:
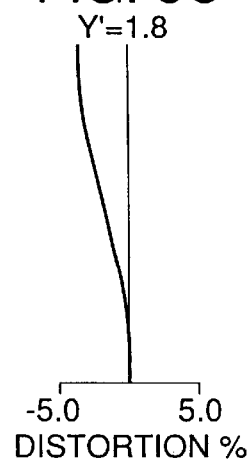
Figure 8D:
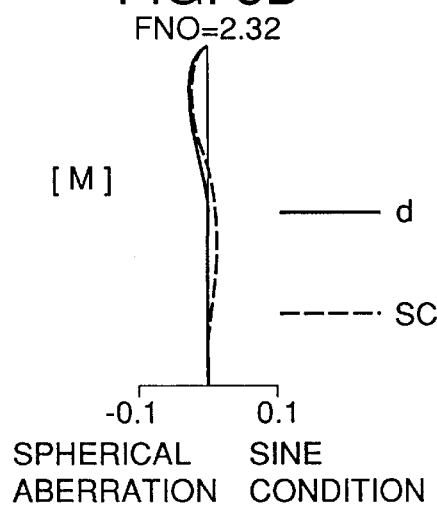
Figure 8E:
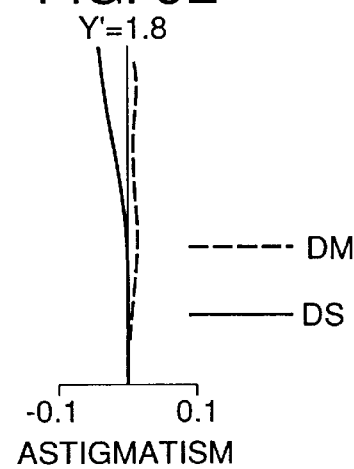
Figure 8F:
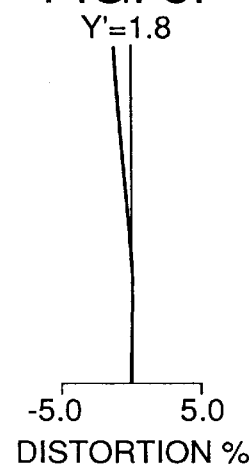
Figure 8G:
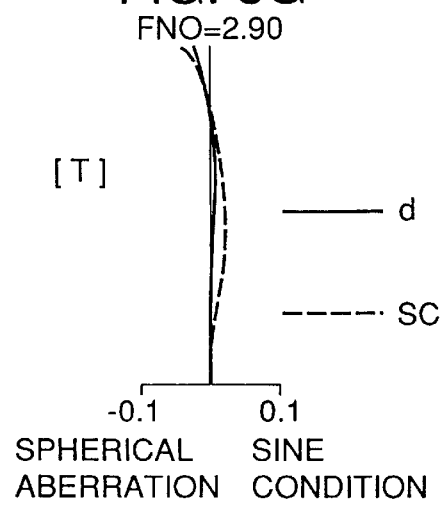
Figure 8H:
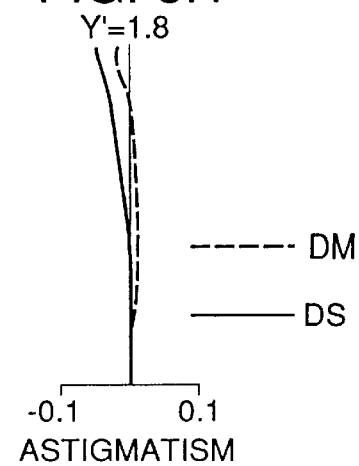
Figure 8I:
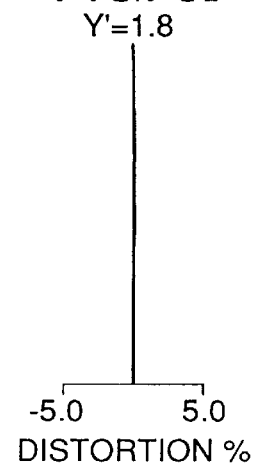

FIGS. 5A–5I, 6A–6I, 7A–7I, and 8A–8I are aberration diagrams of the examples of the first to fourth embodiments, respectively. Of these aberration diagrams, FIGS. 5A–5C, 6A–6C, 7A–7C, and 8A–8C show the aberrations observed at the wide-angle end [W], FIGS. 5D–5F, 6D–6F, 7D–7F, and 8D–8F show the aberrations observed at the middle-focal-length position [M], and FIGS. 5G–5I, 6G–6I, 7G–7I, and 8G–8I show the aberrations observed at the telephoto end [T], with FIGS. 5A, 5D, 5G, 6A, 6D, 6G, 7A, 7D, 7G, 8A, 8D and 8G showing the spherical aberration and sine condition, FIGS. 5B, 5E, 5H, 6B, 6E, 6H, 7B, 7E, 7H, 8B, 8E, and 8H showing the astigmatism, and FIGS. 5C, 5F, 5I, 6C, 6F, 6I, 7C, 7F, 7I, 8C, 8F, and 8I showing the distortion. In the spherical aberration diagrams, the solid line (d) and the broken line (SC) show the spherical aberration for d-line and the sine cognition, respectively; in the astigmatism diagrams, the broken line (DM) and the solid line (DS) show the astigmatism for d-line on the meridional plane and on the sagittal plane, respectively.

Figure 10:
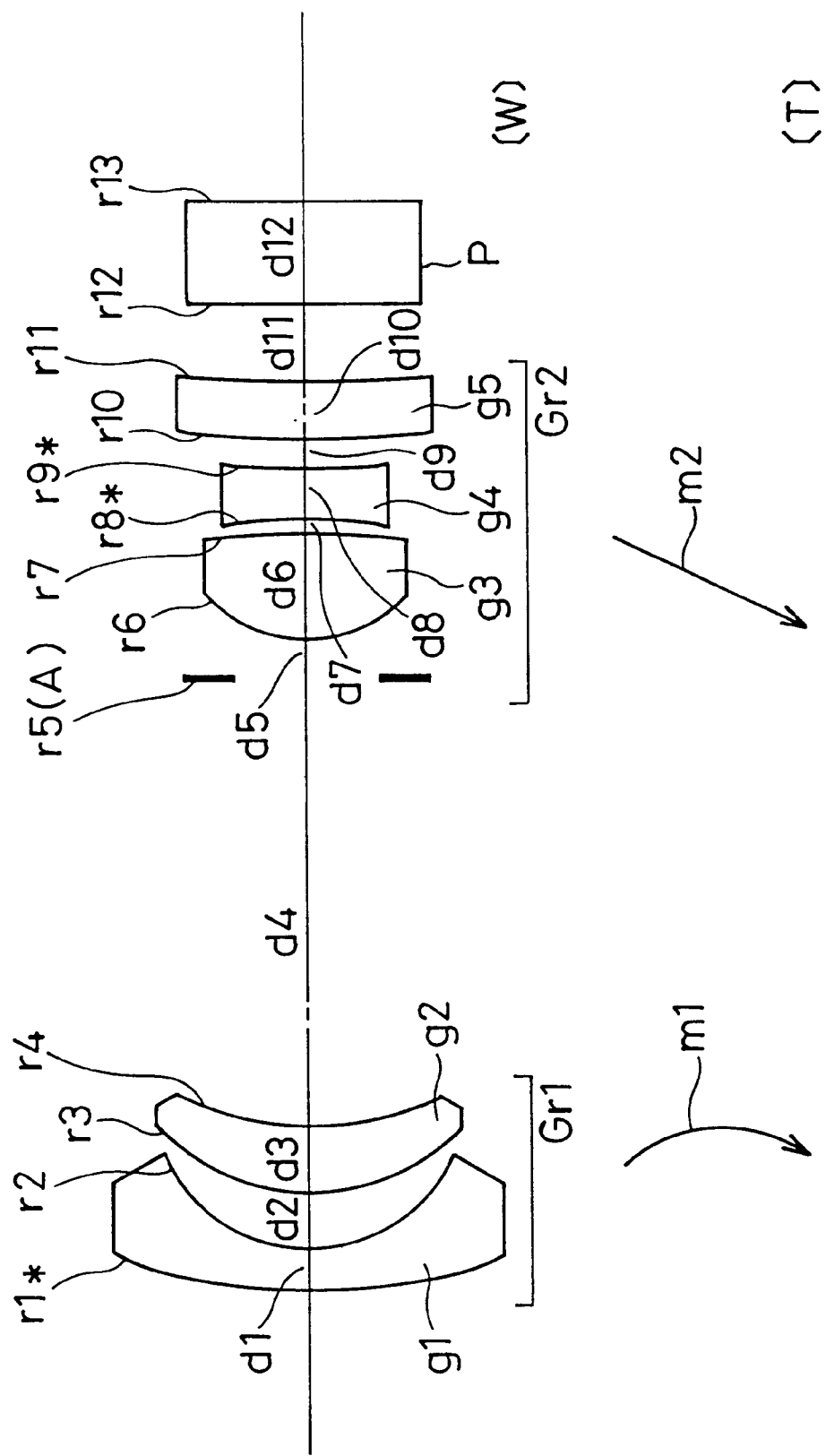
FIG. 10 is a lens arrangement diagram of a sixth embodiment of the invention.
Figure 11:
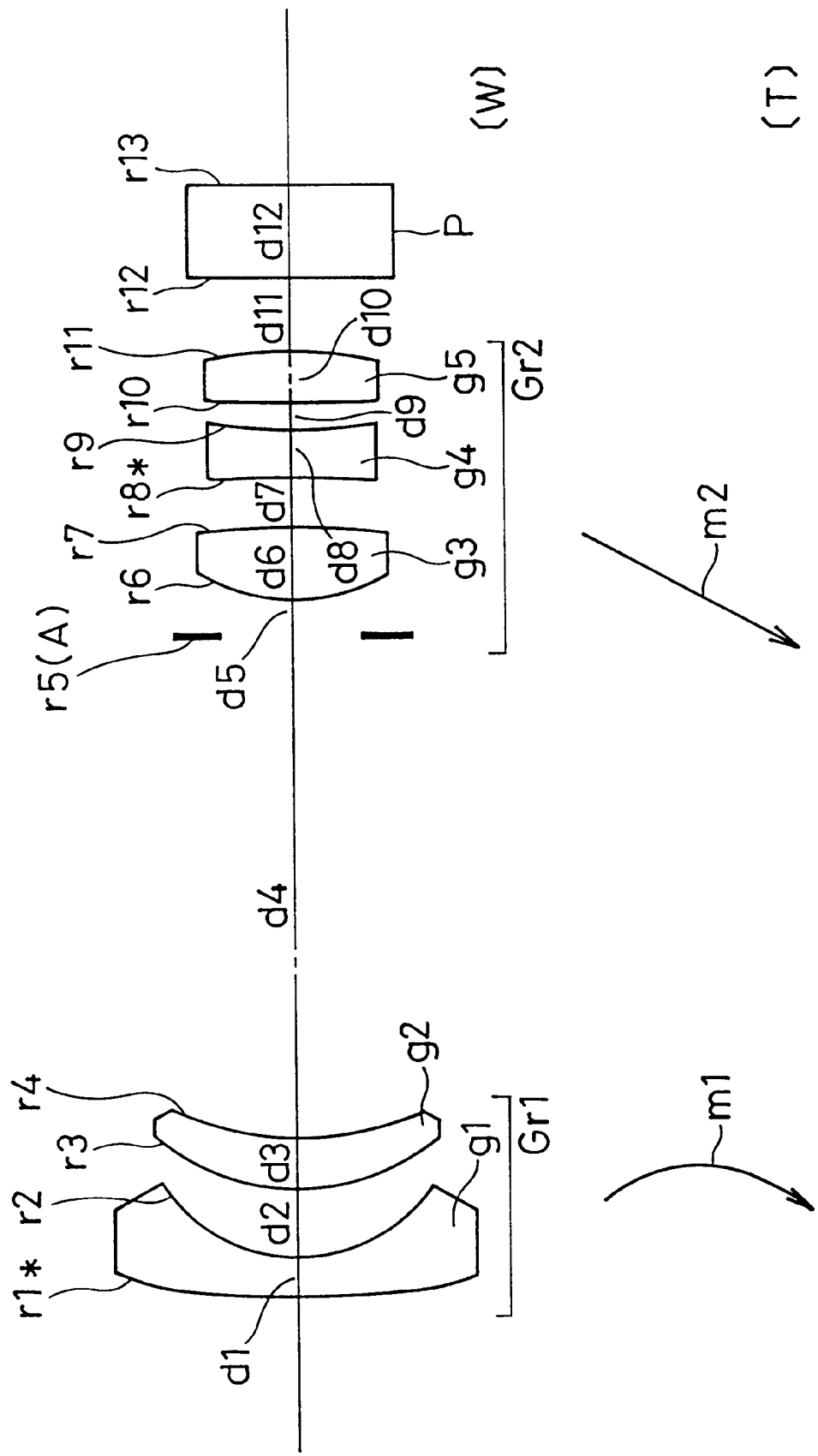
FIG. 11 is a lens arrangement diagram of a seventh embodiment of the invention.
Figure 12:
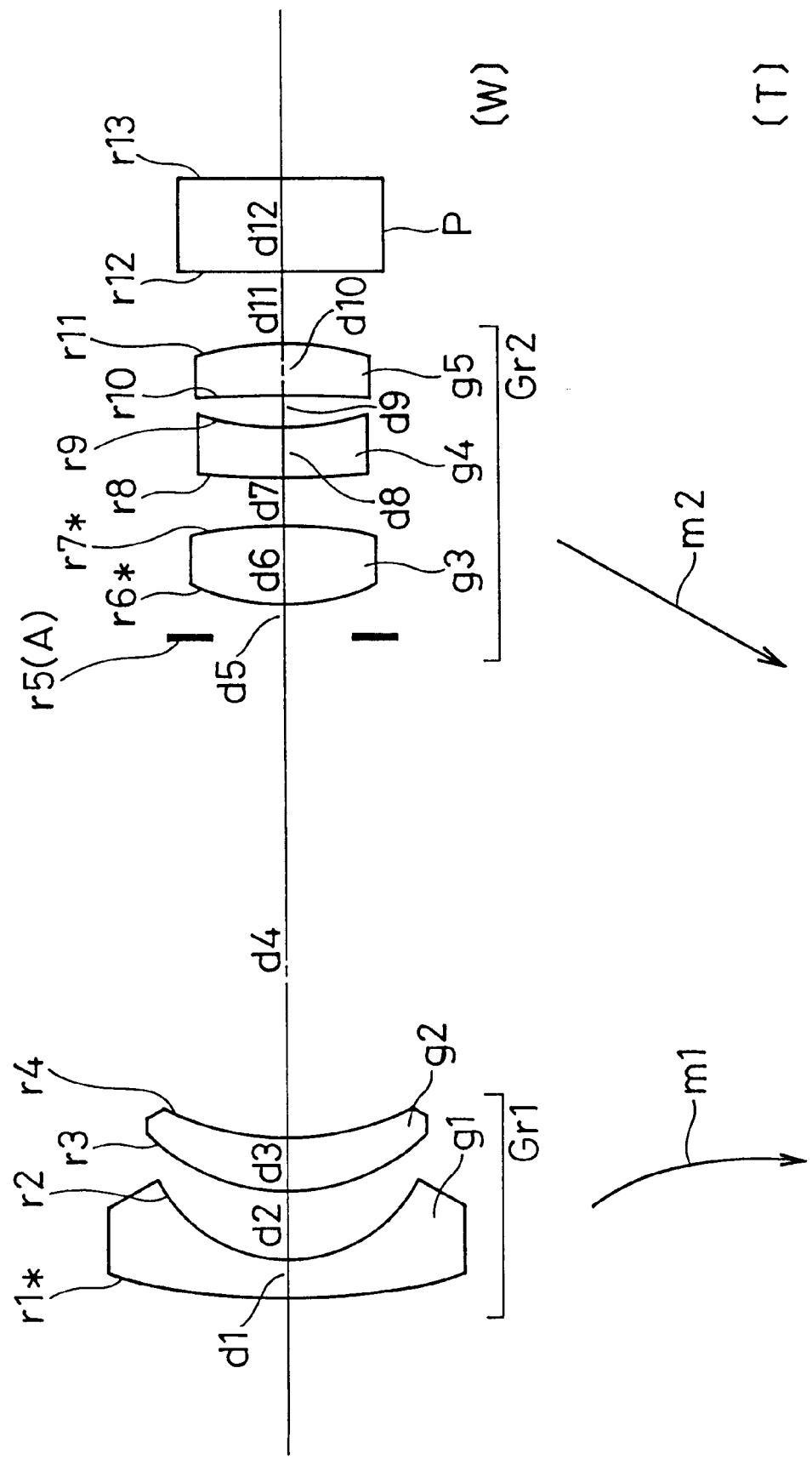
FIG. 12 is a lens arrangement diagram of a eighth embodiment of the invention.
Figure 13:
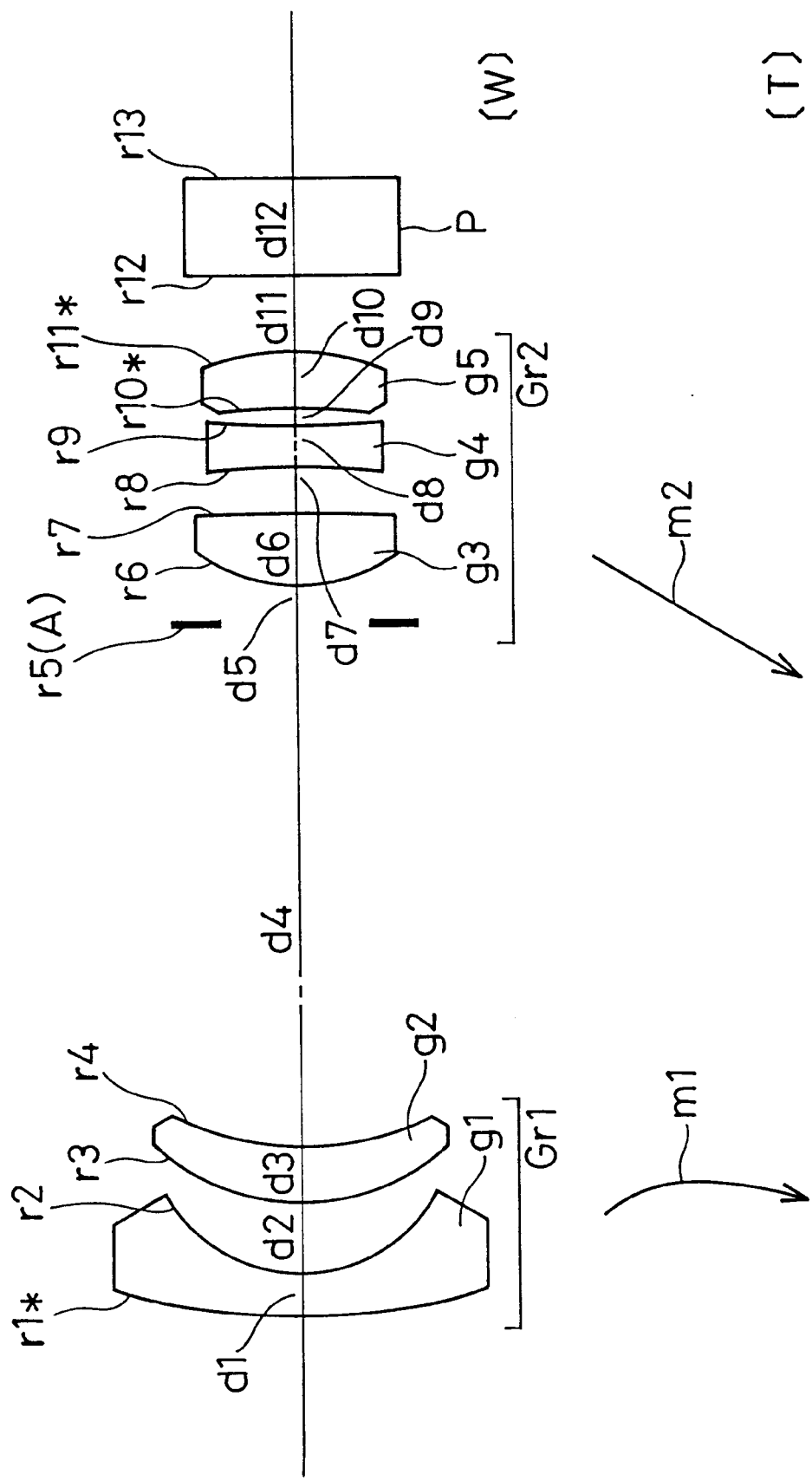
FIG. 13 is a lens arrangement diagram of a ninth embodiment of the invention.
Figure 14:
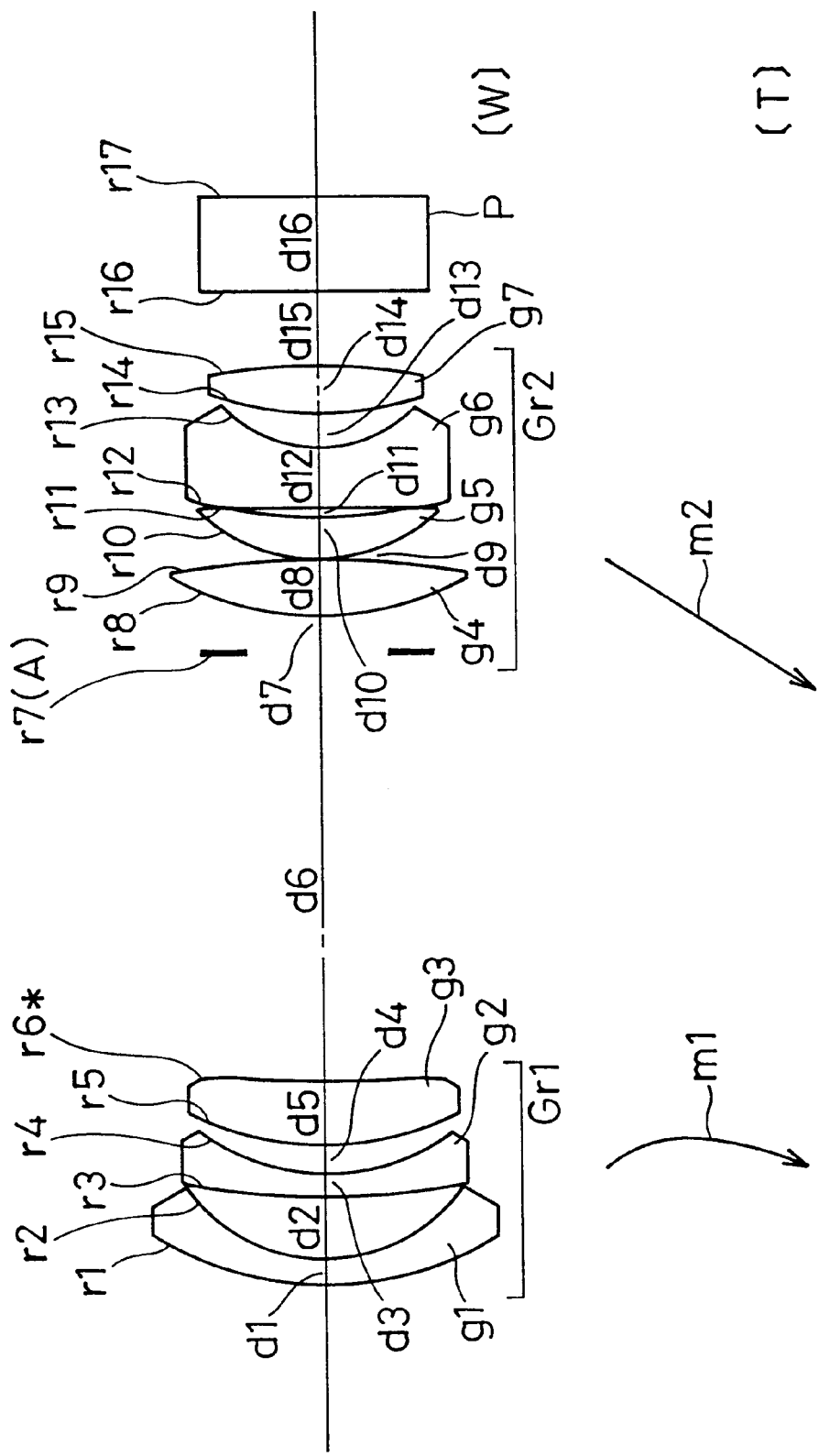
FIG. 14 is a lens arrangement diagram of a tenth embodiment of the invention.
Figure 15:
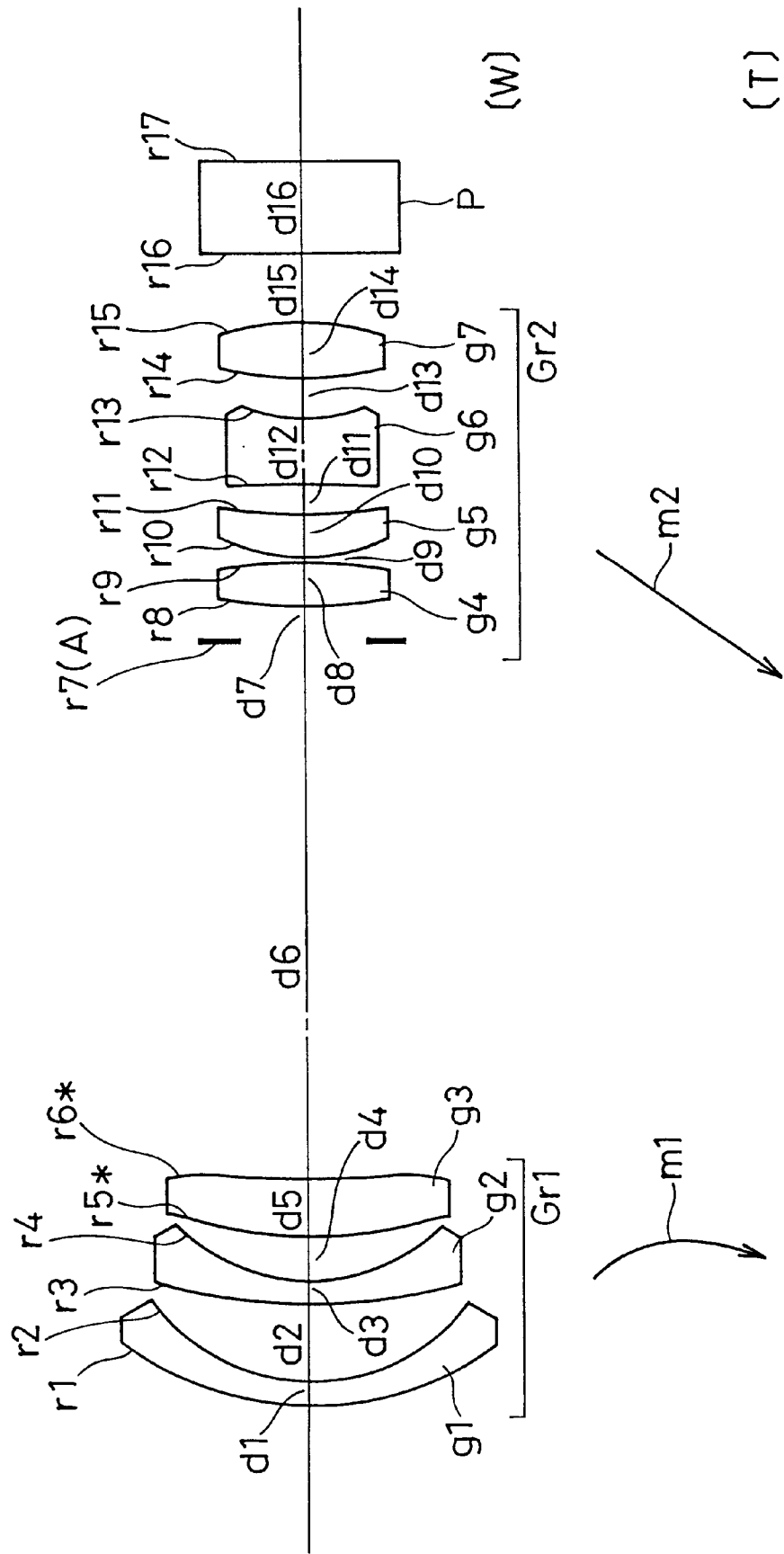
FIG. 15 is a lens arrangement diagram of a eleventh embodiment of the invention.
Figure 16:
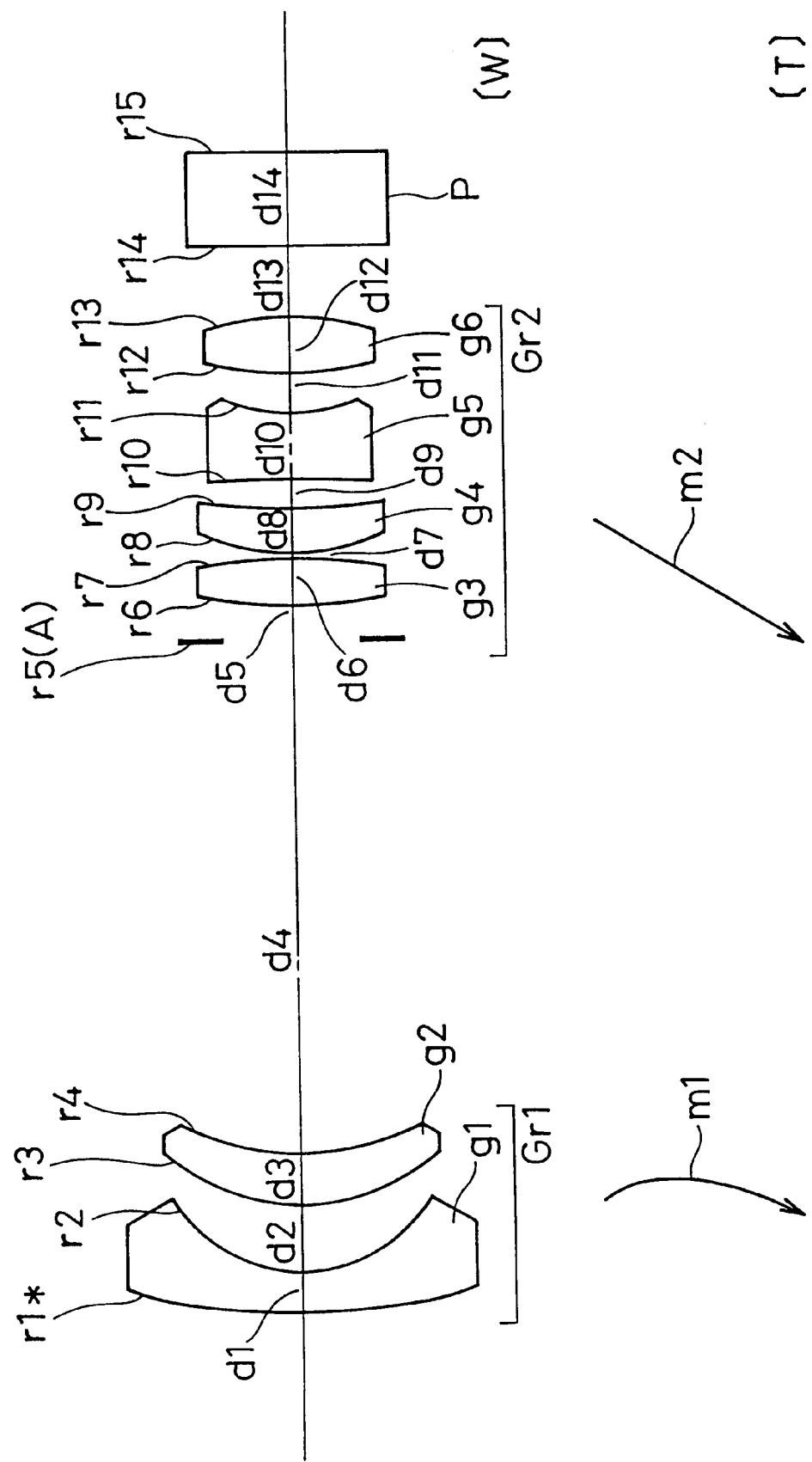
FIG. 16 is a lens arrangement diagram of a twelfth embodiment of the invention.
Figure 17:
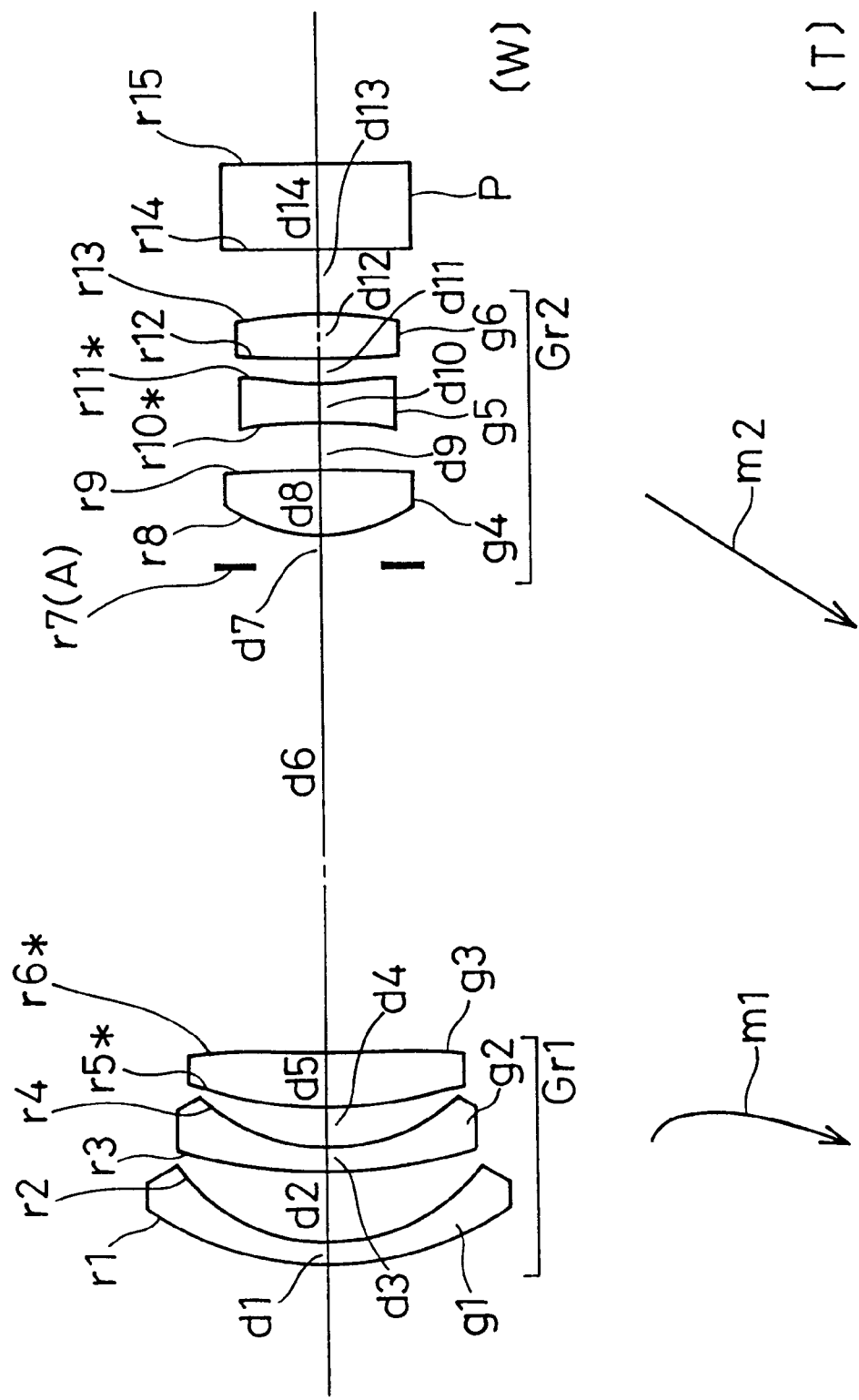
FIG. 17 is a lens arrangement diagram of a thirteenth embodiment of the invention.

FIGS. 9 to 17 are lens arrangement diagrams of the zoom lens systems of a fifth to a thirteenth embodiment, respectively, each showing the lens arrangement at the wide-angle end [W]. In FIGS. 9 to 17, arrows m1 and m2 schematically indicate the movement of the first and second lens units Gr1 and Gr2, respectively, during zooming from the wide-angle end [W] to the telephoto end [T]. In these lens arrangement diagrams, ri (i=1, 2, 3, . . . ) indicates the ith surface from the object side, di (i=1, 2, 3, . . . ) indicates the ith axial distance from the object side, and gi (i=1, 2, 3, . . . ) indicates the ith lens element from the object side; a surface whose symbol ri is marked with an asterisk (*) is an aspherical surface.

In all of the fifth to thirteenth embodiments, the zoom lens system consists of, from the object side, a first lens unit Gr1 having a negative optical power and a second lens unit Gr2 having a positive optical power, performs zooming by varying the distance of the air space between the first and second lens units Gr1 and Gr2, and is provided with a low pass filter P at its image-side end.

In the fifth embodiment (FIG. 9), each lens unit is constructed, from the object side, as follows. The first lens unit Gr1 is composed of a negative meniscus lens element g1 (having an aspherical surface on the object side) concave to the image side, and a positive meniscus lens element g2 convex to the object side. The second lens unit Gr2 is composed of an aperture diaphragm A, a positive biconvex lens element g3, a negative biconcave lens element g4 (having aspherical surfaces on both sides), and a positive biconvex lens element g5.

In the sixth embodiment (FIG. 10), each lens unit is constructed, from the object side, as follows. The first lens unit Gr1 is composed of a negative meniscus lens element g1 (having an aspherical surface on the object side) concave to the image side, and a positive meniscus lens element g2 convex to the object side. The second lens unit Gr2 is composed of an aperture diaphragm A, a positive biconvex lens element g3, a negative biconcave lens element g4 (having aspherical surfaces on both sides), and a positive meniscus lens element g5 convex to the object side.

In the seventh embodiment (FIG. 11), each lens unit is constructed, from the object side, as follows. The first lens unit Gr1 is composed of a negative meniscus lens element g1 (having an aspherical surface on the object side) concave to the image side, and a positive meniscus lens element g2 convex to the object side. The second lens unit Gr2 is composed of an aperture diaphragm A, a positive biconvex lens element g3, a negative biconcave lens element g4 (having an aspherical surface on the object side), and a positive biconvex lens element g5.

In the eighth embodiment (FIG. 12), each lens unit is constructed, from the object side, as follows. The first lens unit Gr1 is composed of a negative meniscus lens element g1 (having an aspherical surface on the object side) concave to the image side, and a positive meniscus lens element g2 convex to the object side. The second lens unit Gr2 is composed of an aperture diaphragm A, a positive biconvex lens element g3 (having aspherical surfaces on both sides), a negative meniscus lens element g4 concave to the image side, and a positive meniscus lens element g5 convex to the image side.

In the ninth embodiment (FIG. 13), each lens unit is constructed, from the object side, as follows. The first lens unit Gr1 is composed of a negative meniscus lens element g1 (having an aspherical surface on the object side) concave to the image side, and a positive meniscus lens element g2 convex to the object side. The second lens unit Gr2 is composed of an aperture diaphragm A, a positive biconvex lens element g3, a negative biconcave lens element g4 and a positive meniscus lens element g5 (having aspherical surfaces on both sides) convex to the image side.

In the tenth embodiment (FIG. 14), each lens unit is constructed, from the object side, as follows. The first lens unit Gr1 is composed of two negative meniscus lens elements g1 and g2 both concave to the image side, and a positive meniscus lens element g3 (having an aspherical surface on the image side) convex to the object side. The second lens unit Gr2 is composed of an aperture diaphragm A, a positive biconvex lens element g4, a positive lens element g5 convex to the object side, a negative biconcave lens element g6, and a positive biconvex lens element g7.

In the eleventh embodiment (FIG. 15), each lens unit is constructed, from the object side, as follows. The first lens unit Gr1 is composed of two negative meniscus lens elements g1 and g2 both concave to the image side, and a positive meniscus lens element g3 (having aspherical surfaces on both sides) concave to the object side. The second lens unit Gr2 is composed of an aperture diaphragm A, a positive biconvex lens element g4, a positive lens element g5 convex to the object side, a negative biconcave lens element g6, and a positive biconvex lens element g7.

In the twelfth embodiment (FIG. 16), each lens unit is constructed, from the object side, as follows. The first lens unit Gr1 is composed of a negative meniscus lens element g1 (having an aspherical surface on the object side) concave to the image side, and a positive meniscus lens element g2 convex to the object side. The second lens unit Gr2 is composed of an aperture diaphragm A, a positive biconvex lens element g3, a positive meniscus lens element g4 convex to the object side, a negative biconcave lens element g5, and a positive biconvex lens element g6.

In the thirteenth embodiment (FIG. 17), each lens unit is constructed, from the object side, as follows. The first lens unit Gr1 is composed of two negative meniscus lens elements g1 and g2 both concave to the image side, and a positive meniscus lens element g3 (having aspherical surfaces on both sides) concave to the object side. The second lens unit Gr2 is composed of an aperture diaphragm A, a positive biconvex lens element g4, a positive biconcave lens element g5 (having aspherical surfaces on both sides), and a positive biconvex lens element g6.

All of the zoom lens systems of the fifth to thirteenth embodiments described above are zoom lens systems of a two-unit construction that consists of a positive and a negative lens unit and that is suitable for use in a digital still camera. These zoom lens systems are characterized in that they are optimized in terms of:

[1] the focal lengths of the two lens units and their focal-length ratio;

[2] the utilization of aspherical surfaces; and

[3] the construction within each lens unit.

In all of the fifth to thirteenth embodiments, for the optimization of [1] above, the zoom lens system fulfills condition (7) below.

$$0.1 < \left|\frac{f_1}{f_2}\right| \cdot \frac{1}{Z} < 0.39 \qquad (7)$$

where $f_1$ represents the focal length of the first lens unit Gr1;

$f_2$ represents the focal length of the second lens unit Gr2; and

Z represents the zoom ratio.

Condition (7) defines the relation between the ratio |f1/f2| of the focal length of the first lens unit Gr1 to that of the second lens unit Gr2 and the zoom ratio Z. If the upper limit of condition (7) is exceeded, the exit pupil is positioned too near. As a result, the peripheral illumination becomes insufficient. By contrast, if the lower limit of condition (7) is exceeded, the total length of the zoom lens system becomes unduly large.

In all of the fifth to thirteenth embodiments, for the optimization of [1] above, the zoom lens system fulfills condition (8) below.

$$0.8 < \left|\frac{f1}{fW}\right| < 2.15 \qquad (8)$$

where fW represents the focal length of the entire zoom lens system at the wide-angle end [W] (i.e. in the shortest focal length condition).

Condition (8) defines the relation between the focal length f1 of the first lens unit Gr1 and the focal length fW of the entire zoom lens system at the wide-angle end [W]. If the upper limit of condition (8) is exceeded, the focal length f1 of the first lens unit Gr1 is too large. As a result, the peripheral illumination becomes insufficient, particularly at the wide-angle end [W], and thus the diameter of the front lens element needs to be made unduly large. By contrast, if the lower limit of condition (8) is exceeded, the focal length f1 of the first lens unit Gr1 is too small. As a result, it is difficult to correct aberrations properly over the entire zoom range, particularly the spherical aberration at the telephoto end [T].

In any of the fifth to thirteenth embodiments described above, the first lens unit Gr1 is composed of at least one negative lens element and at least one positive lens element. By constructing the first lens unit Gr1 in this way, it is possible to achieve the optimization of [3] above. In addition, in any of the fifth to thirteenth embodiments, the first lens unit Gr1 includes at least one aspherical surface. By providing an aspherical surface in the first lens unit Gr1 in this way, it is possible to achieve effective correction of aberrations.

In the fifth to ninth and twelfth embodiments, the first lens unit Gr1 has, at least at its most object-side surface (r1), an aspherical surface that fulfills condition (9) below. This helps achieve the optimization of [2] above.

$$10 < \{|x|-|x0|\}/\{C0 \cdot (N'-N)\} < 30 \qquad (9)$$

where x represents the surface shape of the aspherical surface at the end of the effective diameter;

x0 represents the surface shape of the reference spherical surface at the end of the effective diameter;

C0 represents the curvature of the reference spherical surface;

N' represents the image-side reflective index of the aspherical surface; and

N represents the object-side reflective index of the aspherical surface.

Note that x and x0 in condition (9) above are defined by formulae (AS) and (RE) noted earlier.

Condition (9) defines the shape of the aspherical surface provided as the most object-side surface of the first lens unit Gr1. If the upper limit of condition (9) is exceeded, the curvature of field appears notably on the over side over the entire zoom range, in particular. By contrast, if the lower limit of condition (9) is exceeded, the curvature of field appears notably on the under side over the entire zoom range, in particular.

In the sixth, seventh, and ninth embodiments, the first lens unit Gr1 includes a positive lens element (g3) having, at least as its image-side surface (r6), an aspherical surface that fulfills condition (10) below. This helps achieve the optimization of [2] above.

$$-5 < \{|x|-|x0|\}/\{C0 \cdot (N'-N)\} < 15 \qquad (10)$$

Condition (10) defines the shape of the aspherical surface provided as the image-side surface of the positive lens element included in the first lens unit Gr1. If the lower limit of condition (10) is exceeded, the curvature of field appears on the over side at the wide-angle end [W], and the distortion appears on the under side at the wide-angle end [W], in particular. By contrast, if the upper limit of condition (10) is exceeded, the curvature of field at the wide-angle end [W] and the spherical aberration at the telephoto end [T] appear notably on the under side, in particular.

In any of the fifth to thirteenth embodiments described above, the second lens unit Gr2 is composed of, from the object side, at least one positive lens element, at least one negative lens element, and at least one positive lens element. By constructing the second lens unit Gr2 in this way, it is possible to achieve the optimization of [3] above. In addition, in the fifth to ninth and thirteenth embodiments, the second lens unit Gr2 includes at least one aspherical surface. By providing an aspherical surface in the second lens unit Gr2 in this way, it is possible to achieve effective correction of aberrations.

In the fifth to seventh and thirteenth embodiments, the second lens unit Gr2 includes a negative lens element (g4 in FIGS. 9 to 11, g5 in FIG. 17) having, at least as its object-side surface (g8 in FIGS. 9 to 11, g10 in FIG. 17), an aspherical surface that fulfills condition (11) below. This helps achieve the optimization of [2] above.

$$-5 < \{|x|-|x0|\}/\{C0 \cdot (N'-N)\} < 2 \quad (11)$$

Condition (11) defines the shape of the aspherical surface provided as the object-side surface of the negative lens element included in the second lens unit Gr2. If the lower limit of condition (11) is exceeded, the spherical aberration of the telephoto end [T] and the curvature of field at wide-angle end [W] appear notably on the over side, in particular. By contrast, if the upper limit of condition (11) is exceeded, the spherical aberration at the telephoto end [T] and the curvature of field at the wide-angle end [W] appear notably on the under side, in particular.

In the eighth embodiment, the second lens unit Gr2 includes two positive lens elements (g3 and g5), of which the one (g3) that is disposed on the object side of negative lens element (g4) included in the same lens unit Gr2 has, at least as its object-side surface (r6), an aspherical surface that fulfills condition (12) below. This helps achieve the optimization of [2] above.

$$-3 < \{|x|-|x0|\}/\{C0 \cdot (N'-N)\} < 0 \quad (12)$$

Condition (12) defines the shape of the aspherical surface provided as the object-side surface of the positive lens element that is disposed on the object side of negative lens element within the second lens unit Gr2. If the lower limit of condition (12) is exceeded, the spherical aberration appears notably on the over side at the telephoto end [T], in particular. By contrast, if the upper limit of condition (12) is exceeded, the spherical aberration appears notably on the under side at the telephoto end [T], in particular.

In the ninth embodiment, the second lens unit Gr2 includes two positive lens elements (g3 and g5), of which the one (g5) that is disposed on the image side of the negative lens element (g4) included in the same lens unit Gr2 has, at least as its image-side surface (r11), an aspherical surface that fulfills condition (13) below. This helps achieve the optimization of [2] above.

$$-5 < \{|x|-|x0|\}/\{C0 \cdot (N'-N)\} < 5 \quad (13)$$

Condition (13) defines the shape of the aspherical surface provided as the image-side surface of the positive lens element that is disposed on the image side of the negative lens element within the second lens unit Gr2. If the lower limit of condition (13) is exceeded, the spherical aberration appears notably on the over side at the telephoto end [T], in particular. By contrast, if the upper limit of condition (13) is exceeded, the spherical aberration appears notably on the under side at the telephoto end [T], in particular.

In the fifth to thirteenth embodiments described above, all lens units are composed solely of refracting lens elements that deflect incoming rays through refraction. However, the lens units may include a diffracting lens element that deflects incoming rays through diffraction, or even a refracting-diffracting hybrid-type lens element that deflects incoming rays through the combined effect of refraction and diffraction.

Tables 6 to 14 list the construction data of examples of the zoom lens systems of the fifth to thirteenth embodiments described above. In the construction data of each embodiment, ri (i=1, 2, 3, . . . ) represents the radius of curvature of the ith surface from the object side , di (i=1, 2, 3, . . . ) represents the ith axial distance from the object side, and Ni (i=1, 2, 3, . . . ) and vi (i=1, 2, 3, . . . ) respectively represent the refractive index (Nd) and the Abbe number (vd) for d-line of the ith optical element from the object side. Moreover, in the construction data, for each of the axial distances that vary with zooming (i.e. the variable axial distances), three values are given that are, from left, the axial distance between the lens units at the wide-angle-end [W], the same distance at the middle-focal-length position [M], and the same distance at the telephoto end [T]. Listed together with the construction data are the focal length f and the f-number FNO of the entire zoom lens system in those three focal-length conditions [W], [M], and [T].

Furthermore, in the construction data, a surface whose radius of curvature ri is marked with an asterisk (*) is an aspherical surface, whose surface shape is defined by formula (AS) noted earlier. Also listed for each embodiment together with the construction data are the values corresponding to conditions (9) to (13) that define aspherical surface (note that, there, ymax represents the maximum height of an aspherical surface in a direction perpendicular to its optical axis). On the other hand, Table 15 lists, for each embodiment, the values corresponding to conditions (7) and (8).

Figure 18A:
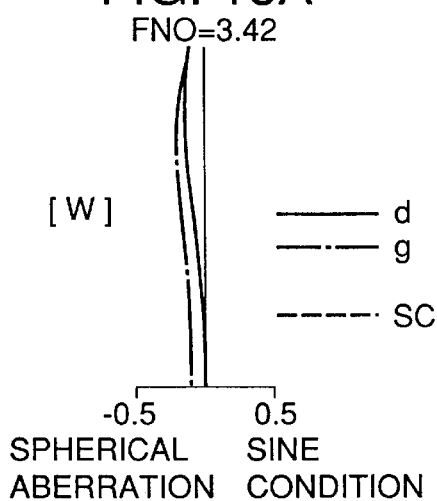
FIGS. 18A to 18I are aberration diagrams of the fifth embodiment.
Figure 18B:
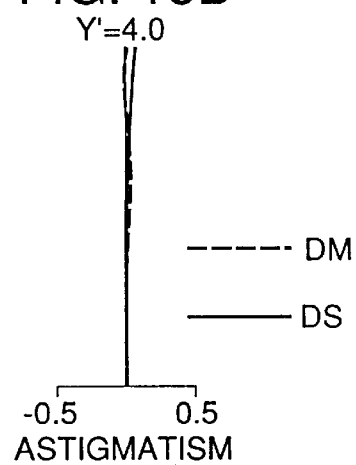
Figure 18C:
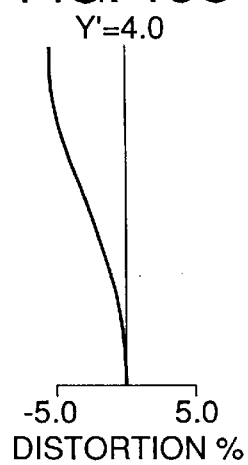
Figure 18D:
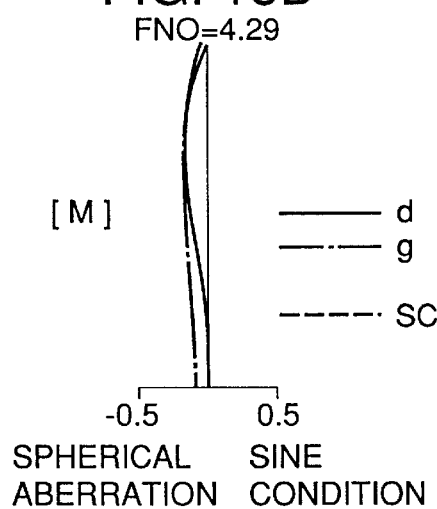
Figure 18E:
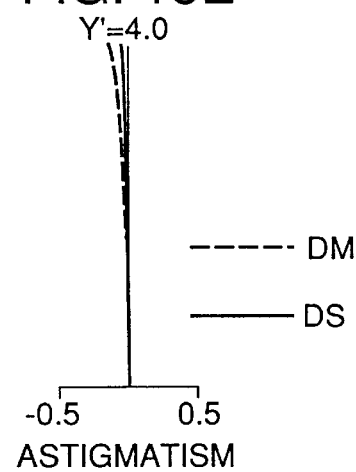
Figure 18F:
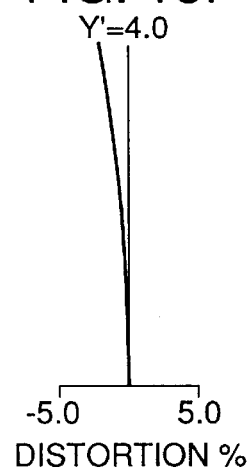
Figure 18G:
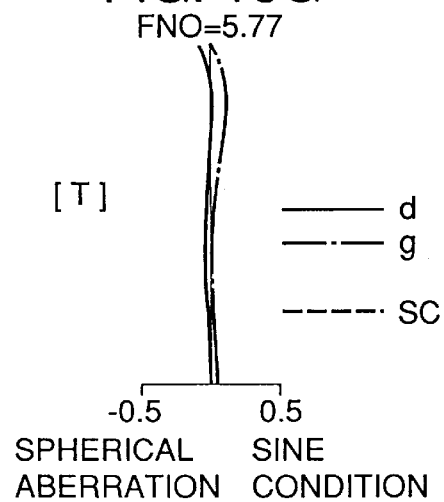
Figure 18H:
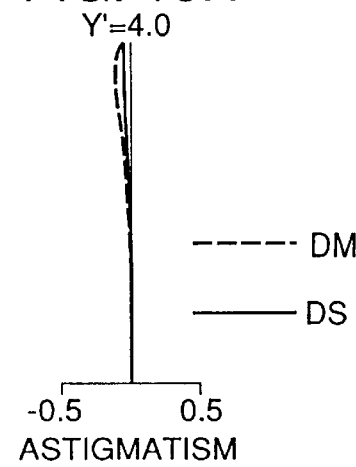
Figure 18I:
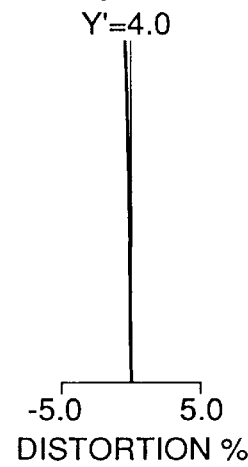
Figure 19A:
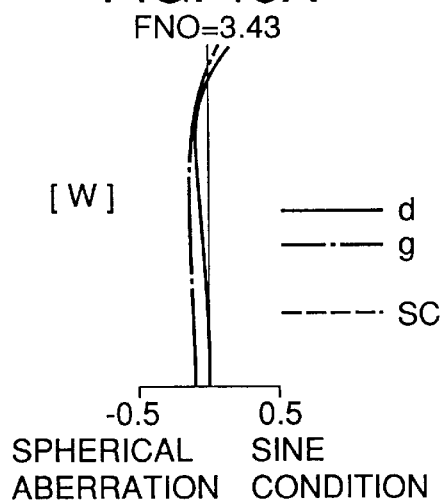
FIGS. 19A to 19I are aberration diagrams of the sixth embodiment.
Figure 19B:
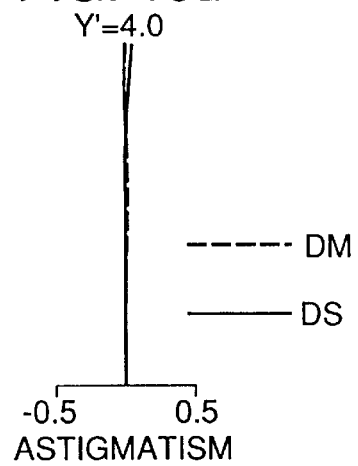
Figure 19C:
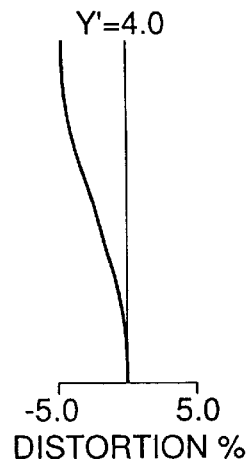
Figure 19D:
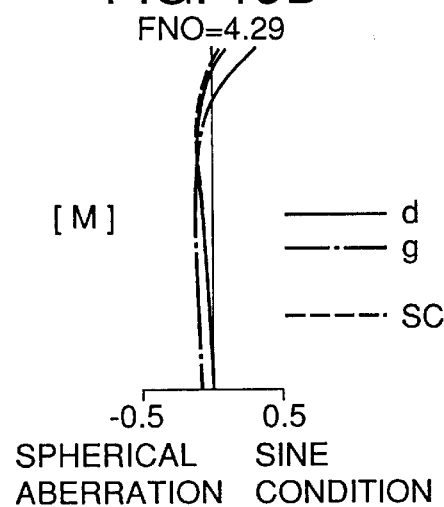
Figure 19E:
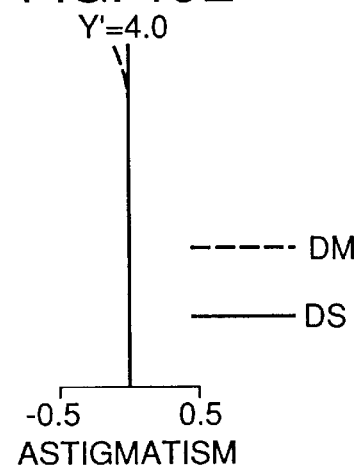
Figure 19F:
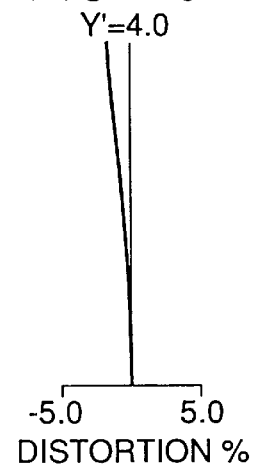
Figure 19G:
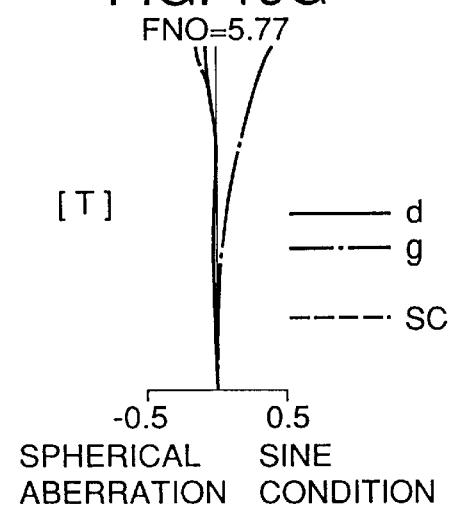
Figure 19H:
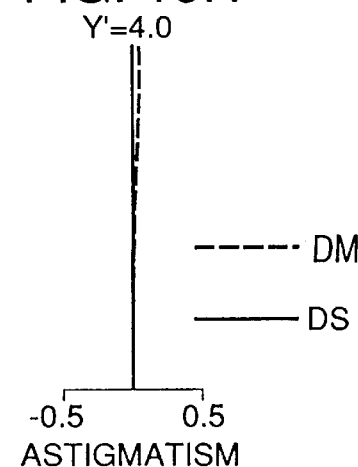
Figure 19I:
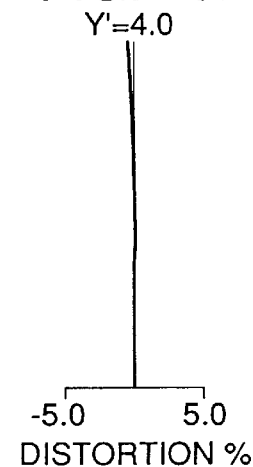
Figure 20A:
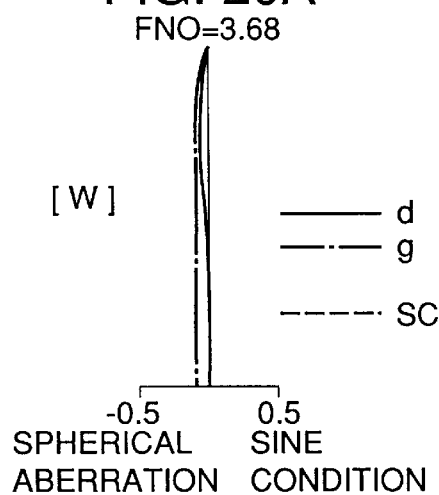
FIGS. 20A to 20I are aberration diagrams of the seventh embodiment.
Figure 20B:
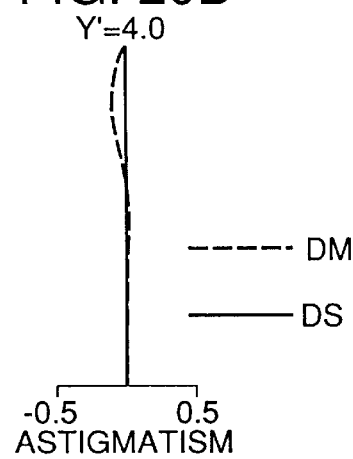
Figure 20C:
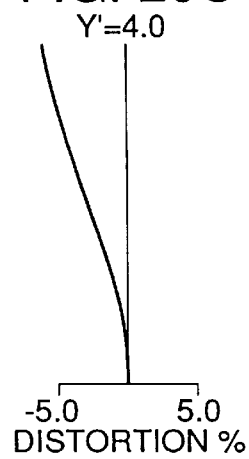
Figure 20D:
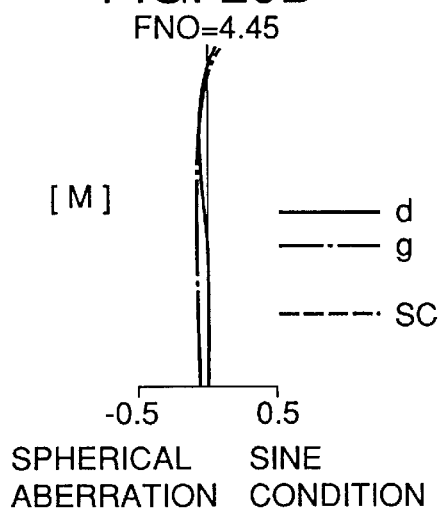
Figure 20E:
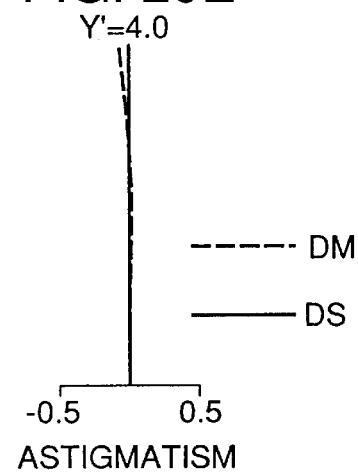
Figure 20F:
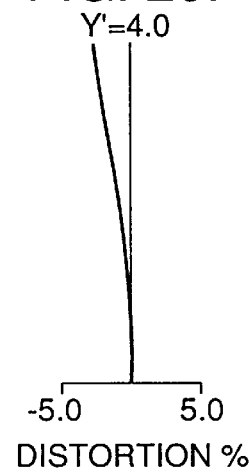
Figure 20G:
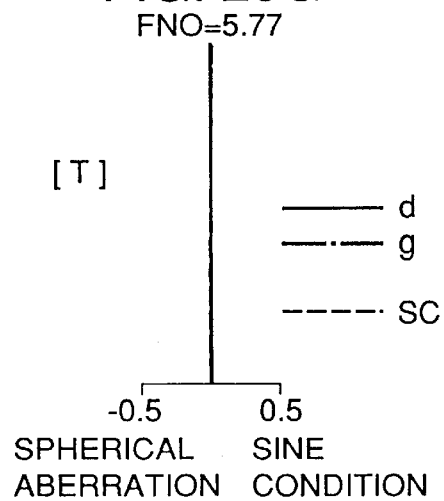
Figure 20H:
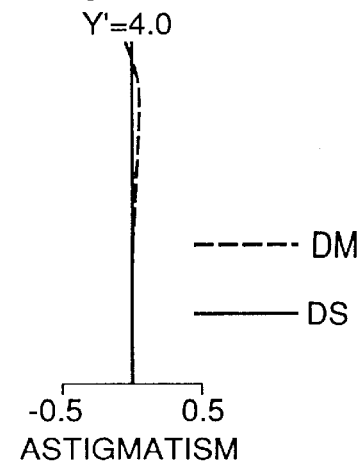
Figure 20I:
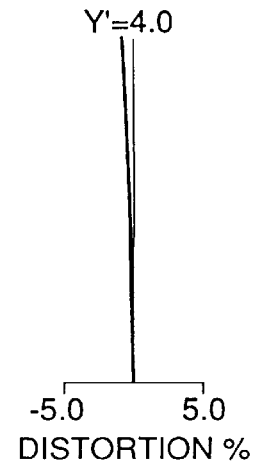
Figure 22A:
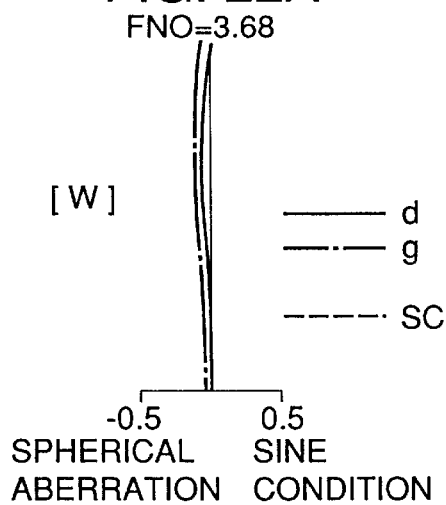
FIGS. 22A to 22I are aberration diagrams of the ninth embodiment.
Figure 22B:
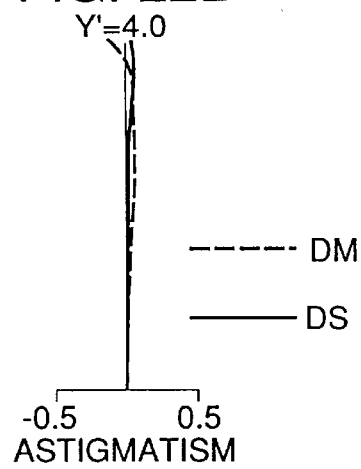
Figure 22C:
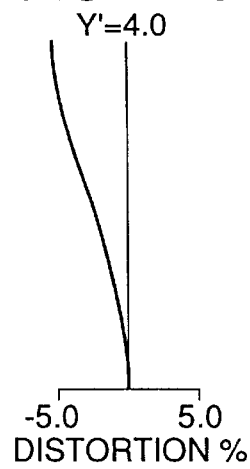
Figure 22D:
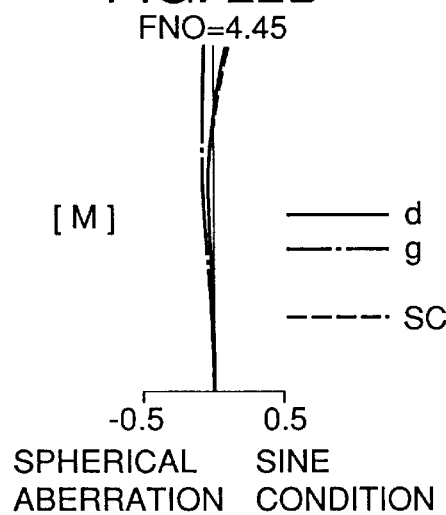
Figure 22E:
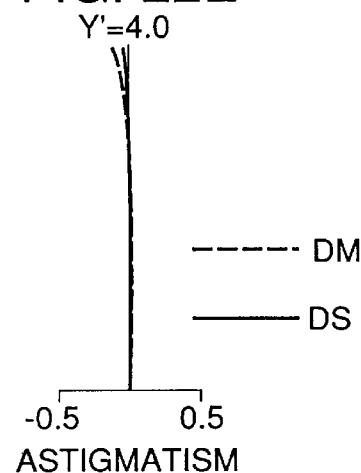
Figure 22F:
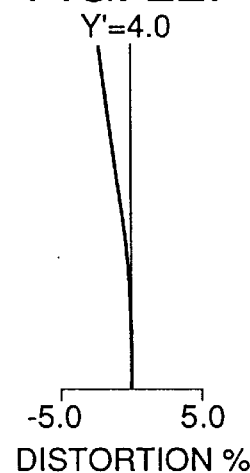
Figure 22G:
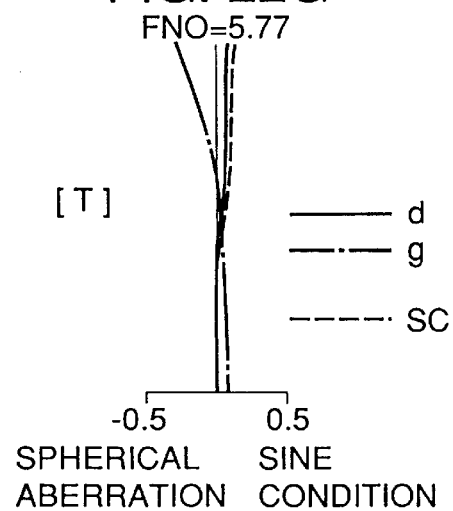
Figure 22H:
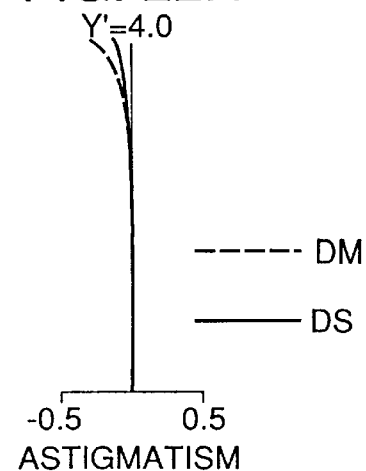
Figure 22I:
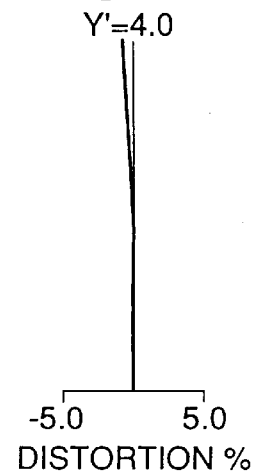

FIGS. 18A–18I, 19A–19I, 20A–20I, 22A–22I, 23A–23I, 24A–24I, 25A–25I, and 26A–26I are aberration diagrams of the examples of the fifth to thirteenth embodiments respectively. Of these aberration diagrams, FIGS. 18A–18C, 19A–19C, 20A–20C, 21A–21C, 22A–22C, 23A–22C, 24A–24C, 25A–25C, and 26A–26C show the aberrations observed at the wide-angle end [W], FIGS. 18D–18F, 19D–19F, 20D–20F, 21D–21F, 22D–22F, 23D–23F, 24D–24F, 25D–25F, and 26D–26F show the aberrations observed at the middle-focus-length position [M], and FIGS. 18G–18I, 19G–19I, 20G–20I, 21G–21I, 23G–23I, 24G–24I, 25G–25I, and 26G–26I show the aberrations observed at the telephoto end [T], with FIGS. 18A, 18D, 18G, 19A, 19D, 19G, 20A, 20D, 20G, 21A, 21D, 21G, 22A, 22D, 22G, 23A, 23D, 23G, 24A, 24D, 24G, 25A, 25D, 25G, 26A, 26D, and 26G showing the spherical aberration and sine condition, FIGS. 18B, 18E, 18H, 19B, 19E, 19H, 20B, 20E, 20H, 21B, 21E, 21H, 22B, 22E, 22H, 23B, 23E, 23H, 24B, 24E, 24H, 25B, 25E, 25H, 26B, 26E, and 26H showing the astigmatism, and FIGS. 18C, 18F, 18I, 19C, 19F, 19I, 20C, 20F, 20I, 21C, 21F, 21I, 22C, 22F, 22I, 23C, 23F, 23I, 24C, 24F, 24I, 25C, 25F, 25I, 26C, 26F, and 26I showing the distortion. In the spherical aberration diagrams, the solid line (d), the dash-and-dot line (g), and the broken line (SC) show the spherical aberration for d-line, the spherical aberration for g-line, and the sine condition, respectively; in the astigmatism diagrams, the broken line (DM) and the solid line (DS) show the astigmatism for d-line on the meridional plane and on the sagittal plane, respectively.

Figure 27:
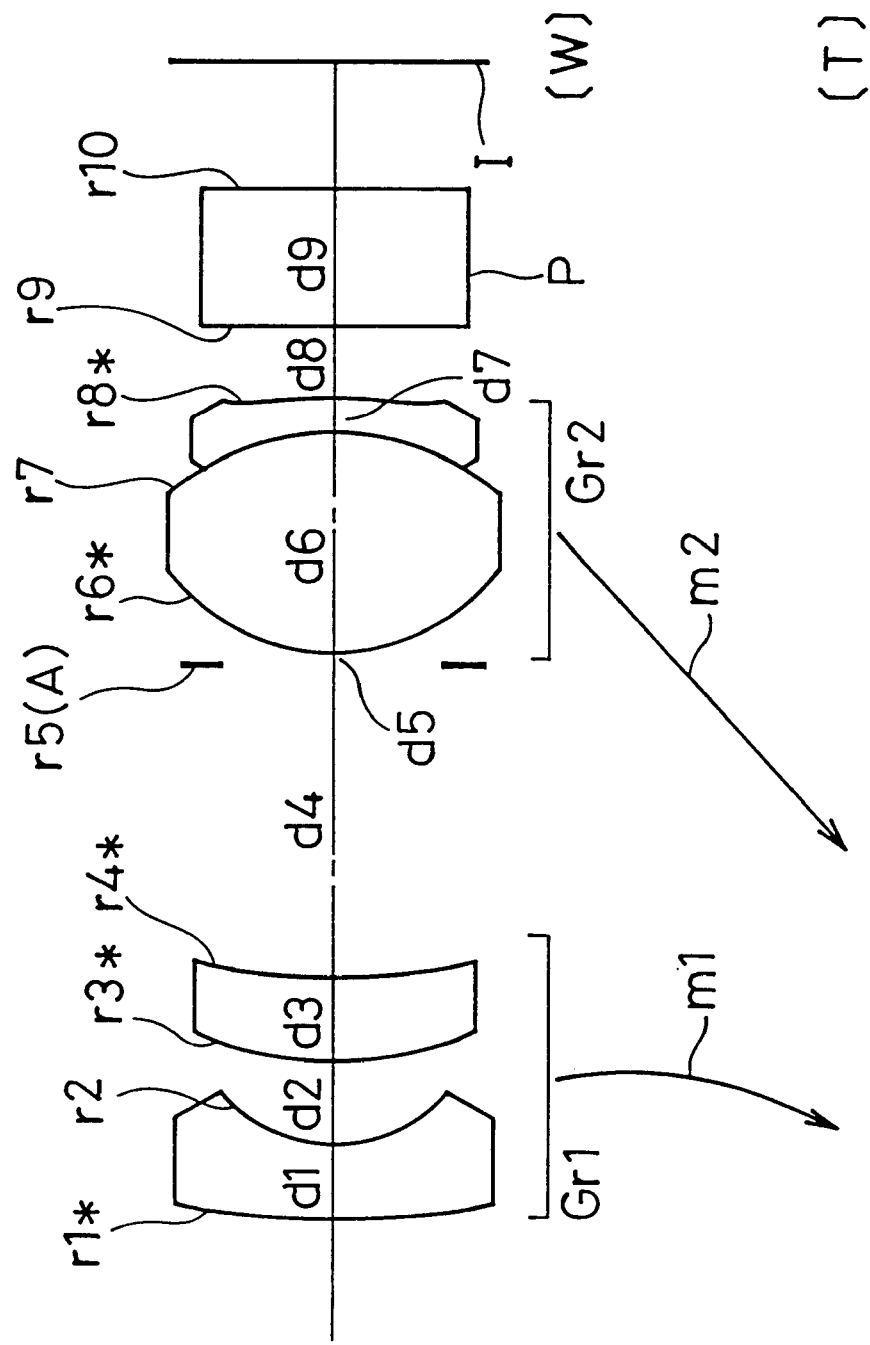
FIG. 27 is a lens arrangement diagram of a fourteenth embodiment of the invention.
Figure 28:
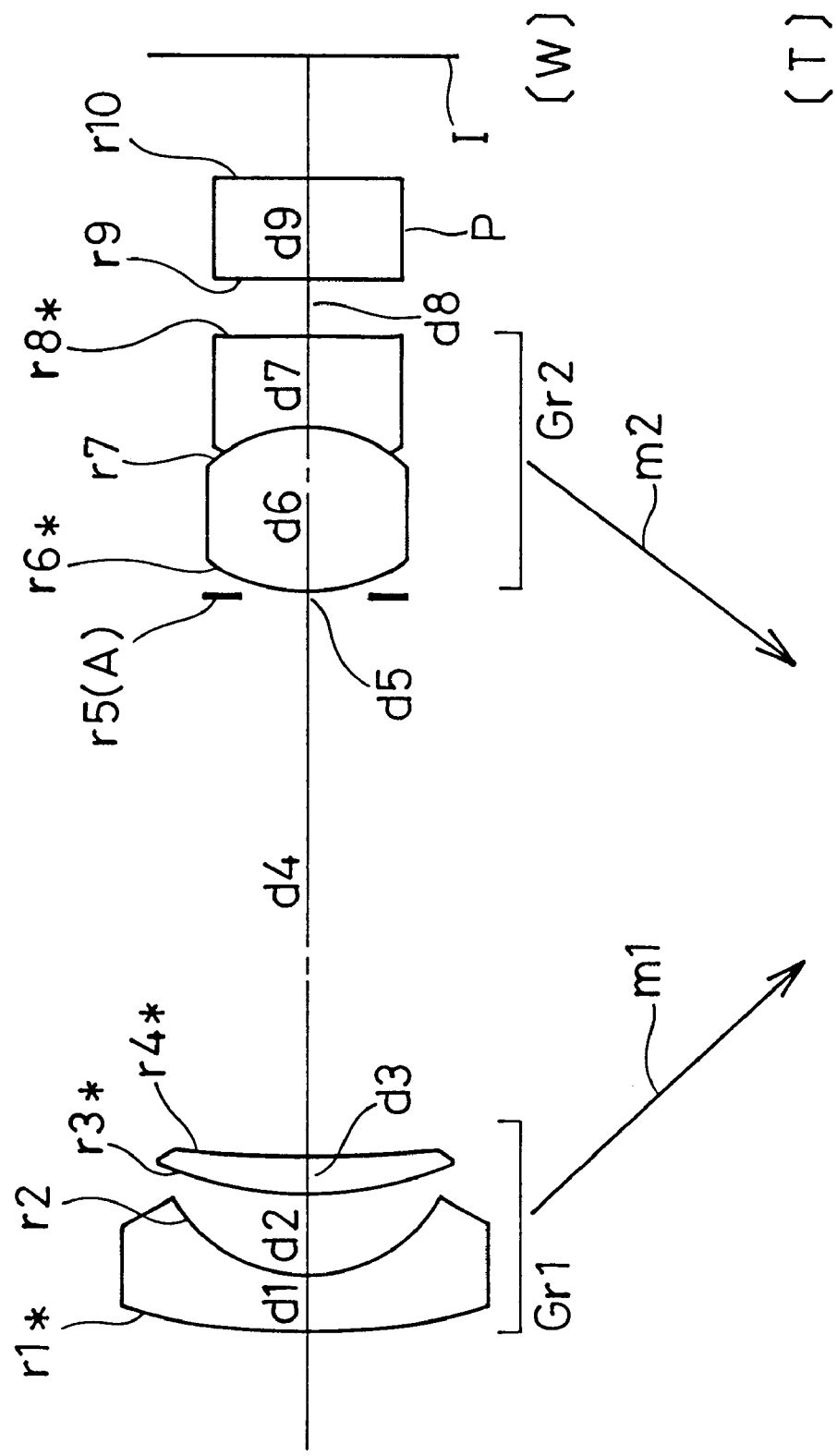
FIG. 28 is a lens arrangement diagram of a fifteenth embodiment of the invention.
Figure 29:
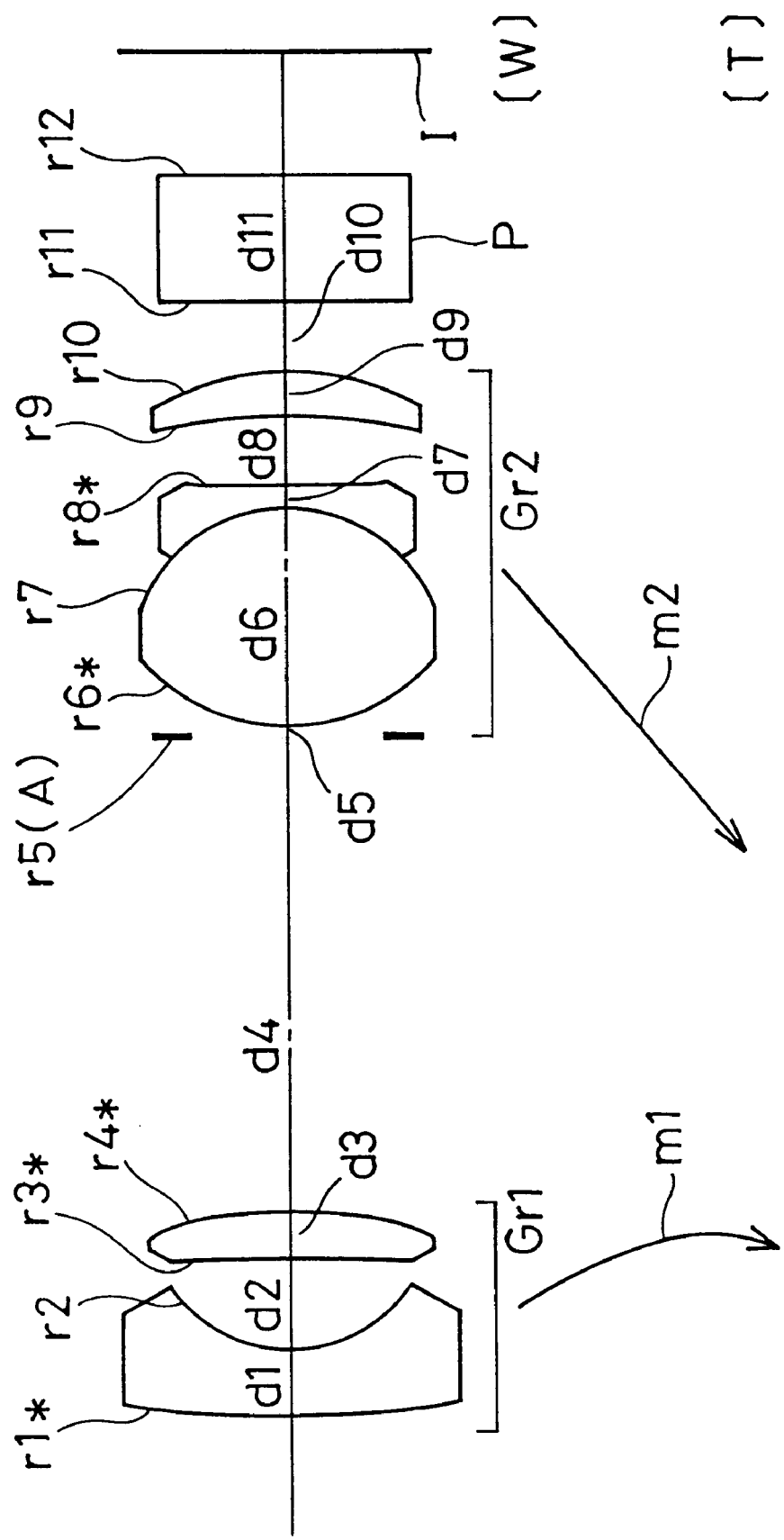
FIG. 29 is a lens arrangement diagram of a sixteenth embodiment of the invention.
Figure 30:
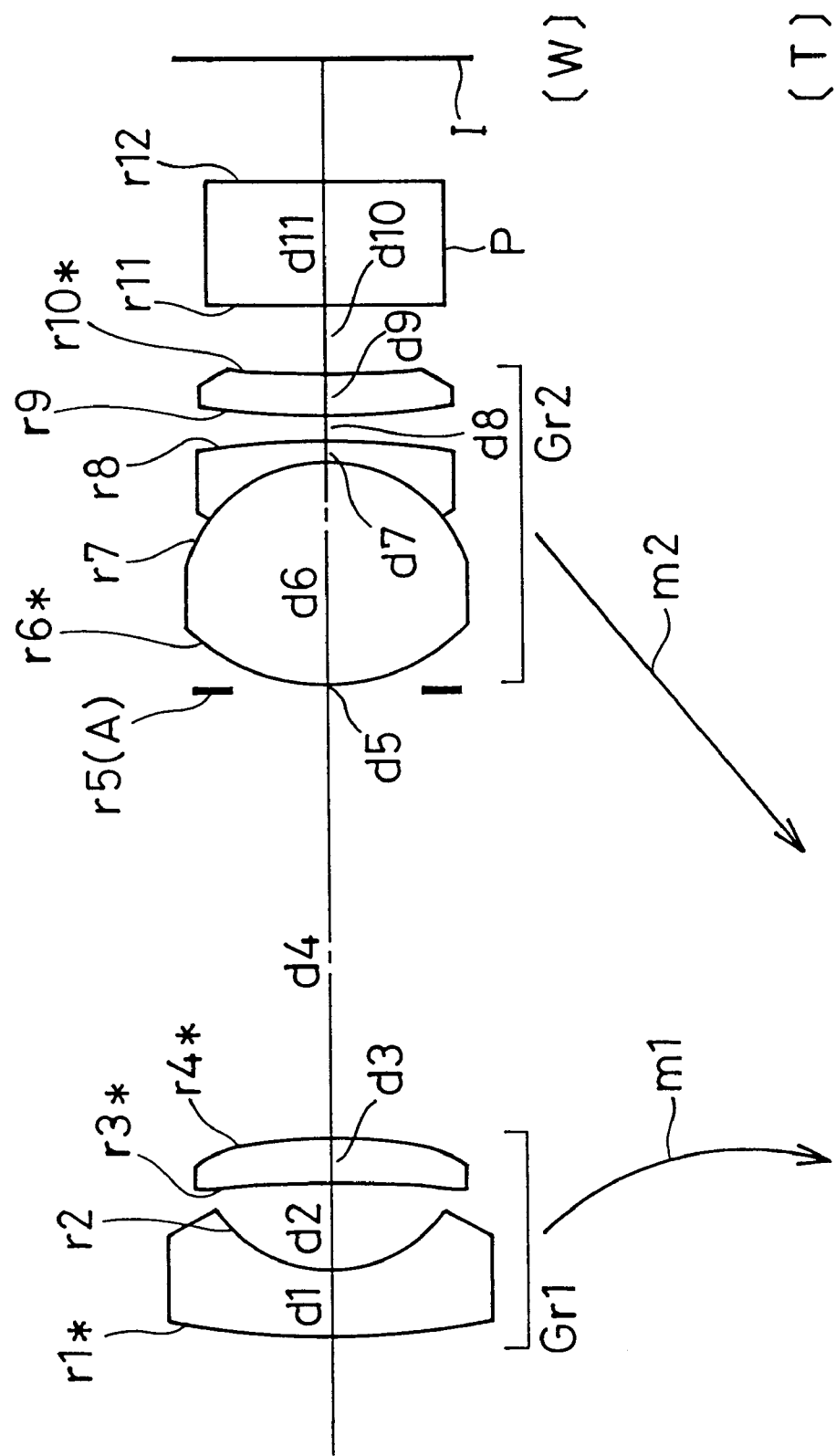
FIG. 30 is a lens arrangement diagram of a seventeenth embodiment of the invention.
Figure 31:
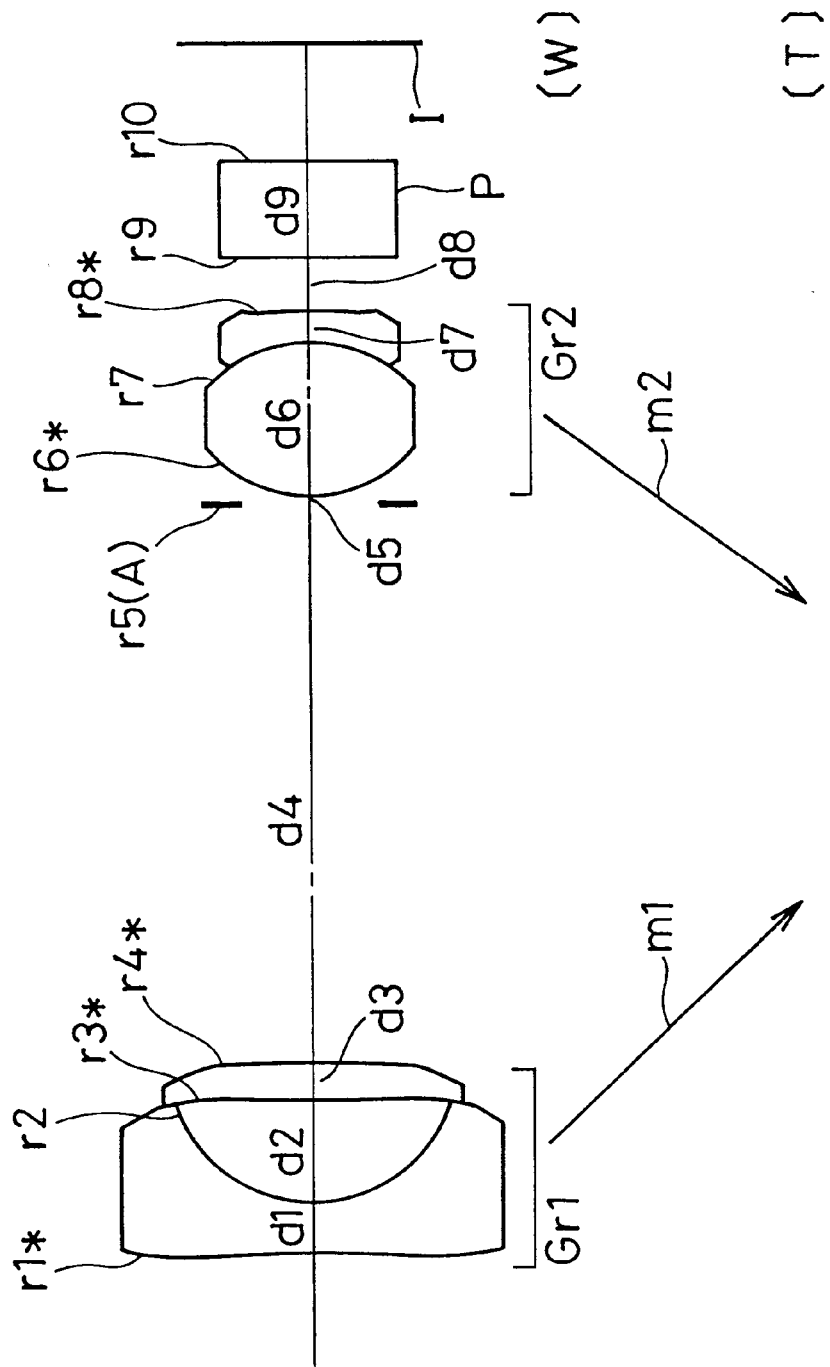
FIG. 31 is a lens arrangement diagram of an eighteenth embodiment of the invention.
Figure 32:
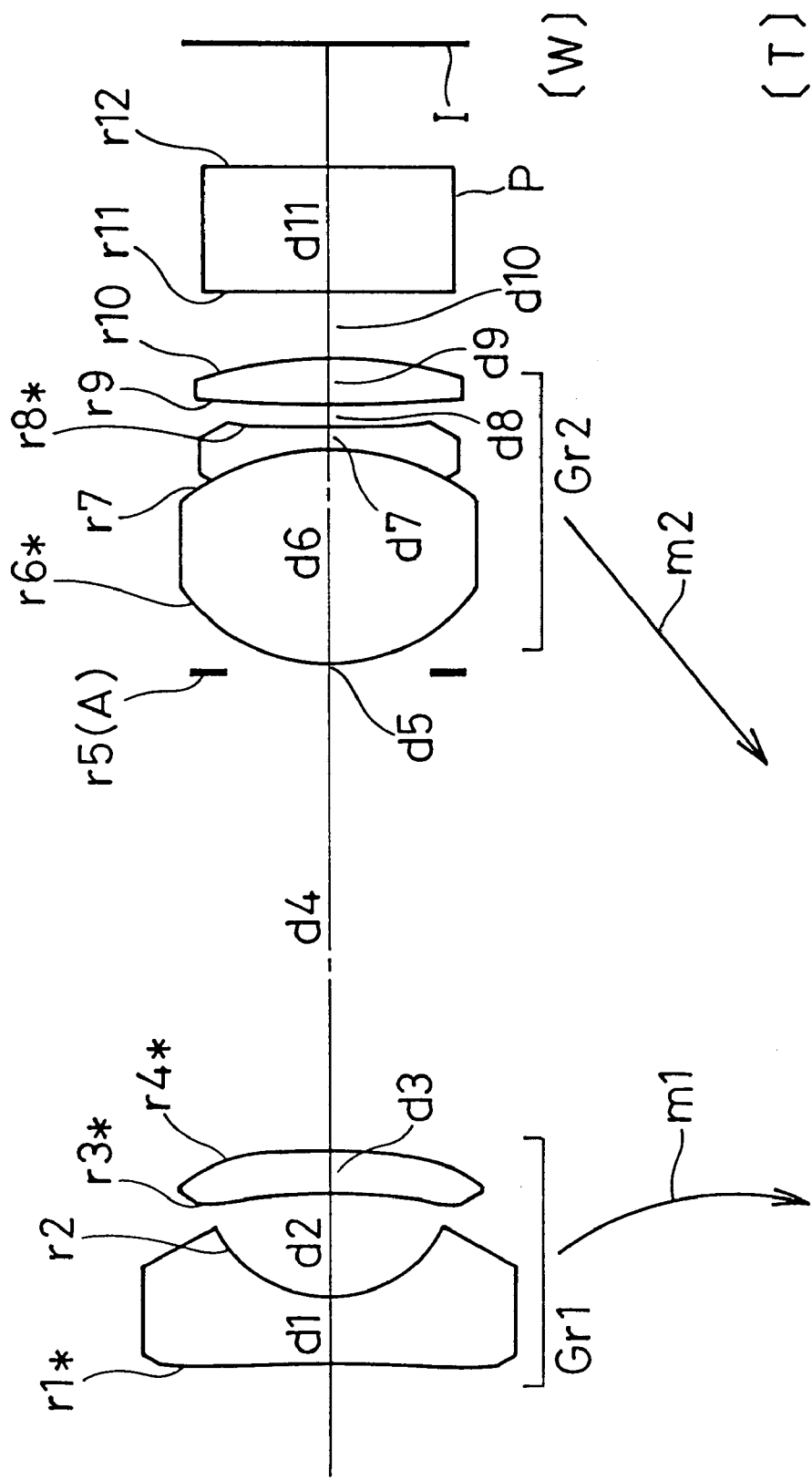
FIG. 32 is a lens arrangement diagram of a nineteenth embodiment of the invention.

FIGS. 27 to 32 are lens arrangement diagrams of the zoom lens systems of a fourteenth to a nineteenth embodiment, respectively, each showing the lens arrangement of the wide-angle end [W]. In these lens arrangement diagrams, ri (i=1, 2, 3, . . . ) indicates the ith surface from the object side, and di (i=1, 2, 3, . . . ) indicates the ith axial distance from the object side; a surface whose symbol ri is marked with an asterisk (*) is an aspherical surface.

In all of the fourteenth to nineteenth embodiments, the zoom lens system consists of two lens units that are, from the object side, a first lens unit Gr1 having a negative optical power and a second lens unit Gr2 having a positive optical power, and performs zooming from the wide-angle end [W] to the telephoto end [T] by moving the first and second lens units Gr1 and Gr2 in such a way that the distance d4 between them decreases. In the lens arrangement diagram of each embodiment, arrows m1 and m2 schematically indicate that movement of the first and second lens unit Gr1 and Gr2, respectively, during zooming from the wide-angle end [W] to the telephoto end [T]. In all of these embodiments, an aperture diaphragm A that moves together with the second lens unit Gr2 during zooming is provided between the first and second lens units Gr1 and Gr2, and a low-pass filter P that has a shape of a flat plate is inserted between the most image-side lens element and the image plane I.

In a zoom lens system that consists of a first lens unit Gr1 having a negative optical power and a second lens unit Gr2 having a positive optical power and that performs zooming by varying by the distance d4 between the first and second lens units Gr1 and Gr2, it is preferable, as in the fourteenth, fifteenth, and eighteenth embodiments, that the second lens unit Gr2 be composed of only one doublet lens element formed by cementing a positive lens element and a negative lens element together, and in addition that condition (14) below be satisfied; or alternatively, it is preferable, as in the sixteenth, seventeenth, and nineteenth embodiments, that the second lens unit Gr2 be composed of, from the object side, a doublet lens element formed by cementing a positive lens element and a negative lens element together, and a positive lens element, and in addition that condition (14) below be satisfied.

$$0.6 < \frac{|\phi 1|}{\phi T} < 2.1 \tag{14}$$

where $\Phi 1$ represents the optical power of the first lens unit Gr1; and $\Phi T$ represents the optical power of the entire zoom lens system at the telephoto end [T] (i.e. in the longest focal length condition).

Condition (14) defines the ratio of the optical power of the first lens unit Gr1 to the optical power of the entire zoom lens system at the telephoto end [T]. If the upper limit of condition (14) is exceeded, whereas it is easier to make the zoom lens system compact and secure a sufficiently large back focal length, the first lens unit Gr1 causes so large aberrations (particularly the negative distortion and the curvature of field in the wide-angle region) that it is difficult to correct them properly by the second lens unit Gr2. By contrast, if the lower limit of condition (14) is exceeded, whereas it is easier to achieve proper correction of aberrations, the first lens unit Gr1 has so weak an optical power that the total length of the zoom lens system at the wide-angle end [W] as well as the diameter of the first lens unit Gr1 becomes unduly large, in particular.

In a zoom lens system that consists of a first lens unit Gr1 having a negative optical power and a second lens unit Gr2 having a positive optical power and that performs zooming by varying the distance d4 between the first and second lens units Gr1 and Gr2, it is preferable, as in the fourteenth, fifteenth, and eighteenth embodiments, that the second lens unit Gr2 be composed of only one doublet lens element formed by cementing a positive lens element and a negative lens element together, and in addition that condition (15) below be satisfied; or alternatively, it is preferable, as in the sixteenth, seventeenth, and nineteenth embodiments, that the second lens unit Gr2 be composed of, from the object side, a doublet lens element formed by cementing a positive lens element and a negative lens element together, and a positive lens element, and in addition that condition (15) below be satisfied.

$$0.7 < \frac{|\phi 1|}{\phi 2} < 1.4 \tag{15}$$

where $\Phi 1$ represents the optical power of the first lens unit Gr1; and $\Phi T$ represents the optical power of the second lens unit Gr2.

Condition (15) defines the ratio of the optical power of the first lens unit Gr1 to that of the second lens unit Gr2. If the lower limit of condition (15) is exceeded, the total length of the zoom lens system at the wide-angle end [W] is unduly large, and the first lens unit Gr1 needs to travel an unduly large distance for zooming. As a result, it is not possible to realize a compact zoom lens system. By contrast, if the upper limit of condition (15) is exceeded, the first lens unit Gr1 causes so large aberrations that the second lens unit Gr2 cannot correct them properly.

In general, in a zoom lens system of a two-unit construction that consists of a negative and a positive lens unit and that is composed of a minimum number of lens elements, an error in the unit-to-unit distance between the first and second lens units greatly affects the variation of the spherical aberration at the telephoto end [T]. This is because axial rays, which are made to diverge by the first lens unit Gr1, occupy a large diameter in the second lens unit Gr2, and therefore, to correct aberrations properly, every lens surface in the second lens unit Gr2, which is composed of a minimum of lens elements, needs to be given a strong optical power.

To reduce the production cost of a zoom lens system by reducing its size and the number of its constituent lens elements, and to minimize the degree to which the lens elements become more difficult to shape as a result of the miniaturization of the zoom lens system, in the fourteenth to nineteenth embodiments of the present invention, the second lens unit Gr2 has, as its first and second lens elements, a positive doublet lens element that is formed by cementing a positive lens element and a negative lens element together. This makes it possible to give a comparatively large curvature to the cementing interface between the positive and negative lens elements in the second lens unit Gr2 and at the same time keep the overall optical power fairly weak, and thereby make less influential the error in the air-space distance between those positive and negative lens elements as well as make less influential the error in the shape of the cementing interface. In addition, since it is very easy to limit the thickness of cement below a particular thickness by applying sufficient pressure in the cementing process, it is possible, as the combined effect of the factors noted above, to reduce the cost of lens-frame shaping, assembly, and other related processes. It should be understood that the cementing process includes the alignment of the lens elements.

In a zoom lens system that consists of a first lens unit Gr1 having a negative optical power and a second lens unit Gr2 having a positive optical power and that performs zooming by varying the distance d4 between the first and second lens units Gr1 and Gr2, it is preferable, as in the fourteenth, fifteenth, and eighteenth embodiments, that the second lens unit Gr2 be composed of only one doublet lens element formed by cementing a positive lens element and a negative lens element together, and in addition that condition (16) below be satisfied; or alternatively, it is preferable, as in the sixteenth, seventeenth, and nineteenth embodiments, that the second lens unit Gr2 be composed of, from the object side, a doublet lens element formed by cementing a positive lens element and a negative lens element together; and a positive lens element, and in addition that condition (16) below be satisfied.

$$\frac{Np - Nn}{Rc} < 0.1 \tag{16}$$

where

Rc represents the radius of curvature for d-line of the cementing surface (interface) of the doublet lens element of the second lens unit Gr2;

Np represents the refractive index for d-line of the positive lens element of the doublet lens element of the second lens unit Gr2; and Nn represents the refractive index for d-line of the negative lens element of the doublet lens element of the second lens unit Gr2.

Condition (16) defines the condition to be fulfilled to obtain an appropriate optical power in the cementing surface of the doublet lens of the second lens unit Gr2. If the upper limit of condition (16) is exceeded, the cementing surface has too strong an optical power. As a result, contrary to the objects of the present invention, the cementing surface causes aberrations of higher orders that are difficult to correct properly.

In a zoom lens system that consists of a first lens unit Gr1 having a negative optical power and a second lens unit Gr2 having a positive optical power and that performs zooming by varying the distance d4 between the first and second lens units Gr1 and Gr2, it is preferable, as in the fourteenth, fifteenth, and eighteenth embodiments, that the second lens unit Gr2 be composed of only one doublet lens element formed by cementing a positive lens element and a negative lens element together, and in addition that condition (17) below be satisfied; or alternatively, it is preferable, as in the sixteenth, seventeenth, and nineteenth embodiments, that the second lens unit Gr2 be composed of, from the object side, a doublet lens element formed by cementing a positive lens element and a negative lens element together, and a positive lens element, and in addition that condition (17) below be satisfied.

$$20 < vp - vn \tag{17}$$

where vp represents the Abbe number for d-line of the positive lens element of the doublet lens element of the second lens unit (Gr2); and vn represents the Abbe number for d-line of the negative lens element of the doublet lens element of the second lens unit (Gr2).

Condition (17) defines the Abbe numbers for d-line of the positive and negative lens elements of the doublet lens element of the second lens unit Gr2. In a zoom lens system, like those of the fourteenth to nineteenth embodiments, in which the second lens unit GR2 is composed of a minimum number of lens elements, it is preferable, from the viewpoint of chromatic aberration correction, that the positive and negative lens elements of the doublet lens element are made of optical materials that have as large an Abbe-number difference as defined by condition (17).

In a zoom lens system, like those of the fourteenth to nineteenth embodiments, in which at least one of conditions (14) to (17) is fulfilled, it is preferable that condition (18) below be additionally fulfilled.

$$1 < img \cdot R < 20 \tag{18}$$

where img represents the maximum image height; and

R represents the effective radius of the most image-side surface of the entire zoom lens system.

Condition (18) defines the condition to be fulfilled to keep the size as well as the aberration and electronic-still-camera-specific characteristics of the zoom lens system appropriate. Usually, in a solid-state image-sensing device (such as a CCD) used in an electronic still camera, a microlens is provided in front of each of its light-sensing elements to condense light efficiently. To make the most of this microlens, it is essential to let rays enter the microlens approximately parallel to its optical axis (i.e. approximately perpendicularly to the light-receiving surface of each light-sensing element). To achieve this, it is necessary to design the entire zoom lens system to be approximately telecentric with respect to the image plane I.

If the upper limit of condition (18) is exceeded, the entire zoom lens system is too telecentric. As a result, the negative distortion becomes unduly large at the wide-angle end [W], and in addition the inclination of the image plane I toward the under side becomes unduly large. By contrast, if the lower limit of condition (18) is exceeded, it is difficult to make the entire zoom lens system approximately telecentric. As a result, even if the entire zoom lens system can be made approximately telecentric, the back focal length becomes unduly large and thus the zoom lens system as a whole becomes unduly large.

In a zoom lens system, like those of the fourteenth, fifteenth, and eighteenth embodiments, in which the second lens unit Gr2 is composed of only one doublet lens element formed by cementing a positive lens element and a negative lens element together and in which at least one of conditions (14) to (17) is fulfilled, it is preferable that condition (19) below be additionally fulfilled. In a zoom lens system, like those of the fourteenth, fifteenth, and eighteenth embodiments, in which the first lens unit Gr1 is composed of at least two lens elements that are, from the object side, a negative lens element having a strong optical power on its image side and a positive lens element and in which the second lens unit Gr2 is composed of only one positive doublet lens element formed by cementing together, from the object side, a positive biconvex lens element and a negative meniscus lens element convex to the image side, it is preferable that condition (19) below be additionally fulfilled.

$$-1 < \frac{Rp + Rn}{Rp - Rn} < 0 \tag{19}$$

where

Rp represents the radius of curvature of the object-side surface of the doublet lens element of the second lens unit Gr2; and Rn represents the radius of curvature of the image-side surface of the doublet lens element of the second lens unit Gr2.

Condition (19) defines the shape of the doublet lens element of the second lens unit Gr2. If the upper limit of condition (19) is exceeded, the image-side curvature of the doublet lens element is too large relative to its object-side curvature. As a result, undesirably, the negative lens element of the doublet lens element has too weak an optical power, or the cementing surface has too strong an optical power that exceeds condition (3). As condition (19) approaches its lower limit, the optical power of the image-side surface of the doublet lens element approaches zero. This necessitates the second lens unit Gr2 deriving its positive optical power solely from the object-side surface of the doublet lens element, and thus makes it impossible to achieve well-balanced correction of aberrations.

In a zoom lens system, like those of the sixteenth, seventeenth, and nineteenth embodiments, in which the second lens unit Gr2 is composed of two lens elements that are, from the object side, a doublet lens element formed by cementing a positive lens element and a negative lens element together and a positive lens element and in which at least one of conditions (14) to (17) is fulfilled, it is preferable that condition (20) below be additionally fulfilled. In a zoom lens system, like those of the sixteenth, seventeenth, and nineteenth embodiments, in which the first lens unit Gr1 is composed of at least two lens elements that are, from the object side, a negative lens element having a strong optical power on its image side and a positive lens element and in which the second lens unit Gr2 is composed of, from the object side, a positive doublet lens element formed by cementing a positive biconvex lens element and a negative lens element having a large curvature on its object side together and a positive lens element, it is preferable that condition (20) below be additionally fulfilled.

$$0 < \Delta\phi/\phi 2 < 0.7 \quad (20)$$

where $\Delta\phi$ represents the composite optical power of the image-side surface of the doublet lens element of the second lens unit Gr2 and the most image-side positive lens element, and is given as $$\Delta\phi = (1-Nn)/Rn + \phi 23 - e \cdot \phi 23 \cdot (1-Nn)/Rn$$

where $\phi 23$ represents the optical power of the most image-side positive lens element;

Rn represents the radius of curvature of the image-side surface of the doublet lens element of the second lens unit Gr2; and e represents the face-to-face distance, as converted properly, between the image-side surface of the doublet lens element of the second lens unit Gr2 and the most image-side positive lens element.

Condition (20) defines the ratio of the composite optical power of the image-side surface of the doublet lens element of the second lens unit Gr2 and the most image-side lens element to the optical power of the second lens unit Gr2. By providing a positive lens element behind the positive doublet lens element, the doublet lens element can distribute some of its positive optical power to the positive lens element. This allows aberrations to be corrected flexibly. In addition, this helps increase the effective diameter for off-axial rays on the rear-end lens surface and thereby improve the near-telecentricity of the zoom lens system with respect to the image-sensing surface I of a CCD which is one of the additional conditions to be fulfilled in an electronic still camera.

If the upper limit of condition (20) is exceeded, the most image-side positive lens element has too strong an optical power. As a result, undesirably, the inclination of the curvature of field toward the under side becomes unduly large, and in addition the negative distortion of the wide-angle end [W] becomes unduly large. As condition (20) approaches its lower limit, the composite optical power of the image-side surface of the doublet lens element and the most image-side positive lens element approaches zero. This necessitates the second lens unit Gr2 deriving its positive optical power solely from the object-side surface of the doublet lens element, and thus makes it impossible to achieve well-balanced correction of aberrations.

To reduce the production cost without sacrificing the optical performance, in a zoom lens system, like those of the fourteenth to nineteenth embodiments, in which at least one of conditions (14) to (17) is fulfilled, it is preferable that the first lens unit Gr1 is composed of at least two lens elements that are, from the object side, a negative lens element having a strong optical power on its image side and a positive lens element, and in addition that the first lens unit Gr1 is composed of at least two lens elements that are, from the object side, a negative lens element having a strong optical power on its image side and made of plastic and a positive lens element; moreover, it is preferable that the doublet lens element of the second lens unit Gr2 includes at least one lens element made of plastic.

To reduce the production cost further, in a zoom lens system, like those of the fourteenth, fifteenth, and eighteenth embodiments, in which the second lens unit Gr2 is composed of only one positive doublet lens element formed by cementing together, from the object side, a positive lens element and a negative lens element, it is preferable that at least one of the most object-side negative lens element in the first lens unit Gr1 and the most object-side positive lens element in the second lens unit Gr2 be made of plastic; on the other hand, in a zoom lens system, like those of the sixteenth, seventeenth, and nineteenth embodiments, in which the second lens unit Gr2 is composed of, from the object side, a positive doublet lens element formed by cementing a positive lens element and a negative lens element together and a positive lens element, it is preferable that at least one of the most object-side negative lens element in the first lens unit Gr1, the most object-side positive lens element in the second lens unit Gr2, and the most image-side positive lens element in the second lens unit Gr2 be made of plastic.

In all of the fourteenth to nineteenth embodiments, it is preferable that the most object-side surface of the first lens unit Gr1 be an aspherical surface that fulfills condition (21) below.

$$-0.02 < \phi 1 \cdot (N'-N) \cdot Dev < 0 \quad (21)$$

where

N represents the refractive index for d-line of the medium that exists on the object side of the aspherical surface;

N' represents the refractive index for d-line of the medium that exists on the image side of the aspherical surface; and Dev represents the amount by which the aspherical surface is aspherical at the effective radius of the aspherical surface, and is given as $$Dev = x(y) - x0(y)$$

-continued $$x(y) = (r/\varepsilon) \cdot \left[1 - \sqrt{1 - \varepsilon \cdot (y^2/r^2)}\right] + \sum Aiy^i \quad (i \geq 2)$$

$$x0(y) = r\# \cdot \left[1 - \sqrt{1 - (y^2/r\#^2)}\right]$$

where x(y) represents the surface shape of the aspherical surface;

x0(y) represents the reference spherical surface shape of the aspherical surface;

r represents the reference radius of curvature of the aspherical surface;

ε represents the quadric surface parameter;

y represents the height in a direction perpendicular to the optical axis;

Ai represents the aspherical coefficient of the ith order; and r# represents the paraxial radius of curvature of the aspherical surface (1/r#=(1/r)+2·A2).

Moreover, it is preferable that the most image-side surface in the second lens unit Gr2 be an aspherical surface that fulfills condition (22) below. Furthermore, it is preferable that either the most image-side surface of the doublet lens element of the second lens unit Gr2 (in the fourteenth to sixteenth, eighteenth, and nineteenth embodiments) or at least one surface of the most image-side positive lens element (in the seventeenth embodiment) be an aspherical surface that fulfills condition (22) below.

$$-0.02 < \phi 2 \cdot (N' - N) \cdot \text{Dev} < 0 \quad (22)$$

In a zoom lens system, like those of the fourteenth to nineteenth embodiments, which is composed of a minimum number of lens elements, it is preferable, in order to achieve proper correction of aberrations over the entire zoom range, that the most object-side surface in the first lens unit Gr1 be an aspherical surface that fulfills condition (21), and in addition that either the most image-side surface of the positive doublet lens element of the second lens unit Gr2 or at least one surface of the most image-side positive lens element of the second lens unit Gr2 be an aspherical surface that fulfills condition (22).

Condition (21) predetermines the most object-side surface in the first lens unit Gr1 to be an aspherical surface that is so shaped that its negative optical power decreases from center to edge. If the upper limit of condition (21) is exceeded, it is difficult to correct the negative distortion in the wide-angle region with so small a number of lens elements. By contrast, if the lower limit of condition (21) is exceeded, the distortion is overcorrected, causing, for example, the curvature of field and the spherical aberration to appear on the negative side. As a result, it is not possible to achieve well-balanced correction of aberrations.

Condition (22) predetermines either the most image-side surface of the positive doublet lens element of the second lens unit Gr2 or at least one surface of the most image-side positive lens element of the second lens unit Gr2 to be an aspherical surface that is so shaped that its positive optical power decreases from center to edge. If the upper limit of condition (22) is exceeded, it is not possible to sufficiently correct the curvature of field in the wide-angle region and the spherical aberration in the telephoto region, in particular, with so small a number of lens elements. By contrast, if the lower limit of condition (22) is exceeded, undesirably, the curvature of field and the spherical aberration are overcorrected.

In the fourteenth to nineteenth embodiments described above, all lens units are composed solely of refracting lens elements that deflect incoming rays through refraction. However, the lens units may include a diffracting lens element that deflects incoming rays through diffraction, or even a refracting-diffracting hybrid-type lens element that deflects incoming rays through the combined effect of refraction and diffraction.

Tables 16 to 21 list the construction data of examples of the zoom lens systems of the fourteenth to nineteenth embodiments described above. In the construction data of each embodiment, ri (i=1, 2, 3, . . . ) represents the radius of curvature of the ith surface from the object side, di (i=1, 2, 3, . . . ) represents the ith axial distance from the object side, and Ni (i=1, 2, 3, . . . ) and vi (i=1, 2, 3, . . . ) respectively represent the refractive index (Nd) and the Abbe number (vd) for d-line of the ith optical element from the object side. Moreover, in the construction data, for each of the axial distances that vary with zooming (i.e. the variable axial distances), three values are given that are, from left, the axial aerial distance between the lens units at the wide-angle end [W], the same distance at the middle-focal-length position [M], and the same distance at the telephoto end [T]. Listed together with the construction data are the focal length f and the f-number FNO of the entire zoom lens system in those three focal-length conditions [W], [M], and [T]. Table 22 lists, for each embodiment, the values corresponding to conditions (14) to (22).

Furthermore, in the construction data, a surface whose radius of curvature ri is marked with an asterisk (*) is an aspherical surface, whose surface shape is defined by formula (as) below. The data of the aspherical surface are also listed together with the construction data of each embodiment.

$$X = (C \cdot Y^2) / \left(1 + \sqrt{1 - \varepsilon \cdot C^2 \cdot Y^2}\right) + \sum (Ai \cdot Y^i) \quad \text{(as)}$$

where

X represents the displacement from the reference surface along the optical axis (=x(y));

Y represents the height in a direction perpendicular to the optical axis (=y);

C represents the paraxial curvature;

ε represents the quadric surface parameter; and

Ai represents the aspherical coefficient of the ith order.

Figure 33A:
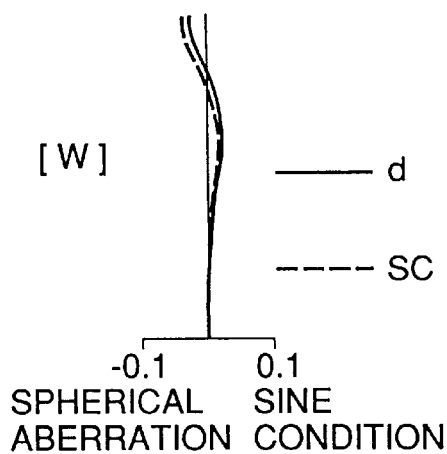
FIGS. 33A to 33I are aberration diagrams of the fourteenth embodiment.
Figure 33B:
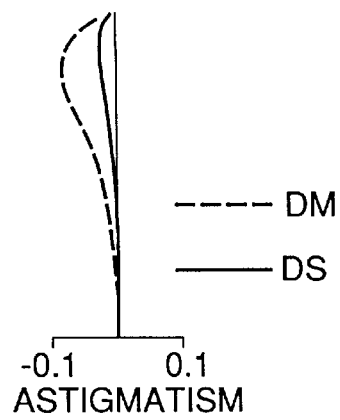
Figure 33C:
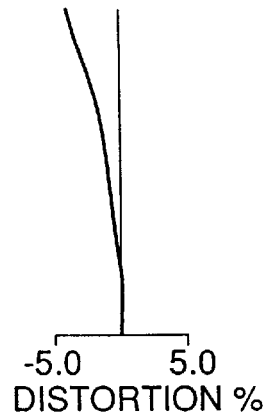
Figure 33D:
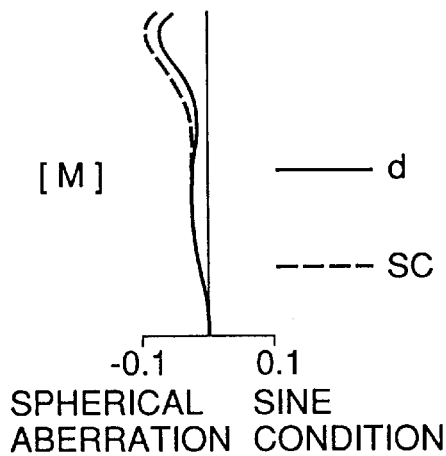
Figure 33E:
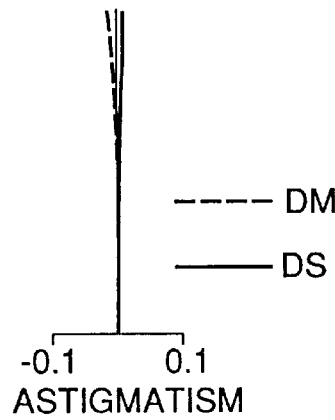
Figure 33F:
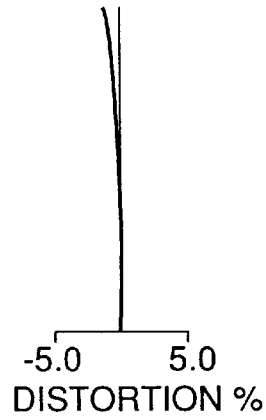
Figure 33G:
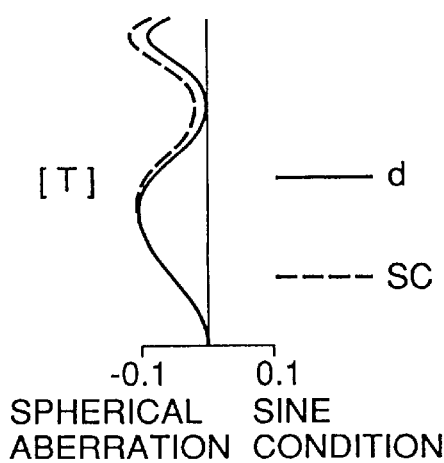
Figure 33H:
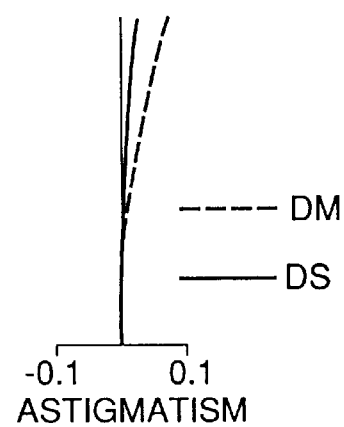
Figure 33I:
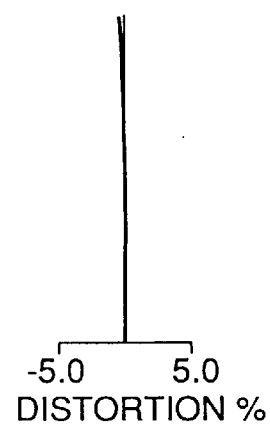
Figure 34A:
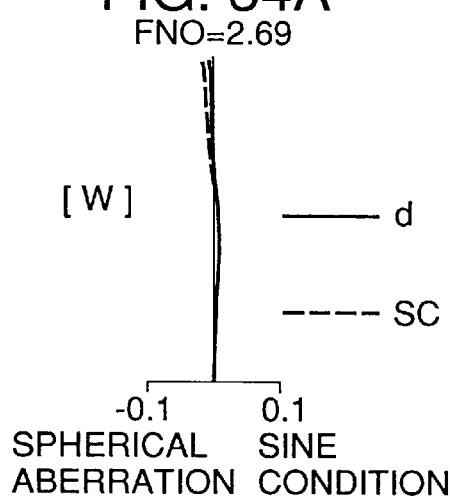
FIGS. 34A to 34I are aberration diagrams of the fifteenth embodiment.
Figure 34B:
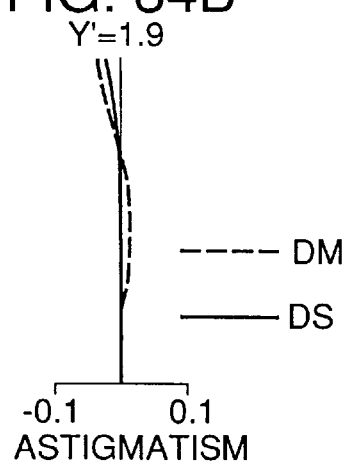
Figure 34C:
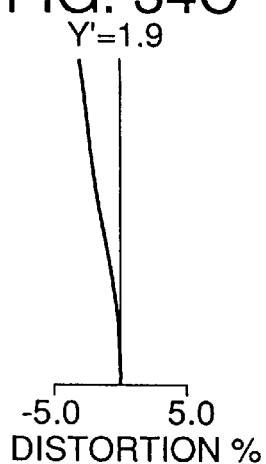
Figure 34D:
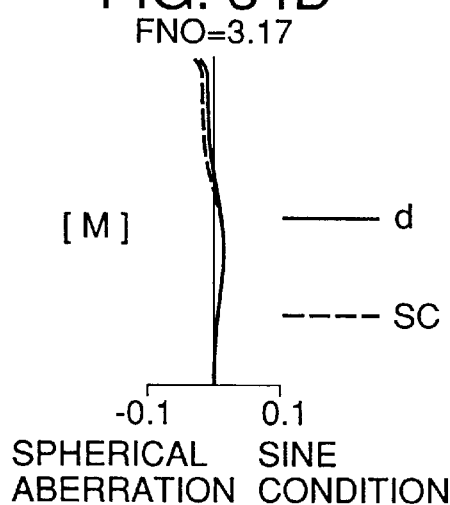
Figure 34E:
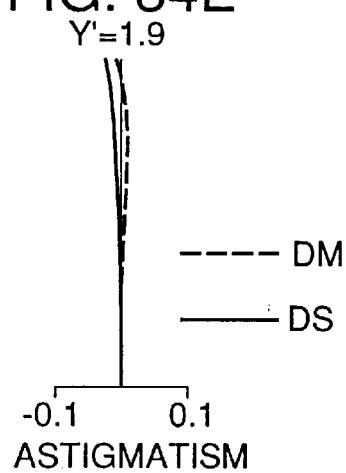
Figure 34F:
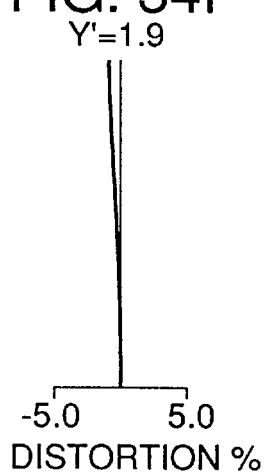
Figure 34G:
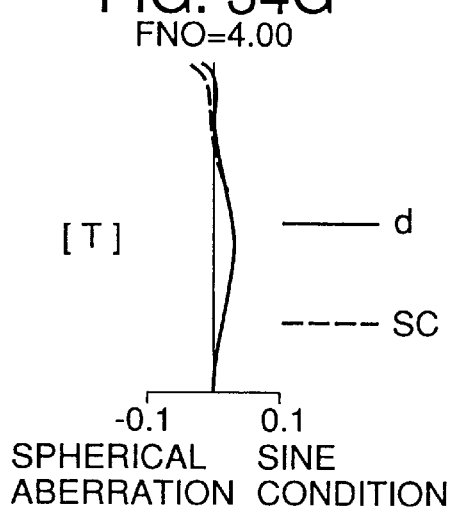
Figure 34H:
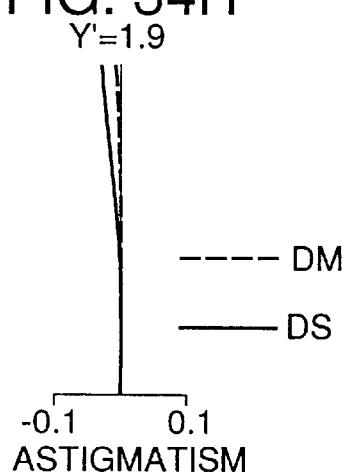
Figure 34I:
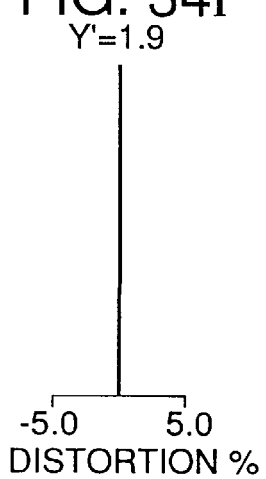
Figure 36A:
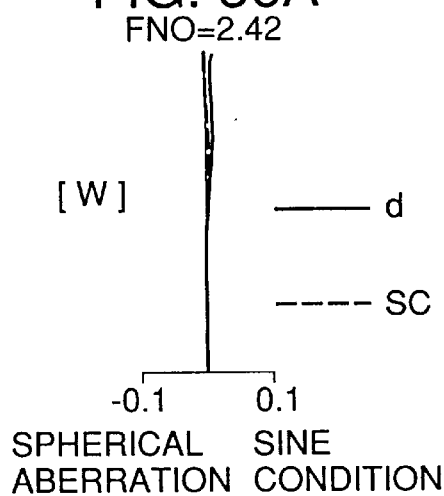
FIGS. 36A to 36I are aberration diagrams of the seventeenth embodiment.
Figure 36B:
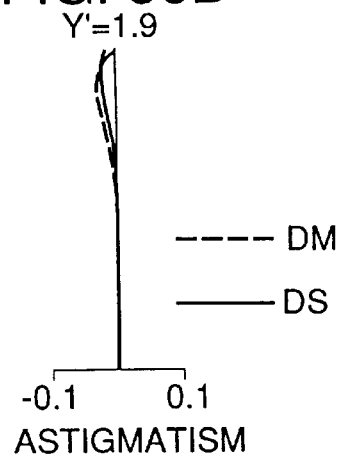
Figure 36C:
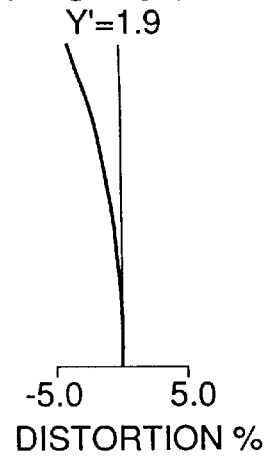
Figure 36D:
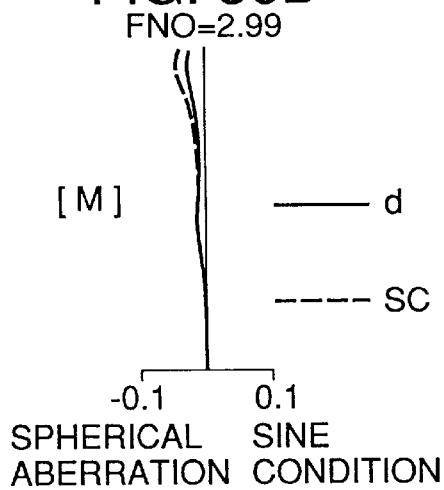
Figure 36E:
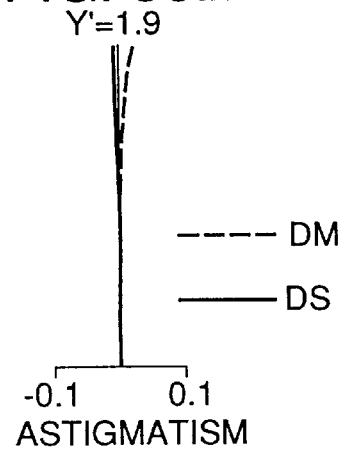
Figure 36F:
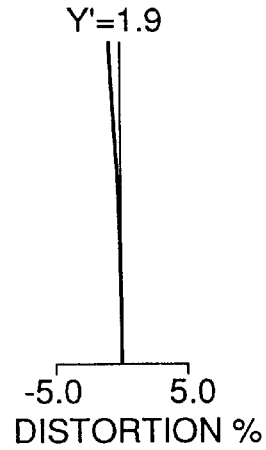
Figure 36G:
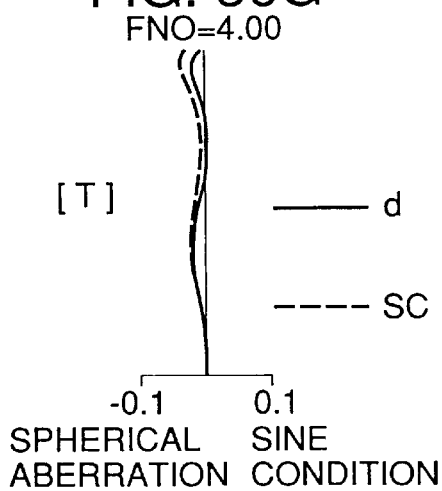
Figure 36H:
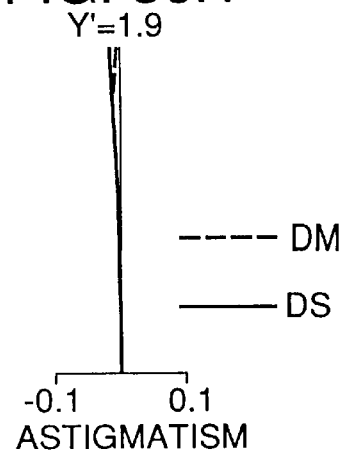
Figure 36I:
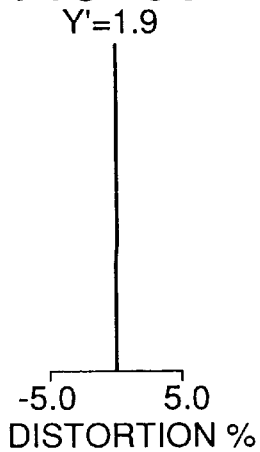
Figure 37A:
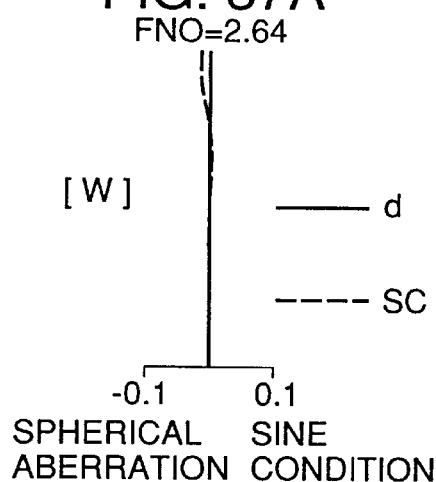
FIGS. 37A to 37I are aberration diagrams of the eighteenth embodiment.
Figure 37B:
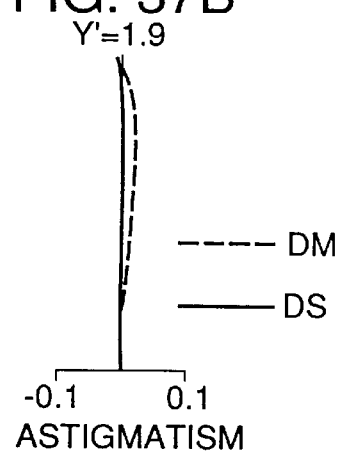
Figure 37C:
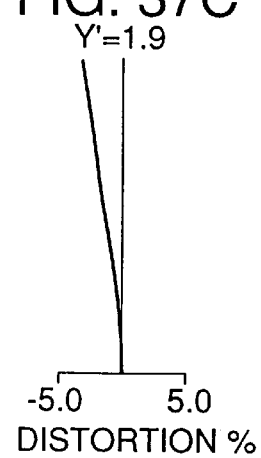
Figure 37D:
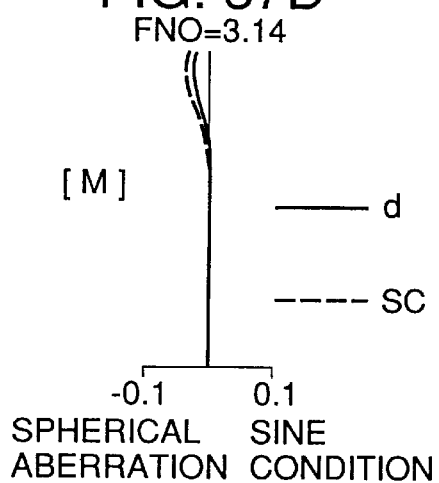
Figure 37E:
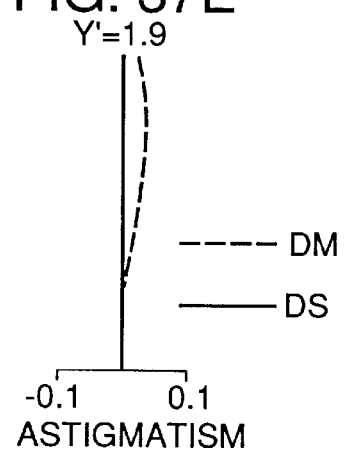
Figure 37F:
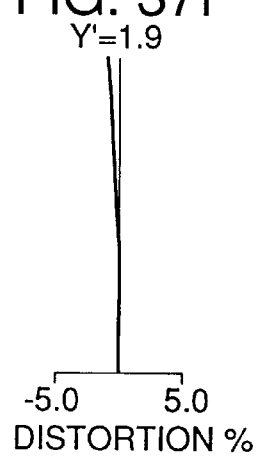
Figure 37G:
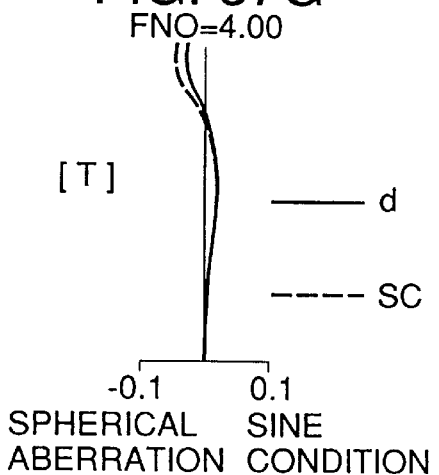
Figure 37H:
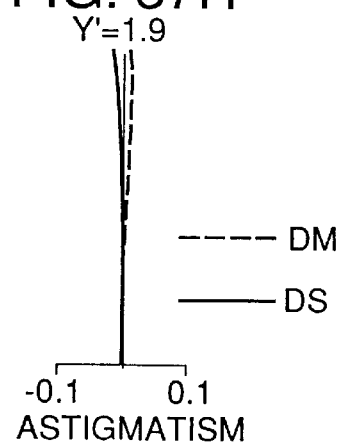
Figure 37I:
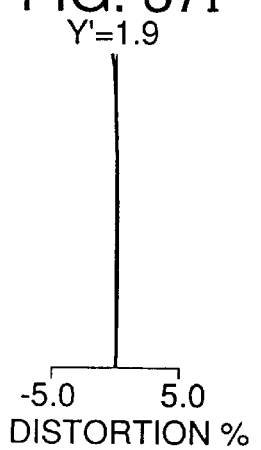
Figure 38A:
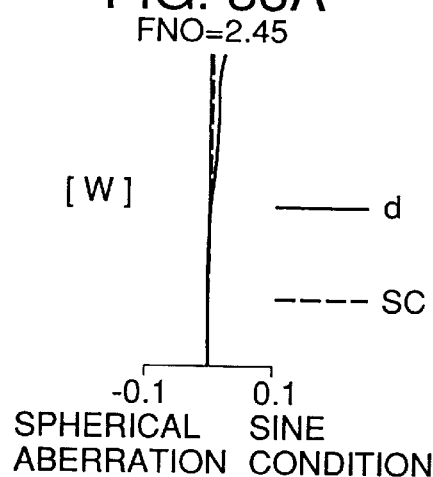
FIGS. 38A to 38I are aberration diagrams of the nineteenth embodiment.
Figure 38B:
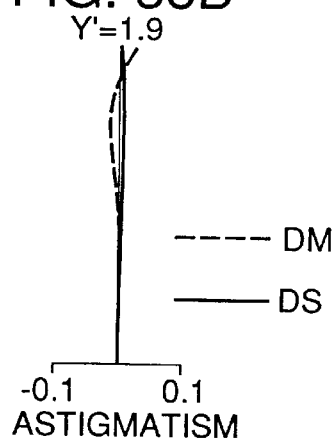
Figure 38C:
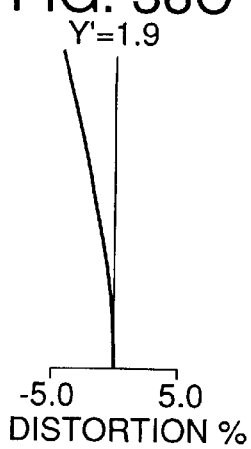
Figure 38D:
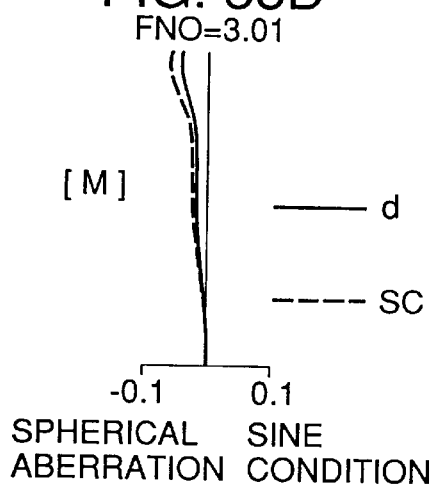
Figure 38E:
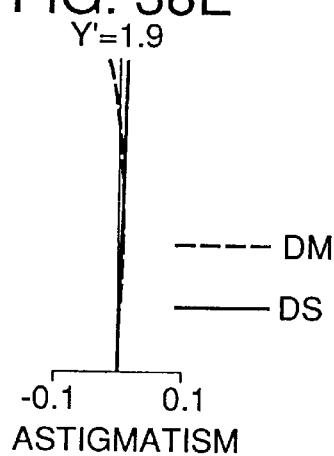
Figure 38F:
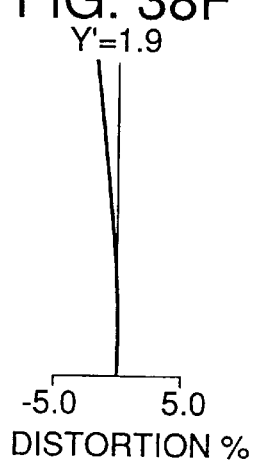
Figure 38G:
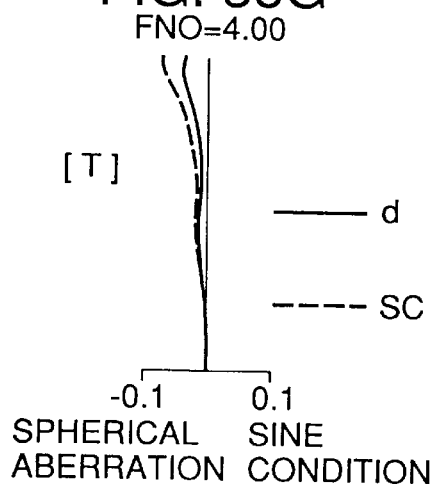
Figure 38H:
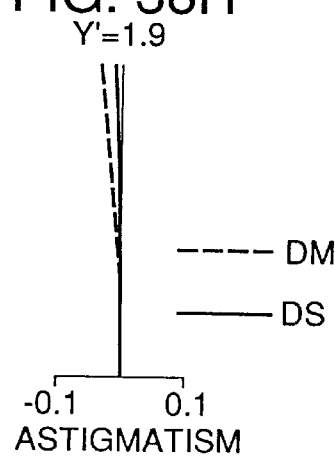
Figure 38I:
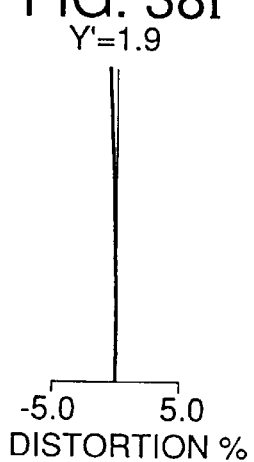

FIGS. 33A–33I, 34A–34I, 35A–35I, 36A–36I, 37A–37I, and 38A–38I are aberration diagrams of the examples of the fourteenth to nineteenth embodiments, respectively. Of these aberration diagrams, FIGS. 33A–33C, 34A–34C, 35A–35C, 36A–36C, 37A–37C, and 38A–38C show the aberrations observed at the wide-angle end [W], FIGS. 33D–33F, 34D–34F, 35D–35F, 36D–36F, 37D–37F, and 38D–38F show the aberrations observed at the middle-focal-length position [M], and FIGS. 33G–33I, 34G–34I, 35G–35I, 36G–36I, 37G–37I, and 38G–38I show the aberrations observed at the telephoto end [T], with FIGS. 33A, 33D, 33G, 34A, 34D, 34G, 35A, 35D, 35G, 36A, 36D, 36G, 37A, 37D, 37G, 38A, 38D, and 38G showing the spherical aberration and sine condition, FIGS. 33B, 33E, 33H, 34B, 34E, 34H, 35B, 35E, 35H, 36B, 36E, 36H, 37B, 37E, 37H, 38B, 38E, and 38H showing the astigmatism, and FIGS. 33C, 33F, 33I, 34C, 34F, 34I, 35C, 35F, 35I, 36C, 36F, 36I, 37C, 37F, 37I, 38C, 38F, and 38I showing the distortion. In the spherical aberration diagrams, the solid line (d) and the broken line (SC) show the spherical aberration for d-line and the sine condition, respectively; in the astigmatism diagrams, the broken line (DM) and the solid line (DS) show the astigmatism for d-line on the meridional plane and on the sagittal plane, respectively.

This application is based on application Nos. 9-90963, 9-90994, and 9-306707 filed in Japan, the contents of which are hereby incorporated by reference.

TABLE 1

<< Construction Data of Embodiment 1 >>
f = 3.3 ~5.5 ~9.4
FNO = 3.49~4.30~5.80

| Radius of Curvature | Axial Distance | Refractive Index | Abbe Number |
|---|---|---|---|
| r1 = 8.963 | d1 = 0.400 | N1 = 1.62280 | ν1 = 56.88 |
| r2 = 1.935 | d2 = 1.089 | | |
| r3* = 14.624 | d3 = 1.756 | N2 = 1.84666 | ν2 = 23.82 |
| r4* = 458.663 | d4 = 6.379~2.624~0.400 | | |
| r5 = ∞ | d5 = 0.400 | | |
| (Aperture Diaphragm A) | | | |
| r6 = 2.565 | d6 = 2.140 | N3 = 1.48749 | ν3 = 70.44 |
| r7 = −6.784 | d7 = 0.100 | | |
| r8* = 12.365 | d8 = 2.375 | N4 = 1.84666 | ν4 = 23.82 |
| r9* = 54.650 | d9 = 0.800~2.937~6.550 | | |
| r10 = ∞ | d10 = 4.200 | N5 = 1.54426 | ν5 = 69.60 |
| r11 = ∞ | | | |

[Aspherical Coefficients of Surface r3]

$\epsilon$ = 1.0000
$A4$ = 0.29913 × $10^{-2}$
$A6$ = 0.84749 × $10^{-3}$
$A8$ = 0.36478 × $10^{-3}$
$A10$ = −0.16681 × $10^{-3}$
$A12$ = 0.50168 × $10^{-4}$

[Aspherical Coefficients of Surface r4]

$\epsilon$ = 1.0000
$A4$ = −0.41853 × $10^{-2}$
$A6$ = 0.24351 × $10^{-2}$
$A8$ = −0.16835 × $10^{-2}$
$A10$ = 0.51823 × $10^{-3}$
$A12$ = −0.49051 × $10^{-4}$

[Aspherical Coefficients of Surface r8]

$\epsilon$ = 1.0000
$A4$ = −0.87194 × $10^{-2}$
$A6$ = −0.11196 × $10^{-2}$
$A8$ = 0.80124 × $10^{-3}$
$A10$ = −0.41566 × $10^{-3}$
$A12$ = 0.39561 × $10^{-4}$

[Aspherical Coefficients of Surface r9]

$\epsilon$ = 1.0000
$A4$ = 0.45693 × $10^{-2}$
$A6$ = −0.64481 × $10^{-2}$
$A8$ = 0.92357 × $10^{-2}$
$A10$ = −0.50204 × $10^{-2}$
$A12$ = 0.10223 × $10^{-2}$

[Values of Condition (5) on Surface r3]

y = 0.00ymax ... {|x|-|x0|}/{C0 · (N'-N) · f1} = −0.00000
y = 0.10ymax ... {|x|-|x0|}/{C0 · (N'-N) · f1} = −0.00001
y = 0.20ymax ... {|x|-|x0|}/{C0 · (N'-N) · f1} = −0.00009
y = 0.30ymax ... {|x|-|x0|}/{C0 · (N'-N) · f1} = −0.00046
y = 0.40ymax ... {|x|-|x0|}/{C0 · (N'-N) · f1} = −0.00153
y = 0.50ymax ... {|x|-|x0|}/{C0 · (N'-N) · f1} = −0.00401
y = 0.60ymax ... {|x|-|x0|}/{C0 · (N'-N) · f1} = −0.00905
y = 0.70ymax ... {|x|-|x0|}/{C0 · (N'-N) · f1} = −0.01849
y = 0.80ymax ... {|x|-|x0|}/{C0 · (N'-N) · f1} = −0.03530
y = 0.90ymax ... {|x|-|x0|}/{C0 · (N'-N) · f1} = −0.06456
y = 1.00ymax ... {|x|-|x0|}/{C0 · (N'-N) · f1} = −0.11602

[Values of Condition (5) on Surface r4]

y = 0.00ymax ... {|x|-|x0|}/{C0 · (N'-N) · f1} = 0.00000
y = 0.10ymax ... {|x|-|x0|}/{C0 · (N'-N) · f1} = −0.00015
y = 0.20ymax ... {|x|-|x0|}/{C0 · (N'-N) · f1} = −0.00236
y = 0.30ymax ... {|x|-|x0|}/{C0 · (N'-N) · f1} = −0.01135
y = 0.40ymax ... {|x|-|x0|}/{C0 · (N'-N) · f1} = −0.03188
y = 0.50ymax ... {|x|-|x0|}/{C0 · (N'-N) · f1} = −0.02559
y = 0.60ymax ... {|x|-|x0|}/{C0 · (N'-N) · f1} = 0.00217
y = 0.70ymax ... {|x|-|x0|}/{C0 · (N'-N) · f1} = 0.06296

TABLE 1-continued

<< Construction Data of Embodiment 1 >>
f = 3.3 ~5.5 ~9.4
FNO = 3.49~4.30~5.80 y = 0.80ymax ... {|x|-|x0|}/{C0 · (N'-N) · f1} = 0.17201
y = 0.90ymax ... {|x|-|x0|}/{C0 · (N'-N) · f1} = 0.34486
y = 1.00ymax ... {|x|-|x0|}/{C0 · (N'-N) · f1} = 0.58534

[Values of Condition (6) on Surface r8]

y = 0.00ymax ... {|x|-|x0|}/{C0 · (N'-N) · f2} = −0.00000
y = 0.10ymax ... {|x|-|x0|}/{C0 · (N'-N) · f2} = −0.00001
y = 0.20ymax ... {|x|-|x0|}/{C0 · (N'-N) · f2} = −0.00011
y = 0.30ymax ... {|x|-|x0|}/{C0 · (N'-N) · f2} = −0.00055
y = 0.40ymax ... {|x|-|x0|}/{C0 · (N'-N) · f2} = −0.00175
y = 0.50ymax ... {|x|-|x0|}/{C0 · (N'-N) · f2} = −0.00432
y = 0.60ymax ... {|x|-|x0|}/{C0 · (N'-N) · f2} = −0.00907
y = 0.70ymax ... {|x|-|x0|}/{C0 · (N'-N) · f2} = −0.01702
y = 0.80ymax ... {|x|-|x0|}/{C0 · (N'-N) · f2} = −0.02950
y = 0.90ymax ... {|x|-|x0|}/{C0 · (N'-N) · f2} = −0.04829
y = 1.00ymax ... {|x|-|x0|}/{C0 · (N'-N) · f2} = −0.07602

[Values of Condition (6) on Surface r9]

y = 0.00ymax ... {|x|-|x0|}/{C0 · (N'-N) · f2} = −0.00000
y = 0.10ymax ... {|x|-|x0|}/{C0 · (N'-N) · f2} = −0.00001
y = 0.20ymax ... {|x|-|x0|}/{C0 · (N'-N) · f2} = −0.00020
y = 0.30ymax ... {|x|-|x0|}/{C0 · (N'-N) · f2} = −0.00092
y = 0.40ymax ... {|x|-|x0|}/{C0 · (N'-N) · f2} = −0.00261
y = 0.50ymax ... {|x|-|x0|}/{C0 · (N'-N) · f2} = −0.00587
y = 0.60ymax ... {|x|-|x0|}/{C0 · (N'-N) · f2} = −0.01175
y = 0.70ymax ... {|x|-|x0|}/{C0 · (N'-N) · f2} = −0.02227
y = 0.80ymax ... {|x|-|x0|}/{C0 · (N'-N) · f2} = −0.04058
y = 0.90ymax ... {|x|-|x0|}/{C0 · (N'-N) · f2} = −0.07058
y = 1.00ymax ... {|x|-|x0|}/{C0 · (N'-N) · f2} = −0.11751

TABLE 2

<< Construction Data of Embodiment 2 >>
f = 3.3 ~5.5 ~9.4
FNO = 2.10~2.39~2.90

| Radius of Curvature | Axial Distance | Refractive Index | Abbe Number |
|---|---|---|---|
| r1 = 8.490 | d1 = 0.500 | N1 = 1.62280 | ν1 = 56.88 |
| r2 = 4.576 | d2 = 1.259 | | |
| r3 = 9.683 | d3 = 0.400 | N2 = 1.75450 | ν2 = 51.57 |
| r4 = 4.382 | d4 = 1.234 | | |
| r5* = 14.281 | d5 = 2.431 | N3 = 1.84666 | ν3 = 23.82 |
| r6* = 59.441 | d6 = 15.193~5.903~0.400 | | |
| r7 = ∞ | d7 = 0.400 | | |
| (Aperture Diaphragm A) | | | |
| r8 = 6.060 | d8 = 1.552 | N4 = 1.48749 | ν4 = 70.44 |
| r9 = 16.990 | d9 = 0.100 | | |
| r10 = 5.330 | d10 = 4.192 | N5 = 1.48749 | ν5 = 70.44 |
| r11 = −4.880 | d11 = 0.176 | | |
| r12* = −4.207 | d12 = 2.363 | N6 = 1.84666 | ν6 = 23.82 |
| r13* = −8.306 | d13 = 0.800~2.613~5.677 | | |
| r14 = ∞ | d14 = 4.200 | N7 = 1.54426 | ν7 = 69.60 |
| r15 = ∞ | | | |

[Aspherical Coefficients of Surface r5]

$\epsilon$ = 1.0000
$A4$ = −0.26160 × $10^{-3}$
$A6$ = 0.46890 × $10^{-4}$
$A8$ = −0.71229 × $10^{-5}$
$A10$ = 0.85206 × $10^{-6}$
$A12$ = −0.26007 × $10^{-7}$

[Aspherical Coefficients of Surface r6]

$\epsilon$ = 1.0000
$A4$ = −0.13287 × $10^{-2}$
$A6$ = 0.93286 × $10^{-4}$
$A8$ = −0.23576 × $10^{-4}$
$A10$ = 0.24749 × $10^{-5}$
$A12$ = −0.99213 × $10^{-7}$

TABLE 2-continued

<< Construction Data of Embodiment 2 >>
f = 3.3 ~5.5 ~9.4
FNO = 2.10~2.39~2.90

[Aspherical Coefficients of Surface r12]

$\epsilon = 1.0000$
$A4 = -0.62363 \times 10^{-3}$
$A6 = -0.51179 \times 10^{-3}$
$A8 = 0.42847 \times 10^{-3}$
$A10 = -0.10578 \times 10^{-3}$
$A12 = 0.94595 \times 10^{-5}$

[Aspherical Coefficients of Surface r13]

$\epsilon = 1.0000$
$A4 = 0.15534 \times 10^{-2}$
$A6 = -0.96434 \times 10^{-3}$
$A8 = 0.57132 \times 10^{-3}$
$A10 = -0.13168 \times 10^{-3}$
$A12 = 0.11264 \times 10^{-5}$

[Values of Condition (5) on Surface r5]

y = 0.00ymax ... $\{|x|-|x0|\}/\{C0 \cdot (N'-N) \cdot f1\} = -0.00000$
y = 0.10ymax ... $\{|x|-|x0|\}/\{C0 \cdot (N'-N) \cdot f1\} = -0.00000$
y = 0.20ymax ... $\{|x|-|x0|\}/\{C0 \cdot (N'-N) \cdot f1\} = -0.00006$
y = 0.30ymax ... $\{|x|-|x0|\}/\{C0 \cdot (N'-N) \cdot f1\} = -0.00027$
y = 0.40ymax ... $\{|x|-|x0|\}/\{C0 \cdot (N'-N) \cdot f1\} = -0.00076$
y = 0.50ymax ... $\{|x|-|x0|\}/\{C0 \cdot (N'-N) \cdot f1\} = -0.00164$
y = 0.60ymax ... $\{|x|-|x0|\}/\{C0 \cdot (N'-N) \cdot f1\} = -0.00294$
y = 0.70ymax ... $\{|x|-|x0|\}/\{C0 \cdot (N'-N) \cdot f1\} = -0.00446$
y = 0.80ymax ... $\{|x|-|x0|\}/\{C0 \cdot (N'-N) \cdot f1\} = -0.00544$
y = 0.90ymax ... $\{|x|-|x0|\}/\{C0 \cdot (N'-N) \cdot f1\} = -0.00372$
y = 1.00ymax ... $\{|x|-|x0|\}/\{C0 \cdot (N'-N) \cdot f1\} = -0.00541$

[Values of Condition (5) on Surface r6]

y = 0.00ymax ... $\{|x|-|x0|\}/\{C0 \cdot (N'-N) \cdot f1\} = 0.00000$
y = 0.10ymax ... $\{|x|-|x0|\}/\{C0 \cdot (N'-N) \cdot f1\} = -0.00007$
y = 0.20ymax ... $\{|x|-|x0|\}/\{C0 \cdot (N'-N) \cdot f1\} = -0.00107$
y = 0.30ymax ... $\{|x|-|x0|\}/\{C0 \cdot (N'-N) \cdot f1\} = -0.00530$
y = 0.40ymax ... $\{|x|-|x0|\}/\{C0 \cdot (N'-N) \cdot f1\} = -0.01634$
y = 0.50ymax ... $\{|x|-|x0|\}/\{C0 \cdot (N'-N) \cdot f1\} = -0.03910$
y = 0.60ymax ... $\{|x|-|x0|\}/\{C0 \cdot (N'-N) \cdot f1\} = -0.08016$
y = 0.70ymax ... $\{|x|-|x0|\}/\{C0 \cdot (N'-N) \cdot f1\} = -0.14827$
y = 0.80ymax ... $\{|x|-|x0|\}/\{C0 \cdot (N'-N) \cdot f1\} = -0.25439$
y = 0.90ymax ... $\{|x|-|x0|\}/\{C0 \cdot (N'-N) \cdot f1\} = -0.41140$
y = 1.00ymax ... $\{|x|-|x0|\}/\{C0 \cdot (N'-N) \cdot f1\} = -0.39402$

[Values of Condition (6) on Surface r12]

y = 0.00ymax ... $\{|x|-|x0|\}/\{C0 \cdot (N'-N) \cdot f2\} = -0.00000$
y = 0.10ymax ... $\{|x|-|x0|\}/\{C0 \cdot (N'-N) \cdot f2\} = -0.00000$
y = 0.20ymax ... $\{|x|-|x0|\}/\{C0 \cdot (N'-N) \cdot f2\} = -0.00001$
y = 0.30ymax ... $\{|x|-|x0|\}/\{C0 \cdot (N'-N) \cdot f2\} = -0.00005$
y = 0.40ymax ... $\{|x|-|x0|\}/\{C0 \cdot (N'-N) \cdot f2\} = -0.00017$
y = 0.50ymax ... $\{|x|-|x0|\}/\{C0 \cdot (N'-N) \cdot f2\} = -0.00042$
y = 0.60ymax ... $\{|x|-|x0|\}/\{C0 \cdot (N'-N) \cdot f2\} = -0.00084$
y = 0.70ymax ... $\{|x|-|x0|\}/\{C0 \cdot (N'-N) \cdot f2\} = -0.00137$
y = 0.80ymax ... $\{|x|-|x0|\}/\{C0 \cdot (N'-N) \cdot f2\} = -0.00190$
y = 0.90ymax ... $\{|x|-|x0|\}/\{C0 \cdot (N'-N) \cdot f2\} = -0.00225$
y = 1.00ymax ... $\{|x|-|x0|\}/\{C0 \cdot (N'-N) \cdot f2\} = -0.00214$

[Values of Condition (6) on Surface r13]

y = 0.00ymax ... $\{|x|-|x0|\}/\{C0 \cdot (N'-N) \cdot f2\} = 0.00000$
y = 0.00ymax ... $\{|x|-|x0|\}/\{C0 \cdot (N'-N) \cdot f2\} = -0.00000$
y = 0.20ymax ... $\{|x|-|x0|\}/\{C0 \cdot (N'-N) \cdot f2\} = -0.00004$
y = 0.30ymax ... $\{|x|-|x0|\}/\{C0 \cdot (N'-N) \cdot f2\} = -0.00018$
y = 0.40ymax ... $\{|x|-|x0|\}/\{C0 \cdot (N'-N) \cdot f2\} = -0.00052$
y = 0.50ymax ... $\{|x|-|x0|\}/\{C0 \cdot (N'-N) \cdot f2\} = -0.00116$
y = 0.60ymax ... $\{|x|-|x0|\}/\{C0 \cdot (N'-N) \cdot f2\} = -0.00229$
y = 0.70ymax ... $\{|x|-|x0|\}/\{C0 \cdot (N'-N) \cdot f2\} = -0.00431$
y = 0.80ymax ... $\{|x|-|x0|\}/\{C0 \cdot (N'-N) \cdot f2\} = -0.00779$
y = 0.90ymax ... $\{|x|-|x0|\}/\{C0 \cdot (N'-N) \cdot f2\} = -0.01340$
y = 1.00ymax ... $\{|x|-|x0|\}/\{C0 \cdot (N'-N) \cdot f2\} = -0.02200$

TABLE 3

<< Construction Data of Embodiment 3 >>
f = 3.3 ~5.5 ~9.4
FNO = 2.03~2.35~2.90

| Radius of Curvature | Axial Distance | Refractive Index | Abbe Number |
|---|---|---|---|
| r1* = 52.424 | d1 = 0.400 | N1 = 1.62280 | ν1 = 56.88 |
| r2 = 3.727 | d2 = 1.820 | | |
| r3* = 9.469 | d3 = 3.022 | N2 = 1.84666 | ν2 = 23.82 |
| r4* = 17.105 | d4 = 13.730~5.359~0.400 | | |
| r5 = ∞ | d5 = 0.400 | | |
| (Aperture Diaphragm A) | | | |
| r6* = 4.250 | d6 = 4.512 | N3 = 1.48749 | ν3 = 70.44 |
| r7 = -4.499 | d7 = 0.156 | | |
| r8* = -9.278 | d8 = 2.361 | N4 = 1.84666 | ν4 = 23.82 |
| r9* = 37.289 | d9 = 0.800~2.540~5.481 | | |
| r10 = ∞ | d10 = 4.200 | N5 = 1.54426 | ν5 = 69.60 |
| r11 = ∞ | | | |

[Aspherical Coefficients of Surface r1]

$\epsilon = 1.0000$
$A4 = 0.16304 \times 10^{-2}$
$A6 = -0.69685 \times 10^{-4}$
$A8 = 0.17269 \times 10^{-5}$

[Aspherical Coefficients of Surface r3]

$\epsilon = 1.0000$
$A4 = -0.10366 \times 10^{-2}$
$A6 = 0.72273 \times 10^{-4}$
$A8 = -0.63612 \times 10^{-5}$
$A10 = 0.11953 \times 10^{-5}$
$A12 = -0.53481 \times 10^{-7}$

[Aspherical Coefficients of Surface r4]

$\epsilon = 1.0000$
$A4 = -0.12695 \times 10^{-2}$
$A6 = 0.57868 \times 10^{-4}$
$A8 = -0.13107 \times 10^{-4}$
$A10 = 0.22643 \times 10^{-5}$
$A12 = -0.14283 \times 10^{-6}$

[Aspherical Coefficients of Surface r6]

$\epsilon = 1.0000$
$A4 = -0.10435 \times 10^{-2}$
$A6 = -0.14792 \times 10^{-3}$
$A8 = 0.14927 \times 10^{-4}$
$A10 = -0.28654 \times 10^{-5}$

[Aspherical Coefficients of Surface r8]

$\epsilon = 1.0000$
$A4 = -0.27963 \times 10^{-2}$
$A6 = -0.46537 \times 10^{-3}$
$A8 = 0.19649 \times 10^{-3}$
$A10 = -0.34003 \times 10^{-4}$
$A12 = 0.24924 \times 10^{-5}$

[Aspherical Coefficients of Surface r9]

$\epsilon = 1.0000$
$A4 = 0.55843 \times 10^{-3}$
$A6 = -0.11082 \times 10^{-2}$
$A8 = 0.61307 \times 10^{-3}$
$A10 = -0.13271 \times 10^{-3}$
$A12 = 0.11115 \times 10^{-4}$

[Values of Condition (5) on Surface r1]

y = 0.00ymax ... $\{|x|-|x0|\}/\{C0 \cdot (N'-N) \cdot f1\} = -0.00000$
y = 0.10ymax ... $\{|x|-|x0|\}/\{C0 \cdot (N'-N) \cdot f1\} = -0.00028$
y = 0.20ymax ... $\{|x|-|x0|\}/\{C0 \cdot (N'-N) \cdot f1\} = -0.00437$
y = 0.30ymax ... $\{|x|-|x0|\}/\{C0 \cdot (N'-N) \cdot f1\} = -0.02146$
y = 0.40ymax ... $\{|x|-|x0|\}/\{C0 \cdot (N'-N) \cdot f1\} = -0.06513$
y = 0.50ymax ... $\{|x|-|x0|\}/\{C0 \cdot (N'-N) \cdot f1\} = -0.15105$
y = 0.60ymax ... $\{|x|-|x0|\}/\{C0 \cdot (N'-N) \cdot f1\} = -0.29464$
y = 0.70ymax ... $\{|x|-|x0|\}/\{C0 \cdot (N'-N) \cdot f1\} = -0.50939$
y = 0.80ymax ... $\{|x|-|x0|\}/\{C0 \cdot (N'-N) \cdot f1\} = -0.80689$
y = 0.90ymax ... $\{|x|-|x0|\}/\{C0 \cdot (N'-N) \cdot f1\} = -1.19984$
y = 1.00ymax ... $\{|x|-|x0|\}/\{C0 \cdot (N'-N) \cdot f1\} = -1.70944$

TABLE 3-continued

<< Construction Data of Embodiment 3 >>
f = 3.3 ~5.5 ~9.4
FNO = 2.03~2.35~2.90

[Values of Condition (5) on Surface r3]

y = 0.00ymax . . . {|x|-|x0|}/{C0 · (N'-N) · f1} = −0.00000
y = 0.10ymax . . . {|x|-|x0|}/{C0 · (N'-N) · f1} =  0.00001
y = 0.20ymax . . . {|x|-|x0|}/{C0 · (N'-N) · f1} =  0.00017
y = 0.30ymax . . . {|x|-|x0|}/{C0 · (N'-N) · f1} =  0.00084
y = 0.40ymax . . . {|x|-|x0|}/{C0 · (N'-N) · f1} =  0.00255
y = 0.50ymax . . . {|x|-|x0|}/{C0 · (N'-N) · f1} =  0.00589
y = 0.60ymax . . . {|x|-|x0|}/{C0 · (N'-N) · f1} =  0.01134
y = 0.70ymax . . . {|x|-|x0|}/{C0 · (N'-N) · f1} =  0.01898
y = 0.80ymax . . . {|x|-|x0|}/{C0 · (N'-N) · f1} =  0.02785
y = 0.90ymax . . . {|x|-|x0|}/{C0 · (N'-N) · f1} =  0.03522
y = 1.00ymax . . . {|x|-|x0|}/{C0 · (N'-N) · f1} =  0.03633
[Values of Condition (5) on Surface r4]

y = 0.00ymax . . . {|x|-|x0|}/{C0 · (N'-N) · f1} =  0.00000
y = 0.10ymax . . . {|x|-|x0|}/{C0 · (N'-N) · f1} = −0.00001
y = 0.20ymax . . . {|x|-|x0|}/{C0 · (N'-N) · f1} = −0.00024
y = 0.30ymax . . . {|x|-|x0|}/{C0 · (N'-N) · f1} = −0.00118
y = 0.40ymax . . . {|x|-|x0|}/{C0 · (N'-N) · f1} = −0.00368
y = 0.50ymax . . . {|x|-|x0|}/{C0 · (N'-N) · f1} = −0.00883
y = 0.60ymax . . . {|x|-|x0|}/{C0 · (N'-N) · f1} = −0.01798
y = 0.70ymax . . . {|x|-|x0|}/{C0 · (N'-N) · f1} = −0.03262
y = 0.80ymax . . . {|x|-|x0|}/{C0 · (N'-N) · f1} = −0.05429
y = 0.90ymax . . . {|x|-|x0|}/{C0 · (N'-N) · f1} = −0.08460
y = 1.00ymax . . . {|x|-|x0|}/{C0 · (N'-N) · f1} = −0.12652
[Values of Condition (6) on Surface r6]

y = 0.00ymax . . . {|x|-|x0|}/{C0 · (N'-N) · f2} =  0.00000
y = 0.10ymax . . . {|x|-|x0|}/{C0 · (N'-N) · f2} = −0.00001
y = 0.20ymax . . . {|x|-|x0|}/{C0 · (N'-N) · f2} = −0.00008
y = 0.30ymax . . . {|x|-|x0|}/{C0 · (N'-N) · f2} = −0.00043
y = 0.40ymax . . . {|x|-|x0|}/{C0 · (N'-N) · f2} = −0.00144
y = 0.50ymax . . . {|x|-|x0|}/{C0 · (N'-N) · f2} = −0.00374
y = 0.60ymax . . . {|x|-|x0|}/{C0 · (N'-N) · f2} = −0.00827
y = 0.70ymax . . . {|x|-|x0|}/{C0 · (N'-N) · f2} = −0.01654
y = 0.80ymax . . . {|x|-|x0|}/{C0 · (N'-N) · f2} = −0.03101
y = 0.90ymax . . . {|x|-|x0|}/{C0 · (N'-N) · f2} = −0.05607
y = 1.00ymax . . . {|x|-|x0|}/{C0 · (N'-N) · f2} = −0.10014
[Values of Condition (6) on Surface r8]

y = 0.00ymax . . . {|x|-|x0|}/{C0 · (N'-N) · f2} = −0.00000
y = 0.10ymax . . . {|x|-|x0|}/{C0 · (N'-N) · f2} = −0.00001
y = 0.20ymax . . . {|x|-|x0|}/{C0 · (N'-N) · f2} = −0.00013
y = 0.30ymax . . . {|x|-|x0|}/{C0 · (N'-N) · f2} = −0.00069
y = 0.40ymax . . . {|x|-|x0|}/{C0 · (N'-N) · f2} = −0.00224
y = 0.50ymax . . . {|x|-|x0|}/{C0 · (N'-N) · f2} = −0.00561
y = 0.60ymax . . . {|x|-|x0|}/{C0 · (N'-N) · f2} = −0.01181
y = 0.70ymax . . . {|x|-|x0|}/{C0 · (N'-N) · f2} = −0.02197
y = 0.80ymax . . . {|x|-|x0|}/{C0 · (N'-N) · f2} = −0.03724
y = 0.90ymax . . . {|x|-|x0|}/{C0 · (N'-N) · f2} = −0.05864
y = 1.00ymax . . . {|x|-|x0|}/{C0 · (N'-N) · f2} = −0.08676
[Values of Condition (6) on Surface r9]

y = 0.00ymax . . . {|x|-|x0|}/{C0 · (N'-N) · f2} =  0.00000
y = 0.10ymax . . . {|x|-|x0|}/{C0 · (N'-N) · f2} = −0.00000
y = 0.20ymax . . . {|x|-|x0|}/{C0 · (N'-N) · f2} = −0.00006
y = 0.30ymax . . . {|x|-|x0|}/{C0 · (N'-N) · f2} = −0.00017
y = 0.40ymax . . . {|x|-|x0|}/{C0 · (N'-N) · f2} = −0.00019
y = 0.50ymax . . . {|x|-|x0|}/{C0 · (N'-N) · f2} =  0.00022
y = 0.60ymax . . . {|x|-|x0|}/{C0 · (N'-N) · f2} =  0.00120
y = 0.70ymax . . . {|x|-|x0|}/{C0 · (N'-N) · f2} =  0.00215
y = 0.80ymax . . . {|x|-|x0|}/{C0 · (N'-N) · f2} =  0.00133
y = 0.90ymax . . . {|x|-|x0|}/{C0 · (N'-N) · f2} = −0.00401
y = 1.00ymax . . . {|x|-|x0|}/{C0 · (N'-N) · f2} = −0.01850

TABLE 4

<< Construction Data of Embodiment 4 >>
f = 3.3 ~5.5 ~9.4
FNO = 1.98~2.32~2.90

| Radius of Curvature | Axial Distance | Refractive Index | Abbe Number |
|---|---|---|---|
| r1 = 8.328 | d1 = 0.500 | N1 = 1.62280 | ν1 = 56.88 |
| r2 = 4.691 | d2 = 1.314 | | |
| r3 = 9.715 | d3 = 0.400 | N2 = 1.75450 | ν2 = 51.57 |
| r4 = 4.322 | d4 = 1.311 | | |
| r5* = 13.436 | d5 = 2.224 | N3 = 1.84666 | ν3 = 23.82 |
| r6* = 42.562 | d6 = 15.308~5.977~0.450 | | |
| r7 = 6.027 | d7 = 1.650 | N4 = 1.48749 | ν4 = 70.44 |
| r8 = 22.029 | d8 = 0.400 | | |
| r9 = ∞ | d9 = 0.400 | | |
| (Aperture Diaphragm A) | | | |
| r10 = 5.506 | d10 = 3.745 | N5 = 1.48749 | ν5 = 70.44 |
| r11 = −5.158 | d11 = 0.144 | | |
| r12* = −4.419 | d12 = 2.404 | N6 = 1.84666 | ν6 = 23.82 |
| r13* = −8.557 | d13 = 0.800~2.621~5.698 | | |
| r14 = ∞ | d14 = 4.200 | N7 = 1.54426 | ν7 = 69.60 |
| r15 = ∞ | | | |

[Aspherical Coefficients of Surface r5]

ε =  1.0000
A4 = −0.36037 × 10⁻³
A6 =  0.61222 × 10⁻⁴
A8 = −0.93657 × 10⁻⁵
A10 =  0.98907 × 10⁻⁶
A12 = −0.26007 × 10⁻⁷
[Aspherical Coefficients of Surface r6]

ε =  1.0000
A4 = −0.14328 × 10⁻²
A6 =  0.11578 × 10⁻³
A8 = −0.26863 × 10⁻⁴
A10 =  0.26675 × 10⁻⁵
A12 = −0.99213 × 10⁻⁷
[Aspherical Coefficients of Surface r12]

ε =  1.0000
A4 = −0.25302 × 10⁻³
A6 = −0.51788 × 10⁻³
A8 =  0.43083 × 10⁻³
A10 = −0.10673 × 10⁻³
A12 =  0.94595 × 10⁻⁵
[Aspherical Coefficients of Surface r13]

ε =  1.0000
A4 =  0.16010 × 10⁻²
A6 = −0.94927 × 10⁻³
A8 =  0.56477 × 10⁻³
A10 = −0.13114 × 10⁻³
A12 =  0.11264 × 10⁻⁴
[Values of Condition (5) on Surface r5]

y = 0.00ymax . . . {|x|-|x0|}/{C0 · (N'-N) · f1} = −0.00000
y = 0.10ymax . . . {|x|-|x0|}/{C0 · (N'-N) · f1} =  0.00001
y = 0.20ymax . . . {|x|-|x0|}/{C0 · (N'-N) · f1} =  0.00009
y = 0.30ymax . . . {|x|-|x0|}/{C0 · (N'-N) · f1} =  0.00040
y = 0.40ymax . . . {|x|-|x0|}/{C0 · (N'-N) · f1} =  0.00116
y = 0.50ymax . . . {|x|-|x0|}/{C0 · (N'-N) · f1} =  0.00252
y = 0.60ymax . . . {|x|-|x0|}/{C0 · (N'-N) · f1} =  0.00457
y = 0.70ymax . . . {|x|-|x0|}/{C0 · (N'-N) · f1} =  0.00712
y = 0.80ymax . . . {|x|-|x0|}/{C0 · (N'-N) · f1} =  0.00914
y = 0.90ymax . . . {|x|-|x0|}/{C0 · (N'-N) · f1} =  0.00746
y = 1.00ymax . . . {|x|-|x0|}/{C0 · (N'-N) · f1} = −0.00542
[Values of Condition (5) on Surface r6]

y = 0.00ymax . . . {|x|-|x0|}/{C0 · (N'-N) · f1} =  0.00000
y = 0.10ymax . . . {|x|-|x0|}/{C0 · (N'-N) · f1} = −0.00006
y = 0.20ymax . . . {|x|-|x0|}/{C0 · (N'-N) · f1} = −0.00100
y = 0.30ymax . . . {|x|-|x0|}/{C0 · (N'-N) · f1} = −0.00494
y = 0.40ymax . . . {|x|-|x0|}/{C0 · (N'-N) · f1} = −0.01514
y = 0.50ymax . . . {|x|-|x0|}/{C0 · (N'-N) · f1} = −0.03601
y = 0.60ymax . . . {|x|-|x0|}/{C0 · (N'-N) · f1} = −0.07353
y = 0.70ymax . . . {|x|-|x0|}/{C0 · (N'-N) · f1} = −0.13566

TABLE 4-continued

<< Construction Data of Embodiment 4 >>
f = 3.3 ~5.5 ~9.4
FNO = 1.98~2.32~2.90 y = 0.80ymax ... {|x|-|x0|}/{C0 · (N'-N) · f1} = -0.23217
y = 0.90ymax ... {|x|-|x0|}/{C0 · (N'-N) · f1} = -0.37391
y = 1.00ymax ... {|x|-|x0|}/{C0 · (N'-N) · f1} = -0.56482
[Values of Condition (6) on Surface r12]

y = 0.00ymax ... {|x|-|x0|}/{C0 · (N'-N) · f2} = -0.00000
y = 0.10ymax ... {|x|-|x0|}/{C0 · (N'-N) · f2} = -0.00000
y = 0.20ymax ... {|x|-|x0|}/{C0 · (N'-N) · f2} = -0.00000
y = 0.30ymax ... {|x|-|x0|}/{C0 · (N'-N) · f2} = -0.00003
y = 0.40ymax ... {|x|-|x0|}/{C0 · (N'-N) · f2} = -0.00010
y = 0.50ymax ... {|x|-|x0|}/{C0 · (N'-N) · f2} = -0.00025
y = 0.60ymax ... {|x|-|x0|}/{C0 · (N'-N) · f2} = -0.00047
y = 0.70ymax ... {|x|-|x0|}/{C0 · (N'-N) · f2} = -0.00068
y = 0.80ymax ... {|x|-|x0|}/{C0 · (N'-N) · f2} = -0.00069
y = 0.90ymax ... {|x|-|x0|}/{C0 · (N'-N) · f2} = -0.00030
y = 1.00ymax ... {|x|-|x0|}/{C0 · (N'-N) · f2} =  0.00082
[Values of Condition (6) on Surface r13]

y = 0.00ymax ... {|x|-|x0|}/{C0 · (N'-N) · f2} =  0.00000
y = 0.10ymax ... {|x|-|x0|}/{C0 · (N'-N) · f2} = -0.00000
y = 0.20ymax ... {|x|-|x0|}/{C0 · (N'-N) · f2} = -0.00004
y = 0.30ymax ... {|x|-|x0|}/{C0 · (N'-N) · f2} = -0.00020
y = 0.40ymax ... {|x|-|x0|}/{C0 · (N'-N) · f2} = -0.00056
y = 0.50ymax ... {|x|-|x0|}/{C0 · (N'-N) · f2} = -0.00125
y = 0.60ymax ... {|x|-|x0|}/{C0 · (N'-N) · f2} = -0.00249
y = 0.70ymax ... {|x|-|x0|}/{C0 · (N'-N) · f2} = -0.00467
y = 0.80ymax ... {|x|-|x0|}/{C0 · (N'-N) · f2} = -0.00838
y = 0.90ymax ... {|x|-|x0|}/{C0 · (N'-N) · f2} = -0.01432
y = 1.00ymax ... {|x|-|x0|}/{C0 · (N'-N) · f2} = -0.02331

TABLE 5

<< Values Corresponding to Conditions (1) to (4) >>

|        | Cond. (1) $T_{1-2}/Y'$ | Cond. (2) $|f_1/f_2|/Z$ | Cond. (3): K/T $g^2$ | $g^3$ | $g^4$ | $g^5$ | Cond. (4) Y'×RL |
|---|---|---|---|---|---|---|---|
| Emb. 1 | 0.44 | 0.37 | 0.92 | 0.72 |      |      | 2.25 |
| Emb. 2 | 0.44 | 0.44 |      | 0.96 | 0.78 | 0.70 | 3.47 |
| Emb. 3 | 0.44 | 0.45 | 0.90 | 0.67 |      |      | 3.47 |
| Emb. 4 | 0.25 | 0.43 |      | 0.83 | 0.74 | 0.70 | 3.47 |

TABLE 6

<< Construction Data of Embodiment 5 >> f = 7.2~12.3~20.9
FNO = 3.42~4.29~5.77

| Radius of Curvature | Axial Distance | Refractive Index | Abbe Number |
|---|---|---|---|
| r1* = 35.910 | | | |
|  | d1= 1.501 | N1= 1.78100 | ν1= 44.55 |
| r2 = 5.360 | | | |
|  | d2= 2.310 | | |
| r3 = 7.325 | | | |
|  | d3= 2.569 | N2= 1.80518 | ν2= 25.46 |
| r4 = 10.080 | | | |
|  | d4= 17.097~8.531~3.500 | | |
| r5 = " (Aperture Diaphragm A) | | | |
|  | d5= 1.500 | | |
| r6 = 5.327 | | | |
|  | d6= 4.423 | N3= 1.48749 | ν3= 70.44 |
| r7 = -27.754 | | | |
|  | d7= 0.992 | | |
| r8* = -28.910 | | | |
|  | d8= 2.022 | N4= 1.84666 | ν4= 23.82 |
| r9* = 46.190 | | | |
|  | d9= 1.051 | | |

TABLE 6-continued

<< Construction Data of Embodiment 5 >>

| Radius of Curvature | Axial Distance | Refractive Index | Abbe Number |
|---|---|---|---|
| r10 = 54.281 | | | |
|  | d10 = 2.135 | N5= 1.51823 | ν5= 58.96 |
| r11 = 135.673 | | | |
|  | d11 = 3.000~8.031~16.594 | | |
| r12 = ∞ | | | |
|  | d12 = 4.000 | N6= 1.51680 | ν6= 64.20 |
| r13 = ∞ | | | |

[Aspherical Coefficients of Surface r1]

$\epsilon$ = 1.0000
A4 = 0.14565 × $10^{-3}$
A6 = 0.86451 × $10^{-6}$
A8 = 0.43653 × $10^{-7}$
A10 = -0.51589 × $10^{-9}$
A12 = -0.85722 × $10^{-12}$

[Aspherical Coefficients of Surface r8]

$\epsilon$ = 1.0000
A4 = -0.14326 × $10^{-2}$
A6 = -0.29125 × $10^{-4}$
A8 = -0.39276 × $10^{-6}$
A10 = -0.81955 × $10^{-9}$
A12 = -0.13919 × $10^{-11}$

[Aspherical Coefficients of Surface r9]

$\epsilon$ = 1.0000
A4 = -0.30763 × $10^{-3}$
A6 = 0.26092 × $10^{-4}$
A8 = 0.25298 × $10^{-6}$
A10 = 0.35670 × $10^{-9}$
A12 = -0.17370 × $10^{-13}$

[Values of Condition (9) on Surface r1]

y = 0.00ymax ... {|x| - |x0|}/{C0•(N' - N)}= 0.00000
y = 0.10ymax ... {|x| - |x0|}/{C0•(N' - N)}= 0.00113
y = 0.20ymax ... {|x| - |x0|}/{C0•(N' - N)}= 0.01817
y = 0.30ymax ... {|x| - |x0|}/{C0•(N' - N)}= 0.09336
y = 0.40ymax ... {|x| - |x0|}/{C0•(N' - N)}= 0.30224
y = 0.50ymax ... {|x| - |x0|}/{C0•(N' - N)}= 0.76427
y = 0.60ymax ... {|x| - |x0|}/{C0•(N' - N)}= 1.66156
y = 0.70ymax ... {|x| - |x0|}/{C0•(N' - N)}= 3.26495
y = 0.80ymax ... {|x| - |x0|}/{C0•(N' - N)}= 5.95967
y = 0.90ymax ... {|x| - |x0|}/{C0•(N' - N)}= 10.24934
y = 1.00ymax ... {|x| - |x0|}/{C0•(N' - N)}= 16.69611

[Values of Condition (11) on Surface r8]

y = 0.00ymax ... {|x| - |x0|}/{C0•(N' - N)}= -0.00000
y = 0.10ymax ... {|x| - |x0|}/{C0•(N' - N)}= -0.00018
y = 0.20ymax ... {|x| - |x0|}/{C0•(N' - N)}= -0.00282
y = 0.30ymax ... {|x| - |x0|}/{C0•(N' - N)}= -0.01439
y = 0.40ymax ... {|x| - |x0|}/{C0•(N' - N)}= -0.04586
y = 0.50ymax ... {|x| - |x0|}/{C0•(N' - N)}= -0.11321
y = 0.60ymax ... {|x| - |x0|}/{C0•(N' - N)}= -0.23796
y = 0.70ymax ... {|x| - |x0|}/{C0•(N' - N)}= -0.44800
y = 0.80ymax ... {|x| - |x0|}/{C0•(N' - N)}= -0.77863
y = 0.90ymax ... {|X| - |x0|}/{C0•(N' - N)}= -1.27392
y = 1.00ymax ... {|x| - |x0|}/{C0•(N' - N)}= -1.98838

TABLE 7

<<Construction Data of Embodiment 6 >> f = 7.2~12.3~20.9
FNO = 3.43~4.29~5.77

| Radius of Curvature | Axial Distance | Refractive Index | Abbe Number |
|---|---|---|---|
| r1* = 36.213 | | | |
|  | d1 = 1.562 | N1 = 1.80500 | ν1 = 40.97 |
| r2 = 5.697 | | | |
|  | d2 = 2.250 | | |
| r3 = 7.603 | | | |
|  | d3 = 2.623 | N2 = 1.80518 | ν2 = 25.46 |

TABLE 7-continued

<<Construction Data of Embodiment 6>>

| | | | |
|---|---|---|---|
| r4 = 10.754 | | | |
| | d4 = 17.682~8.748~3.500 | | |
| r5 = " (Aperture Diaphragm A) | | | |
| | d5 = 1.500 | | |
| r6 = 4.881 | | | |
| | d6 = 4.287 | N3 = 1.48749 | ν3 = 70.44 |
| r7 = −44.215 | | | |
| | d7 = 0.510 | | |
| r8* = −30.927 | | | |
| | d8 = 2.124 | N4 = 1.84666 | ν4 = 23.82 |
| r9* = 58.669 | | | |
| | d9 = 1.158 | | |
| r10 = 42.029 | | | |
| | d10 = 2.254 | N5 = 1.51823 | ν5 = 58.96 |
| r11 = 48.047 | | | |
| | d11 = 3.000~7.597~15.420 | | |
| r12 = ∞ | | | |
| | d12 = 4.000 | N6 = 1.51680 | ν6 = 64.20 |
| r13 = ∞ | | | |

[Aspherical Coefficients of Surface r1]

$\epsilon = 1.0000$
$A4 = 0.11342 \times 10^{-3}$
$A6 = 0.95012 \times 10^{-6}$
$A8 = 0.30259 \times 10^{-7}$
$A10 = -0.77644 \times 10^{-9}$
$A12 = 0.75944 \times 10^{-11}$

[Aspherical Coefficients of Surface r8]

$\epsilon = 1.0000$
$A4 = -0.11520 \times 10^{-2}$
$A6 = -0.27790 \times 10^{-4}$
$A8 = -0.38221 \times 10^{-6}$
$A10 = -0.75295 \times 10^{-9}$
$A12 = -0.52428 \times 10^{-12}$

[Aspherical Coefficients of Surface r9]

$\epsilon = 1.0000$
$A4 = 0.29172 \times 10^{-3}$
$A6 = 0.39502 \times 10^{-4}$
$A8 = 0.30055 \times 10^{-6}$
$A10 = 0.51411 \times 10^{-9}$
$A12 = 0.98641 \times 10^{-12}$

[Values of Condition (9) on Surface r1]

y = 0.00ymax ... {|x| − |x0|}/{C0•(N' − N)} = 0.00000
y = 0.10ymax ... {|x| − |x0|}/{C0•(N' − N)} = 0.00103
y = 0.20ymax ... {|x| − |x0|}/{C0•(N' − N)} = 0.01671
y = 0.30ymax ... {|x| − |x0|}/{C0•(N' − N)} = 0.08643
y = 0.40ymax ... {|x| − |x0|}/{C0•(N' − N)} = 0.28206
y = 0.50ymax ... {|x| − |x0|}/{C0•(N' − N)} = 0.71909
y = 0.60ymax ... {|x| − |x0|}/{C0•(N' − N)} = 1.57336
y = 0.70ymax ... {|x| − |x0|}/{C0•(N' − N)} = 3.10107
y = 0.80ymax ... {|x| − |x0|}/{C0•(N' − N)} = 5.66087
y = 0.90ymax ... {|x| − |x0|}/{C0•(N' − N)} = 9.74969
y = 1.00ymax ... {|x| − |x0|}/{C0•(N' − N)} = 16.10445

[Values of Condition (11) on Surface r8]

y = 0.00ymax ... {|x| − |x0|}/{C0•(N' − N)} = −0.0000
y = 0.10ymax ... {|x| − |x0|}/{C0•(N' − N)} = −0.00015
y = 0.20ymax ... {|x| − |x0|}/{C0•(N' − N)} = −0.00234
y = 0.30ymax ... {|x| − |x0|}/{C0•(N' − N)} = −0.01191
y = 0.40ymax ... {|x| − |x0|}/{C0•(N' − N)} = −0.03801
y = 0.50ymax ... {|x| − |x0|}/{C0•(N' − N)} = −0.09399
y = 0.60ymax ... {|x| − |x0|}/{C0•(N' − N)} = −0.19797
y = 0.70ymax ... {|x| − |x0|}/{C0•(N' − N)} = −0.37362
y = 0.80ymax ... {|x| − |x0|}/{C0•(N' − N)} = −0.65118
y = 0.90ymax ... {|X| − |x0|}/{C0•(N' − N)} = −1.06871
y = 1.00ymax ... {|x| − |x0|}/{C0•(N' − N)} = −1.67375

TABLE 8

<< Construction Data of Embodiment 7 >>
f = 7.2~12.3~20.9
FNO = 3.68~4.45~5.77

| Radius of Curvature | Axial Distance | Refractive Index | Abbe Number |
|---|---|---|---|
| r1* = 59.731 | d1 = 1.614 | N1 = 1.76743 | ν1 = 49.48 |
| r2 = 6.153 | d2 = 2.888 | | |
| r3 = 8.373 | d3 = 2.279 | N2 = 1.80518 | ν2 = 25.46 |
| r4 = 11.498 | d4 = 21.334~10.099~3.500 | | |
| r5 = ∞ (Aperture Diaphragm A) | d5 = 1.500 | | |
| r6 = 7.178 | d6 = 3.170 | N3 = 1.48749 | ν3 = 70.44 |
| r7 = −53.943 | d7 = 2.203 | | |
| r8* = −63.188 | d8 = 2.041 | N4 = 1.84506 | ν4 = 23.66 |
| r9 = 27.663 | d9 = 1.109 | | |
| r10 = 94.851 | d10 = 2.229 | N5 = 1.51823 | ν5 = 58.96 |
| r11 = −14.700 | d11 = 3.000~8.582~18.083 | | |
| r12 = ∞ | d12 = 4.000 | N6 = 1.51680 | ν6 = 64.20 |
| r13 = ∞ | | | |

[Aspherical Coefficients of Surface r1]

$\epsilon = 1.0000$
$A4 = 0.10114 \times 10^{-3}$
$A6 = 0.11364 \times 10^{-5}$
$A8 = 0.94656 \times 10^{-8}$
$A10 = -0.41171 \times 10^{-9}$
$A12 = 0.28296 \times 10^{-11}$

[Aspherical Coefficients of Surface r8]

$\epsilon = 1.0000$
$A4 = -0.49107 \times 10^{-3}$
$A6 = -0.71753 \times 10^{-5}$
$A8 = -0.19145 \times 10^{-6}$
$A10 = -0.53207 \times 10^{-9}$
$A12 = -0.14842 \times 10^{-11}$

[Values of Condition (9) on Surface r1]

y = 0.00ymax ... {|x|-|x0|}/{C0 · (N'-N)} = 0.00000
y = 0.10ymax ... {|x|-|x0|}/{C0 · (N'-N)} = 0.00150
y = 0.20ymax ... {|x|-|x0|}/{C0 · (N'-N)} = 0.02437
y = 0.30ymax ... {|x|-|x0|}/{C0 · (N'-N)} = 0.12646
y = 0.40ymax ... {|x|-|x0|}/{C0 · (N'-N)} = 0.41355
y = 0.50ymax ... {|x|-|x0|}/{C0 · (N'-N)} = 1.05358
y = 0.60ymax ... {|x|-|x0|}/{C0 · (N'-N)} = 2.29429
y = 0.70ymax ... {|x|-|x0|}/{C0 · (N'-N)} = 4.47810
y = 0.80ymax ... {|x|-|x0|}/{C0 · (N'-N)} = 8.04320
y = 0.90ymax ... {|x|-|x0|}/{C0 · (N'-N)} = 13.49941
y = 1.00ymax ... {|x|-|x0|}/{C0 · (N'-N)} = 21.37857

[Values of Condition (11) on Surface r8]

y = 0.00ymax ... {|x|-|x0|}/{C0 · (N'-N)} = −0.00000
y = 0.10ymax ... {|x|-|x0|}/{C0 · (N'-N)} = −0.00019
y = 0.20ymax ... {|x|-|x0|}/{C0 · (N'-N)} = −0.00305
y = 0.30ymax ... {|x|-|x0|}/{C0 · (N'-N)} = −0.01554
y = 0.40ymax ... {|x|-|x0|}/{C0 · (N'-N)} = −0.04948
y = 0.50ymax ... {|x|-|x0|}/{C0 · (N'-N)} = −0.12201
y = 0.60ymax ... {|x|-|x0|}/{C0 · (N'-N)} = −0.25618
y = 0.70ymax ... {|x|-|x0|}/{C0 · (N'-N)} = −0.48188
y = 0.80ymax ... {|x|-|x0|}/{C0 · (N'-N)} = −0.83703
y = 0.90ymax ... {|x|-|x0|}/{C0 · (N'-N)} = −1.36937
y = 1.00ymax ... {|x|-|x0|}/{C0 · (N'-N)} = −2.13863

TABLE 9

<< Construction Data of Embodiment 8 >>
f = 7.2~12.3~20.9
FNO = 3.69~4.46~5.77

| Radius of Curvature | Axial Distance | Refractive Index | Abbe Number |
|---|---|---|---|
| r1* = 45.842 | d1 = 1.619 | N1 = 1.76743 | ν1 = 49.48 |
| r2 = 5.996 | d2 = 2.906 | | |

TABLE 9-continued

<< Construction Data of Embodiment 8 >>
f = 7.2~12.3~20.9
FNO = 3.69~4.46~5.77

| | | |
|---|---|---|
| r3 = 8.207 | d3 = 2.277  N2 = 1.80518 | v2 = 25.46 |
| r4 = 11.029 | d4 = 21.234~10.062~3.500 | |
| r5 = ∞ | d5 = 1.500 | |
| (Aperture Diaphragm A) | | |
| r6* = 9.493 | d6 = 3.265  N3 = 1.51178 | v3 = 69.07 |
| r7* = −16.257 | d7 = 2.138 | |
| r8 = 59.479 | d8 = 2.122  N4 = 1.84666 | v4 = 23.83 |
| r9 = 11.539 | d9 = 1.246 | |
| r10 = −474.575 | d10 = 2.345  N5 = 1.54072 | v5 = 47.20 |
| r11 = −11.957 | d11 = 3.000~8.550~17.998 | |
| r12 = ∞ | d12 = 4.000  N6 = 1.51680 | v6 = 64.20 |
| r13 = ∞ | | |

[Aspherical Coefficients of Surface r1]

$\epsilon = 1.0000$
$A4 = 0.16239 \times 10^{-3}$
$A6 = -0.18686 \times 10^{-5}$
$A8 = 0.65406 \times 10^{-7}$
$A10 = -0.39915 \times 10^{-9}$
$A12 = -0.33141 \times 10^{-11}$

[Aspherical Coefficients of Surface r6]

$\epsilon = 1.0000$
$A4 = -0.18532 \times 10^{-3}$
$A6 = 0.67274 \times 10^{-5}$
$A8 = 0.12590 \times 10^{-7}$
$A10 = -0.34303 \times 10^{-9}$
$A12 = -0.66310 \times 10^{-13}$

[Aspherical Coefficients of Surface r7]

$\epsilon = 1.0000$
$A4 = 0.21513 \times 10^{-3}$
$A6 = 0.76806 \times 10^{-5}$
$A8 = 0.76380 \times 10^{-7}$
$A10 = 0.17846 \times 10^{-9}$
$A12 = 0.30791 \times 10^{-12}$

[Values of Condition (9) on Surface r1]

y = 0.00ymax . . . {|x|-|x0|}/{C0 · (N'-N)} = 0.00000
y = 0.10ymax . . . {|x|-|x0|}/{C0 · (N'-N)} = 0.00183
y = 0.20ymax . . . {|x|-|x0|}/{C0 · (N'-N)} = 0.02889
y = 0.30ymax . . . {|x|-|x0|}/{C0 · (N'-N)} = 0.14326
y = 0.40ymax . . . {|x|-|x0|}/{C0 · (N'-N)} = 0.44220
y = 0.50ymax . . . {|x|-|x0|}/{C0 · (N'-N)} = 1.05717
y = 0.60ymax . . . {|x|-|x0|}/{C0 · (N'-N)} = 2.16566
y = 0.70ymax . . . {|x|-|x0|}/{C0 · (N'-N)} = 4.02038
y = 0.80ymax . . . {|x|-|x0|}/{C0 · (N'-N)} = 6.98605
y = 0.90ymax . . . {|x|-|x0|}/{C0 · (N'-N)} = 11.54247
y = 1.00ymax . . . {|x|-|x0|}/{C0 · (N'-N)} = 18.15481

[Values of Condition (12) on Surface r6]

y = 0.00ymax . . . {|x|-|x0|}/{C0 · (N'-N)} = 0.00000
y = 0.10ymax . . . {|x|-|x0|}/{C0 · (N'-N)} = −0.00003
y = 0.20ymax . . . {|x|-|x0|}/{C0 · (N'-N)} = −0.00049
y = 0.30ymax . . . {|x|-|x0|}/{C0 · (N'-N)} = −0.00245
y = 0.40ymax . . . {|x|-|x0|}/{C0 · (N'-N)} = −0.00755
y = 0.50ymax . . . {|x|-|x0|}/{C0 · (N'-N)} = −0.01783
y = 0.60ymax . . . {|x|-|x0|}/{C0 · (N'-N)} = −0.03541
y = 0.70ymax . . . {|x|-|x0|}/{C0 · (N'-N)} = −0.06217
y = 0.80ymax . . . {|x|-|x0|}/{C0 · (N'-N)} = −0.09928
y = 0.90ymax . . . {|x|-|x0|}/{C0 · (N'-N)} = −0.14667
y = 1.00ymax . . . {|x|-|x0|}/{C0 · (N'-N)} = −0.20235

TABLE 10

<< Construction Data of Embodiment 9 >>
f = 7.2~12.3~20.9
FNO = 3.68~4.45~5.77

| Radius of Curvature | Axial Distance | Refractive Index | Abbe Number |
|---|---|---|---|
| r1* = 46.783 | d1 = 1.620 | N1 = 1.76743 | v1 = 49.48 |
| r2 = 5.977 | d2 = 2.900 | | |
| r3 = 8.241 | d3 = 2.280 | N2 = 1.80518 | v2 = 25.46 |
| r4 = 11.190 | d4 = 21.219~10.056~3.500 | | |
| r5 = ∞ | d5 = 1.500 | | |
| (Aperture Diaphragm A) | | | |
| r6 = 6.650 | d6 = 2.965 | N3 = 1.48749 | v3 = 70.44 |
| r7 = −105.715 | d7 = 1.853 | | |
| r8 = −31.543 | d8 = 1.716 | N4 = 1.84506 | v4 = 23.66 |
| r9 = 43.219 | d9 = 0.668 | | |
| r10* = −193.216 | d10 = 2.329 | N5 = 1.51823 | v5 = 58.96 |
| r11* = −11.740 | d11 = 3.000~8.546~17.985 | | |
| r12 = ∞ | d12 = 4.000 | N6 = 1.51680 | v6 = 64.20 |
| r13 = ∞ | | | |

[Aspherical Coefficients of Surface r1]

$\epsilon = 1.0000$
$A4 = 0.13182 \times 10^{-3}$
$A6 = 0.30560 \times 10^{-6}$
$A8 = 0.21859 \times 10^{-7}$
$A10 = -0.36833 \times 10^{-9}$
$A12 = 0.27186 \times 10^{-11}$

[Aspherical Coefficients of Surface r10]

$\epsilon = 1.0000$
$A4 = -0.16031 \times 10^{-2}$
$A6 = -0.77021 \times 10^{-4}$
$A8 = -0.15952 \times 10^{-5}$
$A10 = 0.15892 \times 10^{-6}$
$A12 = 0.43611 \times 10^{-8}$

[Aspherical Coefficients of Surface r11]

$\epsilon = 1.0000$
$A4 = -0.58651 \times 10^{-3}$
$A6 = -0.54302 \times 10^{-4}$
$A8 = 0.23793 \times 10^{-5}$
$A10 = -0.19977 \times 10^{-6}$
$A12 = 0.16690 \times 10^{-7}$

[Values of Condition (9) on Surface r1]

y = 0.00ymax . . . {|x|-|x0|}/{C0 · (N'-N)} = 0.00000
y = 0.10ymax . . . {|x|-|x0|}/{C0 · (N'-N)} = 0.00153
y = 0.20ymax . . . {|x|-|x0|}/{C0 · (N'-N)} = 0.02451
y = 0.30ymax . . . {|x|-|x0|}/{C0 · (N'-N)} = 0.12492
y = 0.40ymax . . . {|x|-|x0|}/{C0 · (N'-N)} = 0.39944
y = 0.50ymax . . . {|x|-|x0|}/{C0 · (N'-N)} = 0.99263
y = 0.60ymax . . . {|x|-|x0|}/{C0 · (N'-N)} = 2.10971
y = 0.70ymax . . . {|x|-|x0|}/{C0 · (N'-N)} = 4.03494
y = 0.80ymax . . . {|x|-|x0|}/{C0 · (N'-N)} = 7.15378
y = 0.90ymax . . . {|x|-|x0|}/{C0 · (N'-N)} = 11.97961
y = 1.00ymax . . . {|x|-|x0|}/{C0 · (N'-N)} = 19.19615

[Values of Condition (13) on Surface r11]

y = 0.00ymax . . . {|x|-|x0|}/{C0 · (N'-N)} = 0.00000
y = 0.10ymax . . . {|x|-|x0|}/{C0 · (N'-N)} = 0.00008
y = 0.20ymax . . . {|x|-|x0|}/{C0 · (N'-N)} = 0.00134
y = 0.30ymax . . . {|x|-|x0|}/{C0 · (N'-N)} = 0.00703
y = 0.40ymax . . . {|x|-|x0|}/{C0 · (N'-N)} = 0.02321
y = 0.50ymax . . . {|x|-|x0|}/{C0 · (N'-N)} = 0.05962
y = 0.60ymax . . . {|x|-|x0|}/{C0 · (N'-N)} = 0.13070
y = 0.70ymax . . . {|x|-|x0|}/{C0 · (N'-N)} = 0.25667
y = 0.80ymax . . . {|x|-|x0|}/{C0 · (N'-N)} = 0.46412
y = 0.90ymax . . . {|x|-|x0|}/{C0 · (N'-N)} = 0.78517
y = 1.00ymax . . . {|x|-|x0|}/{C0 · (N'-N)} = 1.25213

TABLE 11

<< Construction Data of Embodiment 10 >>
f = 7.2~12.2~20.8
FNO = 3.56~4.38~5.80

| Radius of Curvature | Axial Distance | Refractive Index | Abbe Number |
|---|---|---|---|
| r1 = 12.731 | d1 = 0.952 | N1 = 1.78100 | ν1 = 44.55 |
| r2 = 6.618 | d2 = 2.476 | | |
| r3 = 26.535 | d3 = 0.952 | N2 = 1.80500 | ν2 = 40.97 |
| r4 = 7.583 | d4 = 1.127 | | |
| r5 = 11.223 | d5 = 2.571 | N3 = 1.84506 | ν3 = 23.66 |
| r6* = 35.591 | d6 = 17.273~7.558~1.835 | | |
| r7 = ∞ | (Aperture Diaphragm A) | | |
| | d7 = 1.500 | | |
| r8 = 11.221 | d8 = 2.226 | N4 = 1.62280 | ν4 = 56.88 |
| r9 = −36.249 | d9 = 0.109 | | |
| r10 = 6.585 | d10 = 1.683 | N5 = 1.62280 | ν5 = 56.88 |
| r11 = 18.995 | d11 = 0.355 | | |
| r12 = −227.814 | d12 = 2.361 | N6 = 1.80518 | ν6 = 25.43 |
| r13 = 5.124 | d13 = 1.398 | | |
| r14 = 13.398 | d14 = 1.920 | N7 = 1.65446 | ν7 = 33.86 |
| r15 = −25.464 | d15 = 2.857~7.478~15.321 | | |
| r16 = ∞ | d16 = 3.810 | N8 = 1.51680 | ν8 = 64.20 |
| r17 = ∞ | | | |

[Aspherical Coefficients of Surface r6]

$\epsilon$ = 1.0000
A4 = −0.20241 × $10^{-3}$
A6 = −0.61087 × $10^{-5}$
A8 = 0.26104 × $10^{-6}$
A10 = −0.75184 × $10^{-8}$
A12 = −0.45052 × $10^{-10}$

[Values of Condition (10) on Surface r6]

y = 0.00ymax ... {|x|−|x0|}/{C0 · (N'−N)} = −0.00000
y = 0.10ymax ... {|x|−|x0|}/{C0 · (N'−N)} = 0.00027
y = 0.20ymax ... {|x|−|x0|}/{C0 · (N'−N)} = 0.00433
y = 0.30ymax ... {|x|−|x0|}/{C0 · (N'−N)} = 0.02245
y = 0.40ymax ... {|x|−|x0|}/{C0 · (N'−N)} = 0.07305
y = 0.50ymax ... {|x|−|x0|}/{C0 · (N'−N)} = 0.18424
y = 0.60ymax ... {|x|−|x0|}/{C0 · (N'−N)} = 0.39519
y = 0.70ymax ... {|x|−|x0|}/{C0 · (N'−N)} = 0.75776
y = 0.80ymax ... {|x|−|x0|}/{C0 · (N'−N)} = 1.34015
y = 0.90ymax ... {|x|−|x0|}/{C0 · (N'−N)} = 2.23741
y = 1.00ymax ... {|x|−|x0|}/{C0 · (N'−N)} = 3.59837

TABLE 12

<< Construction Data of Embodiment 11 >>
f = 7.2~12.2~20.6
FNO = 3.90~4.59~5.77

| Radius of Curvature | Axial Distance | Refractive Index | Abbe Number |
|---|---|---|---|
| r1 = 13.925 | d1 = 1.000 | N1 = 1.78100 | ν1 = 44.55 |
| r2 = 8.252 | d2 = 3.360 | | |
| r3 = 24.430 | d3 = 1.000 | N2 = 1.77250 | ν2 = 49.77 |
| r4 = 8.084 | d4 = 1.960 | | |
| r5* = 17.271 | d5 = 2.590 | N3 = 1.84506 | ν3 = 23.66 |
| r6* = 49.411 | d6 = 23.556~10.051~2.056 | | |
| r7 = ∞ | d7 = 1.500 | | |
| (Aperture Diaphragm A) | | | |
| r8 = 21.471 | d8 = 2.000 | N4 = 1.51823 | ν4 = 58.96 |
| r9 = −28.121 | d9 = 0.200 | | |
| r10 = 8.645 | d10 = 1.980 | N5 = 1.74400 | ν5 = 44.90 |
| r11 = 24.150 | d11 = 1.260 | | |
| r12 = −62.290 | d12 = 2.860 | N6 = 1.84666 | ν6 = 23.83 |
| r13 = 7.081 | d13 = 1.750 | | |
| r14 = 15.050 | d14 = 2.440 | N7 = 1.58144 | ν7 = 40.89 |
| r15 = −12.512 | d15 = 3.000~8.049~16.575 | | |
| r16 = ∞ | d16 = 4.000 | N8 = 1.51680 | ν8 = 64.20 |
| r17 = ∞ | | | |

TABLE 12-continued

<< Construction Data of Embodiment 11 >>
f = 7.2~12.2~20.6
FNO = 3.90~4.59~5.77

[Aspherical Coefficients of Surface r5]

$\epsilon$ = 1.0000
A4 = −0.49472 × $10^{-4}$
A6 = −0.90109 × $10^{-5}$
A8 = 0.65226 × $10^{-6}$
A10 = −0.14834 × $10^{-7}$
A12 = 0.56213 × $10^{-10}$

[Aspherical Coefficients of Surface r6]

$\epsilon$ = 1.0000
A4 = −0.20585 × $10^{-3}$
A6 = −0.13606 × $10^{-4}$
A8 = 0.10689 × $10^{-5}$
A10 = −0.34439 × $10^{-7}$
A12 = 0.34185 × $10^{-9}$

[Values of Condition (10) on Surface r6]

y = 0.00ymax ... {|x|−|x0|}/{C0 · (N'−N)} = −0.00000
y = 0.10ymax ... {|x|−|x0|}/{C0 · (N'−N)} = 0.00097
y = 0.20ymax ... {|x|−|x0|}/{C0 · (N'−N)} = 0.01623
y = 0.30ymax ... {|x|−|x0|}/{C0 · (N'−N)} = 0.08743
y = 0.40ymax ... {|x|−|x0|}/{C0 · (N'−N)} = 0.29337
y = 0.50ymax ... {|x|−|x0|}/{C0 · (N'−N)} = 0.74906
y = 0.60ymax ... {|x|−|x0|}/{C0 · (N'−N)} = 1.59147
y = 0.70ymax ... {|x|−|x0|}/{C0 · (N'−N)} = 2.97038
y = 0.80ymax ... {|x|−|x0|}/{C0 · (N'−N)} = 5.09061
y = 0.90ymax ... {|x|−|x0|}/{C0 · (N'−N)} = 8.35777
y = 1.00ymax ... {|x|−|x0|}/{C0 · (N'−N)} = 13.61603

TABLE 13

<< Construction Data of Embodiment 12 >> f = 7.2~12.3~20.9
FNO = 3.77~4.51~5.77

| Radius of Curvature | Axial Distance | Refractive Index | Abbe Number |
|---|---|---|---|
| r1* = 46.650 | d1 = 1.620 | N1 = 1.76743 | ν1 = 49.48 |
| r2 = 5.978 | d2 = 2.900 | | |
| r3 = 8.244 | d3 = 2.280 | N2 = 1.80518 | ν2 = 25.46 |
| r4 = 11.187 | d4 = 22.155~10.403~3.500 | | |
| r5 = ∞ (Aperture Diaphragm A) | | | |
| | d5 = 1.500 | | |
| r6 = 21.500 | d6 = 2.000 | N3 = 1.51823 | ν3 = 58.96 |
| r7 = −27.935 | d7 = 0.200 | | |
| r8 = 8.671 | d8 = 1.979 | N4 = 1.74400 | ν4 = 44.90 |
| r9 = 24.168 | d9 = 1.259 | | |
| r10 = −61.259 | d10 = 2.860 | N5 = 1.84666 | ν5 = 23.83 |
| r11 = 7.069 | d11 = 1.750 | | |
| r12 = 14.998 | d12 = 2.440 | N6 = 1.58144 | ν6 = 40.89 |
| r13 = −11.904 | d13 = 3.000~8.839~18.777 | | |
| r14 = ∞ | d14 = 4.000 | N7 = 1.51680 | ν7 = 64.20 |
| r15 = ∞ | | | |

[Aspherical Coefficients of Surface r1]

$\epsilon$ = 1.0000
A4 = 0.14615 × $10^{-3}$
A6 = 0.28983 × $10^{-6}$
A8 = 0.21769 × $10^{-7}$
A10 = −0.36943 × $10^{-9}$
A12 = 0.27015 × $10^{-11}$

[Values of Condition (9) on Surface r1]

y = 0.00ymax ... {|x| − |x0|}/{C0 · (N' − N)} = 0.00000
y = 0.10ymax ... {|x| − |x0|}/{C0 · (N' − N)} = 0.00169
y = 0.20ymax ... {|x| − |x0|}/{C0 · (N' − N)} = 0.02708
y = 0.30ymax ... {|x| − |x0|}/{C0 · (N' − N)} = 0.13790
y = 0.40ymax ... {|x| − |x0|}/{C0 · (N' − N)} = 0.44028
y = 0.50ymax ... {|x| − |x0|}/{C0 · (N' − N)} = 1.09177
y = 0.60ymax ... {|x| − |x0|}/{C0 · (N' − N)} = 2.31379

TABLE 13-continued

<< Construction Data of Embodiment 12 >> y = 0.70ymax ... {|x| − |x0|}/{C0 · (N' − N)} = 4.40940
y = 0.80ymax ... {|x| − |x0|}/{C0 · (N' − N)} = 7.78464
y = 0.90ymax ... {|x| − |x0|}/{C0 · (N' − N)} = 12.97349
y = 1.00ymax ... {|x| − |x0|}/{C0 · (N' − N)} = 20.67743

TABLE 14

<< Construction Data of Embodiment 13 >> f = 7.2~12.3~20.9
FNO = 3.79~4.52~5.77

| Radius of Curvature | Axial Distance | Refractive Index | Abbe Number |
|---|---|---|---|
| r1 = 13.848 | d1 = 1.001 | N1 = 1.78100 | ν1 = 44.55 |
| r2 = 8.220 | d2 = 3.360 | | |
| r3 = 24.413 | d3 = 1.001 | N2 = 1.77250 | ν2 = 49.77 |
| r4 = 8.035 | d4 = 1.960 | | |
| r5* = 17.206 | d5 = 2.590 | N3 = 1.84506 | ν3 = 23.66 |
| r6* = 50.391 | d6 = 22.976~9.797~2.056 | | |
| r7 = ∞ (Aperture Diaphragm A) | | | |
| | d7 = 1.500 | | |
| r8 = 6.714 | d8 = 3.151 | N4 = 1.48749 | ν4 = 70.44 |
| r9 = −90.945 | d9 = 2.171 | | |
| r10* = −38.413 | d10 = 2.021 | N5 = 1.84506 | ν5 = 23.66 |
| r11* = 33.049 | d11 = 1.061 | | |
| r12 = 65.472 | d12 = 2.201 | N6 = 1.51823 | ν6 = 58.96 |
| r13 = −16.002 | d13 = 3.000~7.918~16.289 | | |
| r14 = ∞ | d14 = 4.000 | N7 = 1.51680 | ν7 = 64.20 |
| r15 = ∞ | | | |

[Aspherical Coefficients of Surface r5]

ε = 1.0000
A4 = −0.33852 × 10$^{-4}$
A6 = −0.78693 × 10$^{-5}$
A8 = 0.65401 × 10$^{-6}$
A10 = −0.14836 × 10$^{-7}$
A12 = 0.56198 × 10$^{-10}$

[Aspherical Coefficients of Surface r6]

ε = 1.0000
A4 = −0.17967 × 10$^{-3}$
A6 = −0.13292 × 10$^{-4}$
A8 = 0.10738 × 10$^{-5}$
A10 = −0.34418 × 10$^{-7}$
A12 = 0.34191 × 10$^{-9}$

[Aspherical Coefficients of Surface r10]

ε = 1.0000
A4 = −0.48194 × 10$^{-3}$
A6 = 0.68718 × 10$^{-5}$
A8 = −0.24370 × 10$^{-6}$
A10 = −0.49237 × 10$^{-9}$
A12 = −0.88829 × 10$^{-12}$

[Aspherical Coefficients of Surface r11]

ε = 1.0000
A4 = 0.11119 × 10$^{-3}$
A6 = 0.15629 × 10$^{-4}$
A8 = 0.10481 × 10$^{-6}$
A10 = 0.38919 × 10$^{-10}$
A12 = −0.50038 × 10$^{-12}$

[Values of Condition (10) on Surface r6]

y = 0.00ymax ... {|x| − |x0|}/{C0 · (N' − N)} = −0.00000
y = 0.10ymax ... {|x| − |x0|}/{C0 · (N' − N)} = 0.00086
y = 0.20ymax ... {|x| − |x0|}/{C0 · (N' − N)} = 0.01455
y = 0.30ymax ... {|x| − |x0|}/{C0 · (N' − N)} = 0.07887
y = 0.40ymax ... {|x| − |x0|}/{C0 · (N' − N)} = 0.26584
y = 0.50ymax ... {|x| − |x0|}/{C0 · (N' − N)} = 0.67972
y = 0.60ymax ... {|x| − |x0|}/{C0 · (N' − N)} = 1.44084
y = 0.70ymax ... {|x| − |x0|}/{C0 · (N' − N)} = 2.67353
y = 0.80ymax ... {|x| − |x0|}/{C0 · (N' − N)} = 4.54495
y = 0.90ymax ... {|x| − |x0|}/{C0 · (N' − N)} = 7.40740

TABLE 14-continued

<< Construction Data of Embodiment 13 >> y = 1.00ymax ... {|x| − |x0|}/{C0 · (N' − N)} = 12.03118
[Values of Condition (11) on Surface r10]

y = 0.00ymax ... {|x| − |x0|}/{C0 · (N' − N)} = −0.00000
y = 0.10ymax ... {|x| − |x0|}/{C0 · (N' − N)} = −0.00012
y = 0.20ymax ... {|x| − |x0|}/{C0 · (N' − N)} = −0.00186
y = 0.30ymax ... {|x| − |x0|}/{C0 · (N' − N)} = −0.00935
y = 0.40ymax ... {|x| − |x0|}/{C0 · (N' − N)} = −0.02934
y = 0.50ymax ... {|x| − |x0|}/{C0 · (N' − N)} = −0.07103
y = 0.60ymax ... {|x| − |x0|}/{C0 · (N' − N)} = −0.14583
y = 0.70ymax ... {|x| − |x0|}/{C0 · (N' − N)} = −0.26723
y = 0.80ymax ... {|x| − |x0|}/{C0 · (N' − N)} = −0.45064
y = 0.90ymax ... {|x| − |x0|}/{C0 · (N' − N)} = −0.71348
y = 1.00ymax ... {|x| − |x0|}/{C0 · (N' − N)} = −1.07543

TABLE 15

<< Values Corresponding to Conditions (7) and (8) >>

| | Cond. (7) $|f_1 / f_2| / Z$ | Cond. (8) $|f_1 / fW|$ |
|---|---|---|
| Emb. 5 | 0.348 | 1.702 |
| Emb. 6 | 0.382 | 1.813 |
| Emb. 7 | 0.313 | 1.850 |
| Emb. 8 | 0.315 | 1.850 |
| Emb. 9 | 0.315 | 1.851 |
| Emb. 10 | 0.378 | 1.888 |
| Emb. 11 | 0.346 | 2.126 |
| Emb. 12 | 0.300 | 1.851 |
| Emb. 13 | 0.356 | 2.149 |

TABLE 16

<< Construction Data of Embodiment 14 >> f = 3.3~5.7~9.9
FNO = 2.19~2.85~4.00

| Radius of Curvature | Axial Distance | Refractive Index | Abbe Number |
|---|---|---|---|
| r1* = −1438.890 | d1 = 1.500 | N1 = 1.77250 | ν1 = 49.77 |
| r2 = 2.887 | d2 = 1.780 | | |
| r3* = 6.354 | d3 = 1.840 | N2 = 1.84666 | ν2 = 23.82 |
| r4* = 9.570 | d4 = 6.652~2.938~0.800 | | |
| r5 = ∞ (Aperture Diaphragm A) | | | |
| | d5 = 0.200 | | |
| r6* = 3.701 | d6 = 4.830 | N3 = 1.58913 | ν3 = 61.11 |
| r7 = −4.910 | d7 = 0.650 | N4 = 1.84666 | ν4 = 23.82 |
| r8* = −11.836 | d8 = 1.500~4.543~9.798 | | |
| r9 = ∞ | | | |
| (P) ... | d9 = 2.850 | N5 = 1.54426 | ν5 = 69.60 |
| r10 = ∞ | | | |

[Data of Aspherical Surface r1]

ε = 1.0000
A4 = 0.28118 × 10$^{-2}$
A6 = −0.13005 × 10$^{-3}$

[Data of Aspherical Surface r3]

ε = 1.0000
A4 = −0.33947 × 10$^{-2}$
A6 = 0.10681 × 10$^{-3}$
A8 = 0.97935 × 10$^{-4}$
A10 = −0.94246 × 10$^{-5}$

[Data of Aspherical Surface r4]

ε = 1.0000
A4 = −0.41942 × 10$^{-2}$
A6 = 0.37617 × 10$^{-3}$

TABLE 16-continued

<< Construction Data of Embodiment 14 >>

[Data of Aspherical Surface r6]

$\epsilon = 1.0000$
$A4 = -0.15431 \times 10^{-2}$
$A6 = 0.31837 \times 10^{-4}$
$A8 = -0.24072 \times 10^{-5}$
$A10 = -0.42801 \times 10^{-6}$

[Data of Aspherical Surface r8]

$\epsilon = 1.0000$
$A4 = 0.30909 \times 10^{-2}$
$A6 = 0.48021 \times 10^{-3}$
$A8 = -0.82337 \times 10^{-4}$
$A10 = 0.16310 \times 10^{-4}$

TABLE 17

<< Construction Data of Embodiment 15 >>

$f = 3.3\sim5.7\sim9.9$
$FNO = 2.69\sim3.17\sim4.00$

| Radius of Curvature | Axial Distance | Refractive Index | Abbe Number |
|---|---|---|---|
| r1* = 28.624 | d1 = 1.500 | N1 = 1.77250 | ν1 = 49.77 |
| r2 = 4.132 | d2 = 2.320 | | |
| r3* = 9.489 | d3 = 1.000 | N2 = 1.84666 | ν2 = 23.82 |
| r4* = 18.045 | d4 = 15.788~6.277~0.800 | | |
| r5 = ∞ (Aperture Diaphragm A) | | | |
| | d5 = 0.200 | | |
| r6* = 4.630 | d6 = 4.630 | N3 = 1.67003 | ν3 = 47.15 |
| r7 = −3.855 | d7 = 2.520 | N4 = 1.84666 | ν4 = 23.82 |
| r8* = −21.229 | d8 = 1.500~3.295~6.397 | | |
| r9 = ∞ | | | |
| (P) . . . | d9 = 2.850 | N5 = 1.54426 | ν5 = 69.60 |
| r10 = ∞ | | | |

[Data of Aspherical Surface r1]

$\epsilon = 1.0000$
$A4 = 0.45841 \times 10^{-3}$
$A6 = -0.34353 \times 10^{-5}$

[Data of Aspherical Surface r3]

$\epsilon = 1.0000$
$A4 = -0.79613 \times 10^{-3}$
$A6 = 0.66261 \times 10^{-5}$
$A8 = 0.52730 \times 10^{-6}$
$A10 = 0.35286 \times 10^{-7}$

[Data of Aspherical Surface r4]

$\epsilon = 1.0000$
$A4 = -0.10761 \times 10^{-2}$
$A6 = -0.43454 \times 10^{-5}$

[Data of Aspherical Surface r6]

$\epsilon = 1.0000$
$A4 = -0.45612 \times 10^{-3}$
$A6 = 0.15775 \times 10^{-3}$
$A8 = -0.46602 \times 10^{-4}$
$A10 = 0.50987 \times 10^{-5}$

[Data of Aspherical Surface r8]

$\epsilon = 1.0000$
$A4 = 0.23300 \times 10^{-2}$
$A6 = 0.12776 \times 10^{-4}$
$A8 = 0.54254 \times 10^{-4}$
$A10 = -0.45904 \times 10^{-5}$

TABLE 18

<< Construction Data of Embodiment 16 >>

$f = 3.3\sim5.7\sim9.9$
$FNO = 2.47\sim3.02\sim4.00$

| Radius of Curvature | Axial Distance | Refractive Index | Abbe Number |
|---|---|---|---|
| r1* = 39.678 | d1 = 1.500 | N1 = 1.77250 | ν1 = 49.77 |
| r2 = 3.134 | d2 = 2.000 | | |
| r3* = 44.947 | d3 = 1.000 | N2 = 1.84666 | ν2 = 23.82 |
| r4* = −29.207 | d4 = 10.746~4.434~0.800 | | |
| r5 = ∞ (Aperture Diaphragm A) | | | |
| | d5 = 0.200 | | |
| r6* = 3.927 | d6 = 5.000 | N3 = 1.58913 | ν3 = 61.11 |
| r7 = −3.366 | d7 = 0.540 | N4 = 1.80741 | ν4 = 31.59 |
| r8* = −32.714 | d8 = 1.550 | | |
| r9 = −12.693 | d9 = 1.000 | N5 = 1.48749 | ν5 = 70.44 |
| r10 = −6.061 | d10 = 1.500~4.235~8.959 | | |
| r11 = ∞ | | | |
| (P) . . . | d11 = 2.850 | N6 = 1.54426 | ν6 = 69.60 |
| r12 = ∞ | | | |

[Data of Aspherical Surface r1]

$\epsilon = 1.0000$
$A4 = 0.14510 \times 10^{-2}$
$A6 = -0.58597 \times 10^{-4}$

[Data of Aspherical Surface r3]

$\epsilon = 1.0000$
$A4 = -0.41168 \times 10^{-2}$
$A6 = 0.10342 \times 10^{-4}$
$A8 = 0.22397 \times 10^{-4}$
$A10 = 0.54609 \times 10^{-7}$

[Data of Aspherical Surface r4]

$\epsilon = 1.0000$
$A4 = -0.43766 \times 10^{-2}$
$A6 = 0.30539 \times 10^{-4}$

[Data of Aspherical Surface r6]

$\epsilon = 1.0000$
$A4 = -0.46556 \times 10^{-3}$
$A6 = 0.19107 \times 10^{-4}$
$A8 = -0.12057 \times 10^{-5}$
$A10 = 0.24604 \times 10^{-7}$

[Data of Aspherical Surface r8]

$\epsilon = 1.0000$
$A4 = 0.35849 \times 10^{-2}$
$A6 = 0.26291 \times 10^{-3}$
$A8 = -0.90595 \times 10^{-5}$
$A10 = 0.63499 \times 10^{-5}$

TABLE 19

<< Construction Data of Embodiment 17 >>

$f = 3.3\sim5.7\sim9.9$
$FNO = 2.42\sim2.99\sim4.00$

| Radius of Curvature | Axial Distance | Refractive Index | Abbe Number |
|---|---|---|---|
| r1* = 30.744 | d1 = 1.500 | N1 = 1.77250 | ν1 = 49.77 |
| r2 = 3.062 | d2 = 2.000 | | |
| r3* = 194.671 | d3 = 1.000 | N2 = 1.84666 | ν2 = 23.82 |
| r4* = −20.325 | d4 = 10.262~4.257~0.800 | | |
| r5 = ∞ (Aperture Diaphragm A) | | | |
| | d5 = 0.200 | | |
| r6* = 4.219 | d6 = 5.000 | N3 = 1.58913 | ν3 = 61.11 |
| r7 = −3.288 | d7 = 0.500 | N4 = 1.80741 | ν4 = 31.59 |
| r8 = −18.626 | d8 = 0.560 | | |
| r9 = 19.998 | d9 = 1.000 | N5 = 1.48749 | ν5 = 70.44 |
| r10* = −43.337 | d10 = 1.500~4.102~8.597 | | |
| r11 = ∞ | | | |
| (P) . . . | d11 = 2.850 | N6 = 1.54426 | ν6 = 69.60 |
| r12 = ∞ | | | |

TABLE 19-continued

<< Construction Data of Embodiment 17 >>

[Data of Aspherical Surface r1]

$\epsilon = 1.0000$
$A4 = 0.13393 \times 10^{-2}$
$A6 = -0.56050 \times 10^{-4}$
[Data of Aspherical Surface r3]

$\epsilon = 1.0000$
$A4 = -0.41114 \times 10^{-2}$
$A6 = 0.35997 \times 10^{-5}$
$A8 = 0.22144 \times 10^{-4}$
$A10 = 0.16562 \times 10^{-6}$
[Data of Aspherical Surface r4]

$\epsilon = 1.0000$
$A4 = -0.43720 \times 10^{-2}$
$A6 = 0.71031 \times 10^{-5}$
[Data of Aspherical Surface r6]

$\epsilon = 1.0000$
$A4 = -0.59316 \times 10^{-3}$
$A6 = -0.20585 \times 10^{-4}$
$A8 = 0.68505 \times 10^{-5}$
$A10 = -0.47182 \times 10^{-6}$
[Data of Aspherical Surface r10]

$\epsilon = 1.0000$
$A4 = 0.36683 \times 10^{-2}$
$A6 = 0.21833 \times 10^{-3}$
$A8 = -0.62222 \times 10^{-5}$
$A10 = 0.48613 \times 10^{-5}$

TABLE 20

<< Construction Data of Embodiment 18 >>

$f = 3.3 \sim 5.7 \sim 9.9$
$FNO = 2.64 \sim 3.14 \sim 4.00$

| Radius of Curvature | Axial Distance | Refractive Index | Abbe Number |
|---|---|---|---|
| r1* = −31.042 | d1 = 1.500 | N1 = 1.49140 | ν1 = 57.82 |
| r2 = 4.012 | d2 = 3.000 | | |
| r3* = 23.226 | d3 = 1.140 | N2 = 1.84666 | ν2 = 23.82 |
| r4* = 104.309 | d4 = 16.652~6.592~0.800 | | |
| r5 = ∞ (Aperture Diaphragm A) | | | |
| | d5 = 0.200 | | |
| r6* = 3.487 | d6 = 4.520 | N3 = 1.49140 | ν3 = 57.82 |
| r7 = −4.254 | d7 = 1.000 | N4 = 1.80518 | ν4 = 25.43 |
| r8* = −14.493 | d8 = 1.500~3.399~6.679 | | |
| r9 = ∞ | | | |
| (P) . . . | d9 = 2.850 | N5 = 1.54426 | ν5 = 69.60 |
| r10 = ∞ | | | |

[Data of Aspherical Surface r1]

$\epsilon = 1.0000$
$A4 = 0.11057 \times 10^{-2}$
$A6 = -0.15152 \times 10^{-4}$
[Data of Aspherical Surface r3]

$\epsilon = 1.0000$
$A4 = -0.17483 \times 10^{-2}$
$A6 = -0.14633 \times 10^{-4}$
$A8 = -0.29685 \times 10^{-5}$
$A10 = 0.21243 \times 10^{-6}$
[Data of Aspherical Surface r4]

$\epsilon = 1.0000$
$A4 = -0.18154 \times 10^{-2}$
$A6 = -0.30003 \times 10^{-4}$
[Data of Aspherical Surface r6]

$\epsilon = 1.0000$
$A4 = -0.74640 \times 10^{-3}$

TABLE 20-continued

<< Construction Data of Embodiment 18 >>

$A6 = -0.62650 \times 10^{-4}$
$A8 = 0.12105 \times 10^{-4}$
$A10 = -0.14787 \times 10^{-5}$
[Data of Aspherical Surface r8]

$\epsilon = 1.0000$
$A4 = 0.34758 \times 10^{-2}$
$A6 = 0.74640 \times 10^{-4}$
$A8 = 0.71143 \times 10^{-4}$
$A10 = -0.23207 \times 10^{-6}$

TABLE 21

<<Construction Data of Embodiment 19 >>

$f = 3.3 \sim 5.7 \sim 9.9$
$FNO = 2.45 \sim 3.01 \sim 4.00$

| Radius of Curvature | Axial Distance | Refractive Index | Abbe Number |
|---|---|---|---|
| r1* = −21.980 | d1 = 1.500 | N1 = 1.49140 | ν1 = 57.82 |
| r2 = 2.835 | d2 = 2.370 | | |
| r3* = −44.985 | d3 = 1.000 | N2 = 1.84666 | ν2 = 23.82 |
| r4* = −17.979 | d4 = 11.021~4.534~0.800 | | |
| r5 = ∞ (Aperture Diaphragm A) | | | |
| | d5 = 0.200 | | |
| r6* = 3.743 | d6 = 5.000 | N3 = 1.49140 | ν3 = 57.82 |
| r7 = −5.223 | d7 = 0.500 | N4 = 1.80518 | ν4 = 25.43 |
| r8* = −44.784 | d8 = 0.500 | | |
| r9 = 94.249 | d9 = 1.000 | N5 = 1.49140 | ν5 = 57.82 |
| r10 = −9.622 | d10 = 1.500~4.311~9.165 | | |
| r11 = ∞ | | | |
| (P) . . . | d11 = 2.850 | N6 = 1.54426 | ν6 = 69.60 |
| r12 = ∞ | | | |

[Data of Aspherical Surface r1]

$\epsilon = 1.0000$
$A4 = 0.25951 \times 10^{-2}$
$A6 = -0.78587 \times 10^{-4}$
[Data of Aspherical Surface r3]

$\epsilon = 1.0000$
$A4 = -0.42521 \times 10^{-2}$
$A6 = 0.46752 \times 10^{-4}$
$A8 = -0.16262 \times 10^{-4}$
$A10 = 0.43631 \times 10^{-5}$
[Data of Aspherical Surface r4]

$\epsilon = 1.0000$
$A4 = -0.41396 \times 10^{-2}$
$A6 = -0.17057 \times 10^{-4}$
[Data of Aspherical Surface r6]

$\epsilon = 1.0000$
$A4 = -0.84234 \times 10^{-3}$
$A6 = -0.42095 \times 10^{-4}$
$A8 = 0.40922 \times 10^{-5}$
$A10 = -0.59188 \times 10^{-6}$
[Data of Aspherical Surface r8]

$\epsilon = 1.0000$
$A4 = 0.27789 \times 10^{-2}$
$A6 = 0.22597 \times 10^{-3}$
$A8 = -0.19228 \times 10^{-4}$
$A10 = 0.55914 \times 10^{-5}$

TABLE 22

<< Values Corresponding to Conditions (14) to (22) >>

| Cond. | Emb. 14 | Emb. 15 | Emb. 16 | Emb. 17 | Emb. 18 | Emb. 19 |
|---|---|---|---|---|---|---|
| (14) | 2.063 | 0.990 | 1.500 | 1.500 | 0.990 | 1.500 |
| (15) | 1.257 | 0.742 | 1.130 | 1.075 | 0.785 | 1.154 |
| (16) | 0.0525 | 0.0458 | 0.0648 | 0.0664 | 0.0738 | 0.0601 |
| (17) | 37.29 | 23.33 | 29.52 | 29.52 | 32.39 | 32.39 |
| (18) | 7.988 | 6.927 | 8.242 | 7.706 | 6.764 | 8.356 |
| (19) | −0.524 | −0.642 | — | — | −0.612 | — |
| (20) | — | — | 0.491 | 0.551 | — | 0.559 |
| (21) | −0.0121 | −0.0098 | −0.0079 | −0.0069 | −0.0179 | −0.0159 |
| (22) | −0.0137 | −0.0035 | −0.0081 | −0.0088 | −0.0045 | −0.0083 |

What is claimed is:

1. A zoom lens system comprising, from an object side:

a first lens unit having a negative optical power; and a second lens unit having a positive optical power, said second lens unit being provided on an image side of said first lens unit with a variable air space formed between said first and said second lens units, wherein zooming is performed by varying said variable air space, and wherein the zoom lens system fulfills the following conditions:

$$0.2 < \frac{T_{1-2}}{Y'} < 0.8$$

$$0.1 < \left|\frac{f_1}{f_2}\right| \cdot \frac{1}{Z} < 0.6$$

where $T_{1-2}$ represents a distance of said variable air space in a longest focal length condition;

Y' represents a maximum image height;

$f_1$ represents a focal length of the first lens unit;

$f_2$ represents a focal length of the second lens unit; and

Z represents a zoom ratio.

2. A zoom lens system as claimed in claim 1, wherein each of said first and said second lens units has at least one positive lens element, and wherein the at least one positive lens element fulfills the following condition:

$$0.60 < \frac{K}{T} < 0.99$$

where

K represents a thickness of the at least one positive lens element at a height equal to an effective radius on a side of the positive lens element on which the effective radius is larger; and T represents a thickness of the at least one positive lens element on an optical axis.

3. A zoom lens system as claimed in claim 1, wherein the zoom lens system fulfills the following condition:

$$1.0 < Y' \times RL < 4.5$$

where

Y' represents a maximum image height; and

RL represents an effective diameter of a most image side surface of the zoom lens system in its entirety.

4. A zoom lens system as claimed in claim 1, wherein said first lens unit includes at least one aspherical surface.

5. A zoom lens system as claimed in claim 1, wherein said second lens unit includes at least one aspherical surface.

6. A zoom lens system comprising, from an object side:

a first lens unit having a negative optical power; and a second lens unit having a positive optical power, said second lens unit being provided on an image side of said first lens unit with a variable air space formed between said first and said second lens units, wherein zooming is performed by varying said variable air space, and wherein the zoom lens system fulfills the following condition:

$$1.0 < Y' \times RL < 4.5$$

where

Y' represents a maximum image height; and

RL represents an effective radius of a most image side surface of the zoom lens system in its entirety.

7. A zoom lens system as claimed in claim 6, wherein each of said first and said second lens units has at least one positive lens element, and wherein the at least one positive lens element fulfills the following condition:

$$0.60 < \frac{K}{T} < 0.99$$

where

K represents a thickness of the at least one positive lens element at a height equal to an effective radius on a side of the positive lens element on which the effective radius is larger; and T represents a thickness of the positive lens element on an optical axis.

8. A zoom lens system as claimed in claim 6, wherein said first lens unit includes at least one aspherical surface.

9. A zoom lens system as claimed in claim 6, wherein said second lens unit includes at least one aspherical surface.

10. A zoom lens system comprising, from an object side:

a first lens unit having a negative optical power; and a second lens unit having a positive optical power, said second lens unit being provided on an image side of said first lens unit with a variable air space formed between said first and said second lens units, wherein zooming is performed by varying said variable air space, and wherein the zoom lens system fulfills the following conditions:

$$0.1 < \left|\frac{f_1}{f_s}\right| \cdot \frac{1}{Z} < 0.39$$

$$0.8 < \left|\frac{f_1}{fW}\right| < 2.15$$

where $f_1$ represents a focal length of the first lens unit;

$f_2$ represents a focal length of the second lens unit;

Z represents a zoom ratio; and fW represents a focal length of the zoom lens system in its entirety in a shortest focal length condition.

11. A zoom lens system as claimed in claim 10, wherein a most object side surface of the first lens unit has an aspherical shape.

12. A zoom lens system as claimed in claim 10, wherein a most image side surface of the first lens unit has an aspherical shape.

13. A zoom lens system as claimed in claim 10, wherein a most object side surface of the second lens unit has an aspherical shape.

14. A zoom lens system as claimed in claim 10, wherein a most image side surface of the second lens unit has an aspherical shape.

15. A zoom lens system comprising, from an object side:
a first lens unit having a negative optical power; and
a second lens unit having a positive optical power, said second lens unit being provided on an image side of said first lens unit with a variable air space formed between said first and said second lens units, said second lens unit consisting of one doublet lens element composed of a positive lens element and a negative lens element cemented together,
wherein zooming is performed by varying said variable air space.

16. A zoom lens system as claimed in claim 15, wherein said zoom lens system fulfills the following condition:

$$0.6 < \frac{|\phi 1|}{\phi T} < 2.1$$

where
$\phi 1$ represents an optical power of the first lens unit; and
$\phi T$ represents an optical power of the zoom lens system in its entirety in a longest focal length condition.

17. A zoom lens system as claimed in claim 15, wherein said zoom lens system fulfills the following condition:

$$0.7 < \frac{|\phi 1|}{\phi 2} < 1.4$$

where
$\phi 1$ represents an optical power of the first lens unit; and
$\phi 2$ represents an optical power of the second lens unit.

18. A zoom lens system as claimed in claim 15, wherein said zoom lens system fulfills the following condition:

$$\frac{Np - Nn}{Rc} < 0.1$$

where
Rc represents a radius of curvature of a cementing surface of the doublet lens element for d-line;
Np represents a refractive index of the positive lens element of the doublet lens element for d-line; and
Nn represents a refractive index of the negative lens element of the doublet lens element for d-line.

19. A zoom lens system as claimed in claim 15, wherein said zoom lens system fulfills the following condition:

20<vp−vn where
vp represents an Abbe number of the positive lens element of the doublet lens element for d-line; and
vn represents an Abbe number of the negative lens element of the doublet lens element for d-line.

20. A zoom lens system as claimed in claim 15, wherein said zoom lens system fulfills the following condition:

1<img·R<20 where
img represents a maximum image height; and
R represents an effective radius of a most image side surface of the zoom lens system in its entirety.

21. A zoom lens system as claimed in claim 15, wherein said zoom lens system fulfills the following condition:

$$-1 < \frac{Rp + Rn}{Rp - Rn} < 0$$

where
Rp represents a radius of curvature of an object side surface of the doublet lens element; and
Rn represents a radius of curvature of an image side surface of the doublet lens element.

22. A zoom lens system comprising, from an object side:
a first lens unit having a negative optical power; and
a second lens unit having a positive optical power, said second lens unit being provided on an image side of said first lens unit with a variable air space formed between said first and said second lens units, said second lens unit consisting of, from the object side, one doublet lens element composed of a positive lens element and a negative lens element cemented together and a positive lens element,
wherein zooming is performed by varying said variable air space.

23. A zoom lens system as claimed in claim 22, wherein said zoom lens system fulfills the following condition:

$$0.6 < \frac{|\phi 1|}{\phi T} < 2.1$$

where
$\phi 1$ represents an optical power of the first lens unit; and
$\phi T$ represents an optical power of the zoom lens system in its entirety in a longest focal length condition.

24. A zoom lens system as claimed in claim 22, wherein said zoom lens system fulfills the following condition:

$$0.7 < \frac{|\phi 1|}{\phi 2} < 1.4$$

where
$\phi 1$ represents an optical power of the first lens unit; and
$\phi 2$ represents an optical power of the second lens unit.

25. A zoom lens system as claimed in claim 22, wherein said zoom lens system fulfills the following condition:

$$\frac{Np - Nn}{Rc} < 0.1$$

where
Rc represents a radius of curvature of a cementing surface of the doublet lens element for d-line;

Np represents a refractive index of the positive lens element of the doublet lens element for d-line; and Nn represents a refractive index of the negative lens element of the doublet lens element for d-line.

26. A zoom lens system as claimed in claim 22, wherein said zoom lens system fulfills the following condition:

$$20 < vp-vn$$

where vp represents an Abbe number of the positive lens element of the doublet lens element for d-line; and vn represents an Abbe number of the negative lens element of the doublet lens element for d-line.

27. A zoom lens system as claimed in claim 22, wherein said zoom lens system fulfills the following condition:

$$1 < img \cdot R < 20$$

where img represents a maximum image height; and

R represents an effective radius of a most image side surface of the zoom lens system in its entirety.

28. A zoom lens system comprising, from an object side:

a first lens unit having a negative optical power;

a second lens unit having a positive optical power, said second lens unit being provided on an image side of said first lens unit, wherein a variable air space is formed between said first lens unit and said second lens unit, wherein zooming is performed by varying said variable air space, and wherein the zoom lens system fulfills the following condition:

$$0.1 < |f_1/f_2| \cdot (1/Z) < 0.39$$

wherein:

$f_1$ represents a focal length of the first lens unit;

$f_2$ represents a focal length of the second lens unit; and

Z represents a zoom ratio.

29. A zoom lens system as claimed in claim 28, wherein a most object side surface of the first lens unit has an aspherical shape.

30. A zoom lens system as claimed in claim 28, wherein a most image side surface of the first lens unit has an aspherical shape.

31. A zoom lens system as claimed in claim 28, wherein a most object side surface of the second lens unit has an aspherical shape.

32. A zoom lens system as claimed in claim 28, wherein a most image side surface of the second lens unit has an aspherical shape.

* * * * *

UNITED STATES PATENT AND TRADEMARK OFFICE
CERTIFICATE OF CORRECTION

PATENT NO.   : 6,025,961
DATED        : February 15, 2000
INVENTOR(S)  : Tetsuo Kohno, et. al.

It is certified that error appears in the above-identified patent and that said Letters Patent is hereby corrected as shown below:

Column 44, line 56 (claim 10, line 11 (first formula)), delete $$"0.1 < \left|\frac{f_1}{f_s}\right| \cdot \frac{1}{Z} < 0.39"$$

and insert $$-- 0.1 < \left|\frac{f_1}{f_2}\right| \cdot \frac{1}{Z} < 0.39 --.$$

Column 44, line 58 (claim 10, line 12 (second formula)), delete $$"0.8 < \left|\frac{f_1}{fW}\right| < 2.15",$$

and insert $$-- 0.8 < \frac{f_1}{fW} < 2.15 --.$$

Signed and Sealed this

Eighth Day of May, 2001

Attest:

NICHOLAS P. GODICI

*Attesting Officer*     *Acting Director of the United States Patent and Trademark Office*